US012723421B1

(12) United States Patent
Benson et al.

(10) Patent No.: US 12,723,421 B1
(45) Date of Patent: Sep. 1, 2026

(54) STAND-ALONE ENCLOSURE

(71) Applicant: Bubl Technologies, Inc., San Francisco, CA (US)

(72) Inventors: Austin McKinley Benson, San Francisco, CA (US); Dalton John Viggers, San Francisco, CA (US)

(73) Assignee: Bubl Technologies, Inc., San Francisco, CA (US)

( * ) Notice: Subject to any disclaimer, the term of this patent is extended or adjusted under 35 U.S.C. 154(b) by 350 days.

(21) Appl. No.: 18/202,179

(22) Filed: May 25, 2023

Related U.S. Application Data

(60) Provisional application No. 63/345,734, filed on May 25, 2022.

(51) Int. Cl.

*E04H 1/12* (2006.01)
*E04B 1/343* (2006.01)
*F16M 11/04* (2006.01)
*A47B 21/04* (2006.01)

(52) U.S. Cl.
CPC ......... *E04H 1/125* (2013.01); *E04B 1/34315* (2013.01); *F16M 11/046* (2013.01); *A47B 21/04* (2013.01)

(58) Field of Classification Search
CPC ....... E04H 1/125; E04H 1/12; E04B 1/34315; F16M 11/28; A47B 21/04
See application file for complete search history.

(56) References Cited

U.S. PATENT DOCUMENTS 4,695,903 A 9/1987 Serap et al.
5,024,398 A 6/1991 Riedinger et al.
5,282,341 A 2/1994 Baloga et al.
5,393,964 A 2/1995 Hamilton et al.
5,897,325 A * 4/1999 Koby-Olson ........... E04H 1/125 434/432
5,961,192 A 10/1999 Bernart et al.
5,993,216 A 11/1999 Stogner (Continued)

FOREIGN PATENT DOCUMENTS

CA RGN-197786 12/2021

OTHER PUBLICATIONS https://web.archive.org/web/20220113214732/https://room.com/, Jan. 13, 2022, 15 pages.

(Continued)

*Primary Examiner* — Adriana Figueroa
(74) *Attorney, Agent, or Firm* — Nyemaster Goode P.C.

(57) ABSTRACT

A portable private powered enclosure having a front, rear, top, and first and second side walls and a floor coupled to one another to provide privacy and substantially eliminate sound emanating from within the enclosure. The enclosure includes a door on the front wall for selective access to the interior of the enclosure, a movable desk coupled to the first side wall and movable between lower and upper positions. An actuator within the first wall is coupled to the movable desk to urge the movable desk between the lower and upper positions, and an air recirculating system including a duct with a fan and an air filter disposed within at least one of the front, rear, top, and first and second side walls, and the floor. The floor further includes four adjustable feet, each of the adjustable feet configured to be adjusted from within the interior of the enclosure.

20 Claims, 47 Drawing Sheets

(56) References Cited

U.S. PATENT DOCUMENTS 6,086,380 A 7/2000 Chu et al.
6,189,849 B1 * 2/2001 Sweere ................. F16M 11/30 248/295.11
6,205,716 B1 3/2001 Peltz
6,701,682 B2 3/2004 Ando et al.
6,755,491 B2 * 6/2004 McElheney ........... G07F 19/205 312/223.3
6,844,893 B1 1/2005 Miller et al.
6,980,259 B2 12/2005 Strollo et al.
7,198,240 B2 * 4/2007 Chen .................. B60R 11/0235 361/679.05
D546,967 S 7/2007 Masuda
D547,459 S 7/2007 Masuda
D548,361 S 8/2007 Masuda
7,647,259 B2 1/2010 De Fabrega
D638,551 S 5/2011 Gann
8,037,832 B2 10/2011 Pellegrini
8,446,449 B1 5/2013 Miller et al.
8,526,573 B2 9/2013 Ferro, Jr.
8,616,136 B2 12/2013 Burgess et al.
8,773,495 B2 7/2014 Saleh et al.
8,804,321 B2 * 8/2014 Kincaid ................ H04N 7/142 312/265.6
8,934,063 B2 1/2015 Boyer, Jr.
8,944,376 B2 2/2015 Godecker et al.
8,947,215 B2 2/2015 Mandel et al.
8,996,392 B2 3/2015 Cashman et al.
9,043,217 B2 5/2015 Cashman et al.
D731,077 S 6/2015 Lehmann
D732,690 S 6/2015 Lehmann
D732,691 S 6/2015 Hallfors
D732,692 S 6/2015 Hallfors
9,080,721 B2 7/2015 Hazzard et al.
D736,948 S 8/2015 Dar et al.
D736,949 S 8/2015 Dar et al.
D736,950 S 8/2015 Dar et al.
9,133,974 B2 9/2015 Tholkes et al.
9,208,287 B2 12/2015 Waterson et al.
9,300,782 B2 3/2016 Badeau et al.
9,332,839 B2 5/2016 Ringlein
D764,667 S 8/2016 Shiue et al.
D768,874 S 10/2016 Walter
9,603,457 B2 3/2017 Massaud et al.
9,622,570 B1 4/2017 Battey et al.
D788,318 S 5/2017 Jennings et al.
D789,551 S 6/2017 Mayer et al.
9,743,844 B2 8/2017 Bluth
9,918,550 B1 3/2018 Taylor et al.
D816,244 S 4/2018 Mayer et al.
9,958,108 B2 5/2018 Bowman et al.
9,961,992 B2 5/2018 King et al.
9,979,837 B2 5/2018 Badeau et al.
10,051,956 B2 8/2018 Burgess et al.
10,074,148 B2 9/2018 Cashman et al.
10,104,957 B2 10/2018 Ergun et al.
D844,165 S 3/2019 Zhu
D844,166 S 3/2019 Zhu
D844,167 S 3/2019 Zhu
D844,168 S 3/2019 Zhu
10,223,681 B2 3/2019 Cashman et al.
D844,810 S 4/2019 Hllfors et al.
D844,811 S 4/2019 Zhu
D844,812 S 4/2019 Zhu
D844,813 S 4/2019 Zhu
D844,814 S 4/2019 Zhu
D844,815 S 4/2019 Zhu
D844,816 S 4/2019 Zhu
D844,817 S 4/2019 Zhu
D844,818 S 4/2019 Zhu
D844,819 S 4/2019 Zhu
D846,147 S 4/2019 Zhu
D846,757 S 4/2019 Zhu
D852,376 S 6/2019 Mikolajczyk
10,310,361 B1 6/2019 Featherstone
10,362,271 B2 7/2019 Katsuyama
D855,827 S 8/2019 Zhu
D856,529 S 8/2019 Mikolajczyk
D857,232 S 8/2019 Zhu
D857,233 S 8/2019 Zhu
D857,234 S 8/2019 Zhu
D857,918 S 8/2019 Zhu
D857,919 S 8/2019 Zhu
10,376,042 B1 8/2019 Johnson et al.
10,376,044 B2 8/2019 Shen
D858,795 S 9/2019 Zhu
D859,674 S 9/2019 Smith
10,405,647 B2 9/2019 Laudadio et al.
D862,733 S 10/2019 Kwong
10,438,455 B2 10/2019 Konecny et al.
10,463,147 B2 11/2019 Bowman et al.
D870,316 S 12/2019 Haveri et al.
D870,319 S 12/2019 Albarran
D872,302 S 1/2020 Tibi et al.
D872,303 S 1/2020 Tibi et al.
D873,437 S 1/2020 Zhu
10,561,006 B2 2/2020 Mead et al.
D880,000 S 3/2020 Albarran
10,666,901 B1 5/2020 Zhang et al.
D886,324 S 6/2020 Haveri et al.
D895,148 S 9/2020 Wallinmaa et al.
10,779,647 B2 9/2020 Amit
10,786,074 B2 * 9/2020 Kincaid .................. H05K 5/03
D900,192 S 10/2020 Redhead
10,813,449 B2 10/2020 Wanstall
10,825,287 B2 11/2020 Feng et al.
D907,798 S 1/2021 Zhu
D908,918 S 1/2021 Zhu
D910,205 S 2/2021 Nakata
D910,206 S 2/2021 Nakata
10,939,750 B2 * 3/2021 Swartz .................. A47B 21/06
10,939,753 B2 3/2021 Hazzard et al.
10,969,956 B2 4/2021 Govil et al.
10,975,564 B2 * 4/2021 Watanabe ........... E04B 1/34846
D954,298 S 6/2022 Carr et al.
D967,457 S 10/2022 Lehtinen et al.
D968,647 S 11/2022 Lehtinen et al.
D977,146 S 1/2023 Lehtinen et al.
D978,379 S 2/2023 Kjellberg et al.
D1,009,298 S * 12/2023 Bricknell ...................... D25/16
2004/0003545 A1 1/2004 Gillespie
2004/0252184 A1 12/2004 Hesse et al.
2005/0016081 A1 1/2005 Gomree et al.
2006/0292973 A1 12/2006 Brooks
2008/0005974 A1 1/2008 Delgado Vazquez et al.
2011/0234779 A1 9/2011 Weisberg
2013/0067834 A1 3/2013 Downey et al.
2013/0155009 A1 6/2013 Sevigny
2014/0330579 A1 11/2014 Cashman et al.
2016/0007733 A1 1/2016 Kincaid et al.
2016/0073772 A1 3/2016 Ergun et al.
2017/0055697 A1 3/2017 Kincaid et al.
2018/0010351 A1 1/2018 Berry
2018/0158555 A1 6/2018 Cashman et al.
2018/0320394 A1 11/2018 Reaves
2019/0177993 A1 * 6/2019 Shell ......................... E04H 1/12
2019/0294322 A1 9/2019 Govil et al.
2020/0018060 A1 1/2020 Watanabe et al.
2020/0170404 A1 6/2020 Knapp et al.
2020/0170406 A1 6/2020 Knapp et al.
2020/0170407 A1 6/2020 Knapp et al.
2020/0347626 A1 11/2020 Petty et al.

OTHER PUBLICATIONS https://web.archive.org/web/20211123140210/https://www.frameryacoustics.com/en/products/framery-o/, Nov. 23, 2021, 13 pages.
https://web.archive.org/web/20220223153152/https://zenbooth.net/, Feb. 23, 2022, 9 pages.
https://web.archive.org/web/20210616002152/https://www.talkboxbooth.com/. Jun. 16, 2021, 11 pages.
https://web.archive.org/web/20200506084948/https://www.poppin.com/furniture/poppinpod/, May 6, 2022, 1 page.

(56) References Cited

OTHER PUBLICATIONS https://web.archive.org/web/20210729190332/https://www.jabbrrbox.com/jabbrrbox/buy, Jul. 29, 2021, 2 pages.
https://web.archive.org/web/20211122221435/https://cubicallbooth.com/shop/, Nov. 22, 2021, 4 pages.
https://web.archive.org/web/20220317194452/https://thinktanks.io/, Mar. 17, 2022, 14 pages.
https://web.archive.org/web/20220329121606/https://gosleep.fi/, Mar. 29, 2022, 4 pages.
https://web.archive.org/web/20220327080953/https://openseed.co/, Mar. 27, 2022, 16 pages.
https://web.archive.org/web/20201130084649/https://spacestor.com/customizer/, Nov. 30, 2020, 2 pages.
https://web.archive.org/web/20201223083554/https://workspace.snapcab.com/, Dec. 23, 2020, 1 page.
https://web.archive.org/web/20211024082525/https://rustica.com/privacy-booths/, Oct. 24, 2021, 8 pages.
https://web.archive.org/web/20220316144209/https://spaceworx.us/, Mar. 16, 2022, 7 pages.
https://web.archive.org/web/20200831035226/https://whisperroom.com/models/?sortby=price-LH&search=false&checkbox=[%22stand%22,%22enh%22]&priceRange=$3,300%20-%20$34,800&squareFt=0%20-%20140%20ft%C2%B2&offset=1, Aug. 31, 2020, 7 pages.
https://web.archive.org/web/20211017021813/https://emagispace.com/products/privacy-pods/privacy-pod-plus-2/, Oct. 17, 2021, 3 pages.
https://web.archive.org/web/20200608061049/https://mikomaxsmartoffice.com/, Jun. 8, 2020, 1 page.
https://web.archive.org/web/20200919031321/https://www.estel.com/en/category/smart-office-en/acoustic-partitions-en/collaborative-room-en/, Sep. 19, 2020, 2 pages.
https://web.archive.org/web/20201023114351/https://officebubble.ie/OB-small-office-bubble.html, Oct. 23, 2020, 6 pages.
Report of International Design No. D202068-001, Aug. 2, 2019 to Martela Oyj.
Report of International Design No. D978,379, Aug. 2, 2019 to Martela Oyj.
Report of International Design No. D202068-002, Aug. 2, 2019 to Martela Oyj.
Report of International Design No. D209688-001, Jan. 29, 2021 to Onetwosix Design Inc.
Report of International Design No. D209723-001, Aug. 21, 2020 to Impact Acoustic AG.
Report of International Design No. D209723-002, Aug. 21, 2020 to Impact Acoustic Agimpact Acoustic AG.
Report showing International Registration No. DM/209723—International Registration Date Apr. 17, 2020 to Impact Acoustic AG for a "Telephone Box".

* cited by examiner

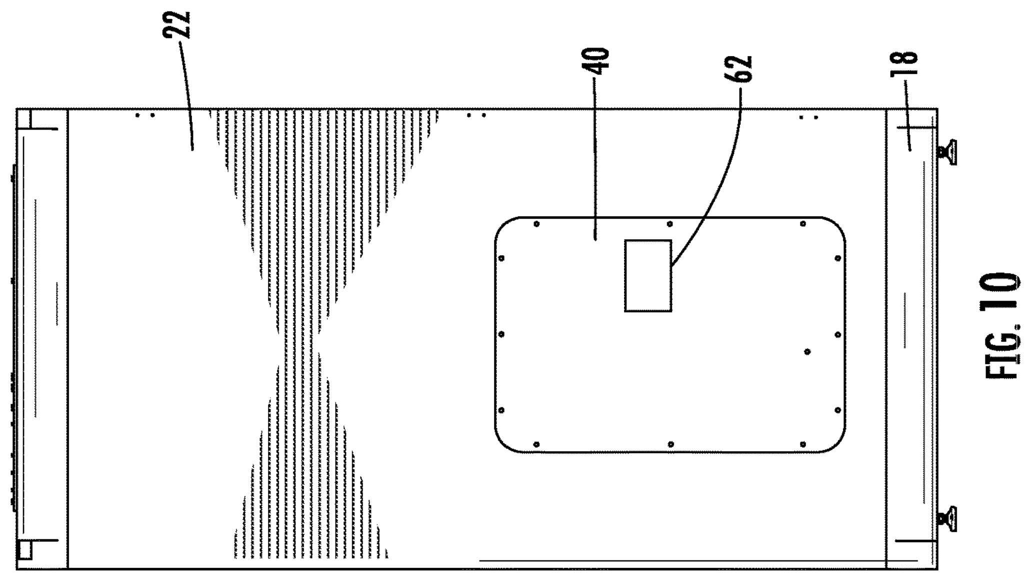
FIG. 10
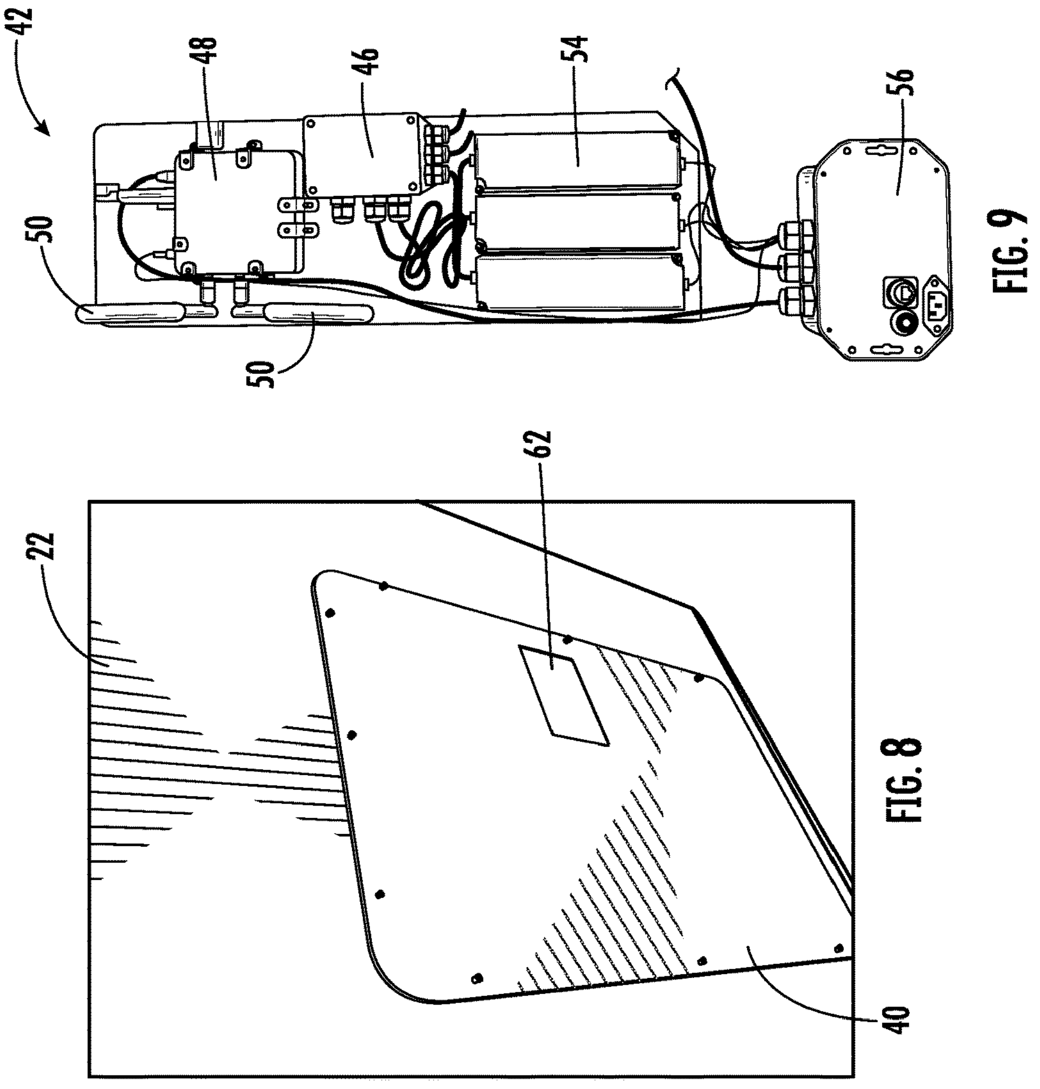
FIG. 9
FIG. 8

204
14
58
60
52
46
242
42
44
48
50
56
202
54

204
58
52
44
242
66
64
68
42
56
54
40

16
114
118
28
52
32
14
30
114
118
118
22
114
24
114
18

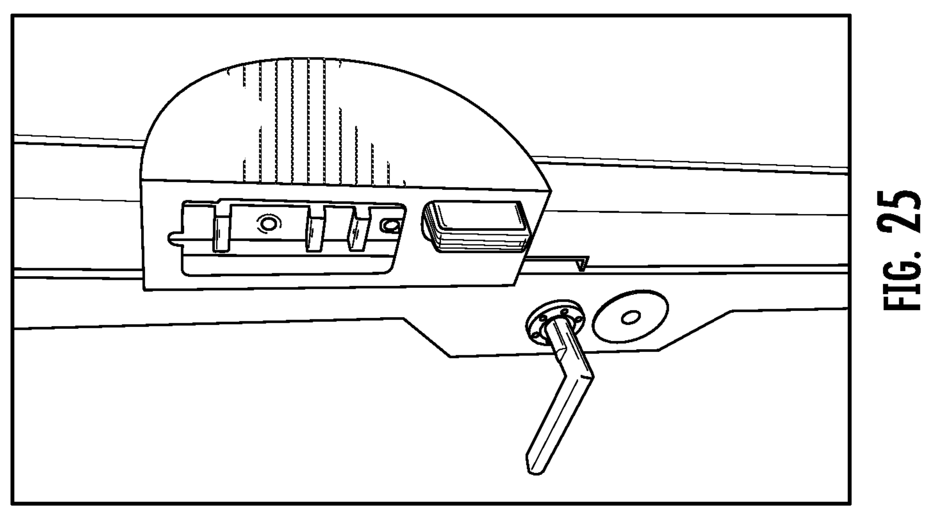
FIG. 25
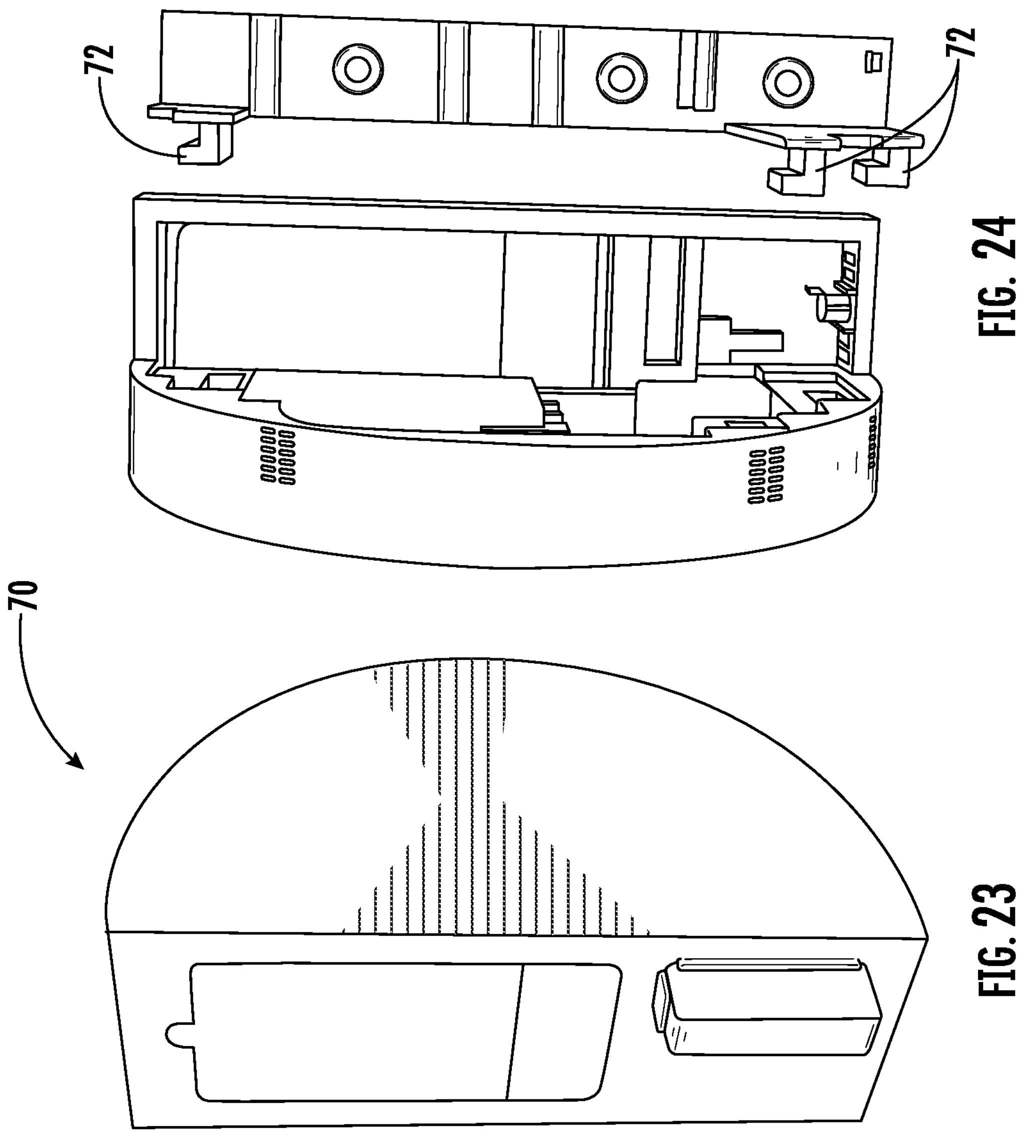
FIG. 24
FIG. 23

74
82
86
34
76
36
76

34
78
84
80
76
94
52

30
82
34
86
78
74
38
36
32
52

32
36c
76
76
74
80
42
90
90
92
92
14
118
118

32
36c
76
74
80
44
242
90
92
14

16
102
100
96
104
98
106
106
110
108

102
100
96
104
106
106
110
108
112

102
96
16
100

142

10
24
23
10
24
23
36a
36b
10
24
23
74
32
36b
36a

AUTOMATIC CONFIGURATION OF CIRCADIAN ENVIRONMENTS FIGURES

PEAK BRIGHTNESS
MAXIMUM TEMPERATURE COLOR (KELVIN)
COLD WHITE / BLUE LIGHT

SUNRISE

SOLAR NOON

SUNSET

SOLAR MIDNIGHT

LOWEST BRIGHTNESS
MINIMUM TEMPERATURE COLOR (KELVIN)
WARM WHITE / ORANGE LIGHT 310
306
301
306
406

STAND-ALONE ENCLOSURE

CROSS-REFERENCE TO RELATED APPLICATION

This application claims priority to and the benefit of U.S. Patent Application No. 63/345,734, filed on May 25, 2022, entitled "STAND-ALONE ENCLOSURE," the entire disclosure of which is hereby incorporated herein by reference.

BACKGROUND

As more people travel, work remotely, or otherwise utilize non-traditional spaces to attend to their personal and professional matters, privacy remains an important aspect to those utilizing the non-traditional spaces to conduct business. Enclosed workspaces have been developed, but suffer from various drawbacks in design. Enclosures of the prior art are not able to be shipped flat in many instances, do not have a moveable desk system with an audio video conferencing system integrated into the enclosure let alone one with an overall system that moves between user selectable positions without any exposed wiring, mechanisms or pathways.

SUMMARY

An aspect of the present disclosure is generally directed to a portable private powered enclosure having a front, rear, top, and first and second side walls and a floor coupled to one another to provide privacy and substantially eliminate sound emanating from within the enclosure. The enclosure includes a door on the front wall for selective access to the interior of the enclosure, a movable desk coupled to the first side wall and movable between lower and upper positions. An actuator within the first wall is coupled to the movable desk to urge the movable desk between the lower and upper positions, and an air recirculating system including a duct with a fan and an air filter disposed within at least one of the front, rear, top, and first and second side walls, and the floor. The floor further typically includes four adjustable feet, each of the adjustable feet configured to be adjusted from within the interior of the enclosure.

Another aspect of the present disclosure is generally directed toward a stand-alone private space enclosure configured and sized to allow a human to both sit and stand within it. The stand-alone private space enclosure typically includes: a main frame comprising a front wall; a rear wall; a first side wall having a first side wall base support, a first interior space facing panel and a first exterior facing panel spaced apart from one another and defining a first side wall cavity; a second side wall; a top wall; and a floor where the floor is engaged to the front wall, the rear wall, the first side and the second side and the top wall is engaged to the front wall, the rear wall, the first side wall and the second side wall; and where the front wall, the rear wall, the first side wall, the second side wall, the top wall and the floor define an interior workspace; a door that is either (1) hingedly engaged with the front wall by one or more hinges; or (2) is the front wall and is hingedly engaged to the first side wall or the second side wall by one or more hinges; where the door is operable by hand and without the use of tools to allow a user ingress and egress from the interior workspace; a moveable workstation assembly that is moveable and positionable as an overall assembly between an upmost position and a downmost position and any use location between the upmost position and the downmost position and where the use location is based upon the height of the user, user instructions received from the user via a user input device or both. The moveable workstation assembly typically includes: a moveable workstation frame that typically has a left side vertical support; a right side vertical support opposite the left side vertical support; a horizontally extending bottom support affixed to or integrally formed with the left side vertical support and the right side vertical support; a horizontally extending strengthening support affixed to or integrally formed with and extending between about a center portion of the left side vertical support and about a center portion of the right side vertical support; a horizontally extending display mounting support spaced above the horizontally extending strengthening support and affixed to or integrally formed with and extending between the left side vertical support and the right side vertical support. The moveable workstation assembly further typically includes a video display monitor engaged to the horizontally extending display mounting support such that the video display monitor faces the interior workspace; a façade covering that hides the entire moveable workstation frame and any aperture in the first interior space facing panel that are proximate or within a boundary defined by the frame assembly regardless of the position of the moveable workstation assembly between the upmost position and the downmost position; a first desk support rod having a desk engaging end portion and an opposite end portion where the first desk support rod extends through the façade covering and engages the left side vertical support of the moveable workstation frame; a second desk support rod having a desk engaging end portion and an opposite end portion where the second desk support rod extends through the façade covering and engages right side vertical support of the moveable workstation frame; and a desk having a first desk support rod receiving aperture on a first side wall facing surface of the desk and extending into an interior of the desk; and second desk support rod receiving aperture on a first side wall facing surface of the desk and extending into an interior of the desk where the first desk support rod receiving aperture is left of a center of the first side wall facing surface of the desk and the second desk support rod receiving aperture is right of the center of the first side wall facing surface of the desk and where the first desk support rod's desk engaging portion is within the first desk support rod receiving aperture and where the second desk support rod's desk engaging portion is within the second desk support rod receiving aperture. The stand-alone private space enclosure further typically includes a vertically oriented actuator positioned within the first side wall cavity; engaged with the first side wall and the moveable workstation frame; and configured to move the moveable workstation assembly as a unit between an upmost position and a downmost position and to any use location between the upmost position and the downmost position and to maintain the position of the moveable workstation assembly in a user selected position.

Yet another aspect of the present disclosure is generally directed to a stand-alone private space enclosure configured and sized to allow a human to both sit and stand within it, where the stand-alone private space enclosure that includes: a main frame comprising a rear wall; a first side wall having a first side wall base support, a first interior space facing panel and a first exterior facing panel spaced apart from one another and defining a first side wall cavity; a second side wall; a top wall; and a floor where the floor is engaged to the front wall, the rear wall, the first side and the second side and the top wall is engaged to the front wall, the rear wall, the first side wall and the second side wall where the front wall, the rear wall, the first side wall, the second side wall, the top wall and the floor define an interior workspace; a door that is hingedly engaged to the first side wall or the second side wall by one or more hinges where the door is operable by hand and without the use of tools to allow a user ingress and egress from the interior workspace; and a moveable workstation assembly that is moveable and positionable as an overall assembly between an upmost position and a downmost position and any use location between the upmost position and the downmost position where the use location is based upon the height of the user, user instructions received from the user via a user input device or both. The moveable workstation assembly typically includes: a moveable workstation frame having a left side vertical support; a right side vertical support opposite the left side vertical support; a horizontally extending bottom support affixed to or integrally formed with the left side vertical support and the right side vertical support; a horizontally extending strengthening support affixed to or integrally formed with and extending between about a center portion of the left side vertical support and about a center portion of the right side vertical support; and a horizontally extending display mounting support spaced above the horizontally extending strengthening support and affixed to or integrally formed with and extending between the left side vertical support and the right side vertical support. The moveable workstation assembly typically further includes a video display monitor engaged to the horizontally extending display mounting support such that the video display monitor faces the interior workspace; a façade covering that hides the entire moveable workstation frame and any aperture in the first interior space facing panel that are proximate or within a boundary defined by the frame assembly regardless of the position of the moveable workstation assembly between the upmost position and the downmost position; a first desk support rod having a desk engaging end portion and an opposite end portion where the first desk support rod extends through the façade covering and engages the left side vertical support of the moveable workstation frame; a second desk support rod having a desk engaging end portion and an opposite end portion where the second desk support rod extends through the façade covering and engages right side vertical support of the moveable workstation frame; a desk having a first desk support rod receiving aperture on a first side wall facing surface of the desk and extending into an interior of the desk; and second desk support rod receiving aperture on a first side wall facing surface of the desk and extending into an interior of the desk where the first desk support rod receiving aperture is left of a center of the first side wall facing surface of the desk and the second desk support rod receiving aperture is right of the center of the first side wall facing surface of the desk. The first desk support rod's desk engaging portion is within the first desk support rod receiving aperture. The second desk support rod's desk engaging portion is within the second desk support rod receiving aperture. The stand-alone private space enclosure typically further includes a vertically oriented actuator positioned within the first side wall cavity; engaged with the first side wall and the moveable workstation frame; and configured to move the moveable workstation assembly as a unit between an upmost position and a downmost position and to any use location between the upmost position and the downmost position and to maintain the position of the moveable workstation assembly in a user selected position. The vertically oriented actuator typically includes a screw stepper motor system that is mounted to a central support engaged with and extending from the left side of the first side wall and into engagement with the right side of the first side wall. The central support interconnects the first side wall and the second side wall within the middle fifty percent of the overall height of the first side wall and the second side wall and the central support is at least substantially parallel to the floor. The screw stepper motor system typically includes a screw stepper motor, a screw stepper drive shaft, a potentiometer and a mounting bracket that is engaged to the moveable workstation frame.

Yet another aspect of the present disclosure is generally directed to a stand-alone private space enclosure configured and sized to allow a human to both sit and stand within it, where the stand-alone private space enclosure includes a main frame comprising a rear wall; a first side wall having a first side wall base support, a first interior space facing panel and a first exterior facing panel spaced apart from one another and defining a first side wall cavity; a second side wall; a top wall; and a floor where the floor is engaged to the front wall, the rear wall, the first side and the second side and the top wall is engaged to the front wall, the rear wall, the first side wall and the second side wall; and where the front wall, the rear wall, the first side wall, the second side wall, the top wall and the floor define an interior workspace; a door that is hingedly engaged to the first side wall or the second side wall by one or more hinges where the door is operable by hand and without the use of tools to allow a user ingress and egress from the interior workspace; and a moveable workstation assembly that is moveable and positionable as an overall assembly between an upmost position and a downmost position and any use location between the upmost position and the downmost position and where the use location is based upon the height of the user, user instructions received from the user via a user input device or both. The moveable workstation assembly typically includes: a moveable workstation frame having a left side vertical support; a right side vertical support opposite the left side vertical support; a horizontally extending bottom support affixed to or integrally formed with the left side vertical support and the right side vertical support; a horizontally extending strengthening support affixed to or integrally formed with and extending between about a center portion of the left side vertical support and about a center portion of the right side vertical support; and a horizontally extending display mounting support spaced above the horizontally extending strengthening support and affixed to or integrally formed with and extending between the left side vertical support and the right side vertical support. The moveable workstation assembly typically further includes a video display monitor engaged to the horizontally extending display mounting support such that the video display monitor faces the interior workspace; a façade covering that hides the entire moveable workstation frame and any aperture in the first interior space facing panel that are proximate or within a boundary defined by the frame assembly regardless of the position of the moveable workstation assembly between the upmost position and the downmost position; a first desk support rod having a desk engaging end portion and an opposite end portion where the first desk support rod extends through the façade covering and engages the left side vertical support of the moveable workstation frame; a second desk support rod having a desk engaging end portion and an opposite end portion where the second desk support rod extends through the façade covering and engages right side vertical support of the moveable workstation frame; and a desk having a first desk support rod receiving aperture on a first side wall facing surface of the desk and extending into an interior of the desk; and second desk support rod receiving aperture on a first side wall facing surface of the desk and extending into an interior of the desk. The first desk support rod receiving aperture is left of a center of the first side wall facing surface of the desk and the second desk support rod receiving aperture is right of the center of the first side wall facing surface of the desk and where the first desk support rod's desk engaging portion is within the first desk support rod receiving aperture. The second desk support rod's desk engaging portion is within the second desk support rod receiving aperture. The stand-alone private space enclosure typically further includes at least one, but more typically one vertically oriented actuator positioned within the first side wall cavity; engaged with the first side wall and the moveable workstation frame; and configured to move the moveable workstation assembly as a unit between an upmost position and a downmost position and to any use location between the upmost position and the downmost position and to maintain the position of the moveable workstation assembly in a user selected position. The vertically oriented actuator typically includes a screw stepper motor system that is typically mounted to a central support that is welded to the left side of the first side wall and the right side of the first side wall where the central support interconnects the first side wall and the second side wall within the middle fifty percent of the overall height of the first side wall and the second side wall and the central support is at least substantially parallel to the floor. The screw stepper motor system typically includes a screw stepper motor, a screw stepper drive shaft, a potentiometer and a mounting bracket that is engaged to the moveable workstation frame. The moveable workstation assembly only engages the first side wall through its connection with the vertically oriented actuator and by a connection of the moveable workstation frame to a guide rail and a ball bearing carriage assembly system on each side of the moveable workstation frame where ball bearing carriages are mounted to first side wall and a corresponding guide rail that engages the ball bearing carriages is mounted to the left side vertical support and the right side vertical support. The moveable workstation assembly further typically includes a camera and a microphone mounted solely to a non-user facing surface of the façade covering that does not face the user during use and where the camera and the microphone are spaced above the video display monitor, behind the façade covering, but the camera is allowed to view the interior workspace through a camera aperture proximate the top and center of the façade covering.

These and other aspects, objects, and features of the present disclosure will be understood and appreciated by those skilled in the art upon studying the following specification, claims, and appended drawings.

BRIEF DESCRIPTION OF THE DRAWINGS

In the drawings:

FIG. 8 is a perspective view of the exterior first side wall of a stand-alone private space enclosure according to an aspect of the present disclosure showing the panel.

FIG. 9 is a schematic view showing the internal mechanical and electrical workings of the first side wall of a stand-alone private space enclosure according to an aspect of the present disclosure.

FIG. 10 is a side view of the first side wall of a stand-alone private space enclosure according to an aspect of the present disclosure showing the panel and the leveling feet.

FIG. 23 is a perspective view of the lock assembly of a stand-alone private space enclosure according to an aspect of the present disclosure.

FIG. 24 is a rear perspective view of the lock assembly and the catch of a stand-alone private space enclosure according to an aspect of the present disclosure.

FIG. 25 is a front perspective view of an overall lock assembly and the door of a stand-alone private space enclosure according to an aspect of the present disclosure.

DETAILED DESCRIPTION

Figure 1:
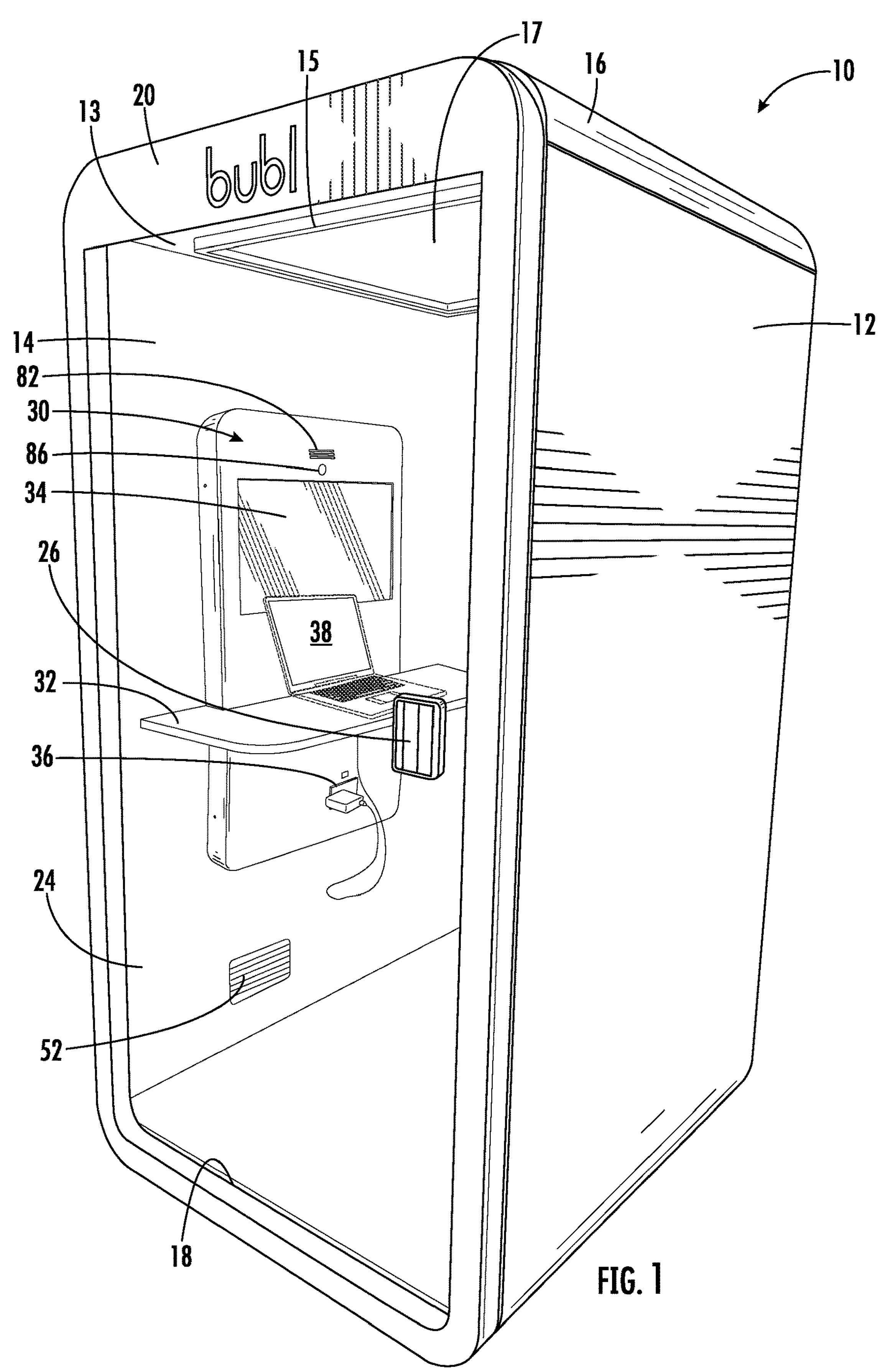
FIG. 1 is an isometric perspective view of an exemplary stand-alone private space enclosure according to an aspect of the present disclosure.

For purposes of description herein, the terms "upper," "lower," "right," "left," "rear," "front," "vertical," "horizontal," and derivatives thereof shall relate to the disclosure as oriented in FIG. 1. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

All ranges and parameters, including but not limited to percentages, parts, and ratios, disclosed herein are understood to encompass any and all sub-ranges assumed and subsumed therein, and every number between the endpoints. For example, a stated range of "1 to 10" should be considered to include any and all sub-ranges beginning with a minimum value of 1 or more and ending with a maximum value of 10 or less (e.g., 1 to 6.1, or 2.3 to 9.4), and to each integer (1, 2, 3, 4, 5, 6, 7, 8, 9, 10) contained within the range. In this specification and the appended claims, the singular forms "a," "an" and "the" include plural reference unless the context clearly dictates otherwise. All combinations of method steps or process steps as used herein can be performed in any order, unless otherwise specified or clearly implied to the contrary by the context in which the referenced combination is made.

FIG. 1 shows an exemplary stand-alone private space enclosure 10. The stand-alone private space enclosure 10 is cuboid shaped and typically includes a first or right side wall 12, a second or left side wall 14, a top wall 16, a bottom wall 18, a front wall 20, and a rear wall 22. The side walls are connected to the top wall 16 and the bottom wall 18 with a curved corner joints, which will be discussed in greater detail herein. The front wall may include a door 24 having a door handle 26, which allows a user selective access to the interior of the stand-alone private space enclosure 10. The door 24 is typically connected to the right wall or the left wall via one or more hinge mechanisms 28 such as a standard door hinge or conceivably a piano hinge. The door may entirely be constructed of one layer or a plurality of layers of glass or other transparent material. The door may also be constructed of multiple layer electrochromic glass that is able to be selectively tinted to make the door any degree of occluded from transparent to translucent to completely opaque. The door may further have only a portion of the door constructed of electrochromic material such that a pattern such as a logo or other design is disclosed, for example, when the stand-alone private space enclosure is vacant to indicate to a potential user that the stand-alone private space enclosure is available for use or to block just the upper portion of a person from view hiding a person's identity that is using the stand-alone private space enclosure while still allowing others outside of the stand-alone private space enclosure to see the feet of the user and know the stand-alone private space enclosure is in use.

The ceiling 13 of the stand-alone private space enclosure 10 typically has one or a plurality of lighting fixtures, which can cover all or just a portion of the ceiling and be incandescent, light emitting diodes or other light source generating device(s). Typically, the lighting fixture or fixtures 15 are configured to circumscribe the center of the typical location within the stand-alone private space enclosure where the user typically stands or sits. As such, the light is provided around the user and is not too excessive with lighting over the entire surface of the ceiling, for example. Instead, the fixture or fixtures 15, have a center portion or more typically there is a portion of the ceiling 13 that is within the center of the ceiling that is not illuminated and that center portion 17 is positioned over the proximate location of the user of the stand-alone private space enclosure. In this manner, instead of having illumination just over the desk in front of the user, the stand-alone private space enclosure of the present disclosure provides a "halo" of light around the user to illuminate the area of use for writing, reading and for better video quality when videoconferences are conducted within the disclosure. The light fixture 15 is typically an LED light source and is typically a rectangular configuration, but could conceivably be any shape with a center that is not illuminated such as a circle or parallelogram. More typically, the light is a square and a single LED fixture that is embedded within the ceiling such that the LED fixture is flush with the ceiling or attached to the ceiling's surface or projecting below the plane of the ceiling. The light quality, color, intensity and other features can be modified to the use and provide light more conducive to the task such as more energy (typically in a range of from about 5,000 to about 6,500K (Kelvin)), reading (typically in a range of from about 2700K to about 3000K (Kelvin) range), relaxing (typically in a range of from about 3,000 to about 3,500K (Kelvin)), or for better video transmissions when the user is conducting a videoconference or recording in the stand-alone private space enclosure.

Figure 2:
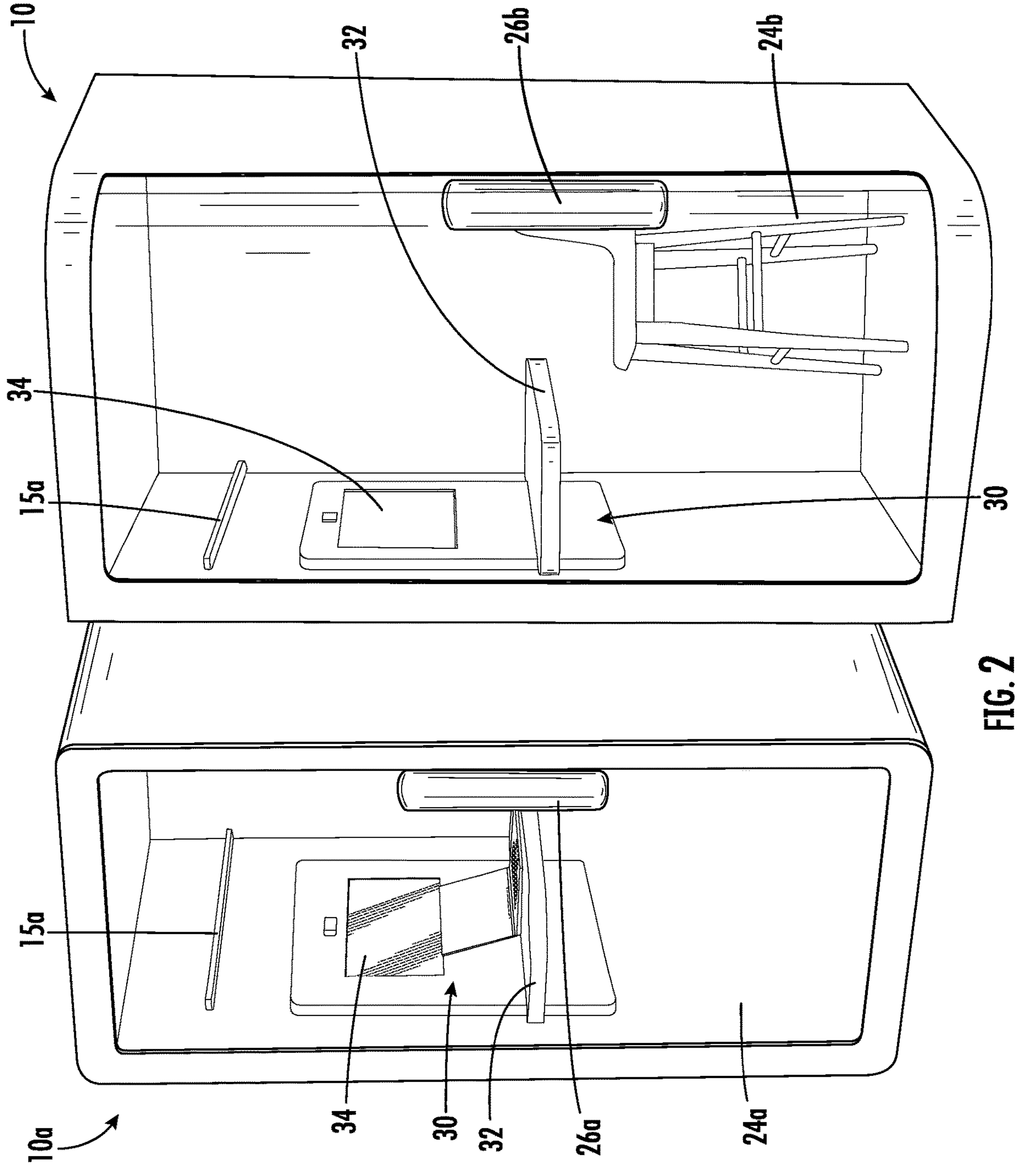
FIG. 2 is an isometric perspective view of two exemplary stand-alone private space enclosures according to an aspect of the present disclosure positioned side-by-side. The present disclosure encompasses the use of two or more, three or more and up to eight or more stand-alone private space enclosure associated with one another and optionally deriving power from the same single electrical power connection.
Figure 3:
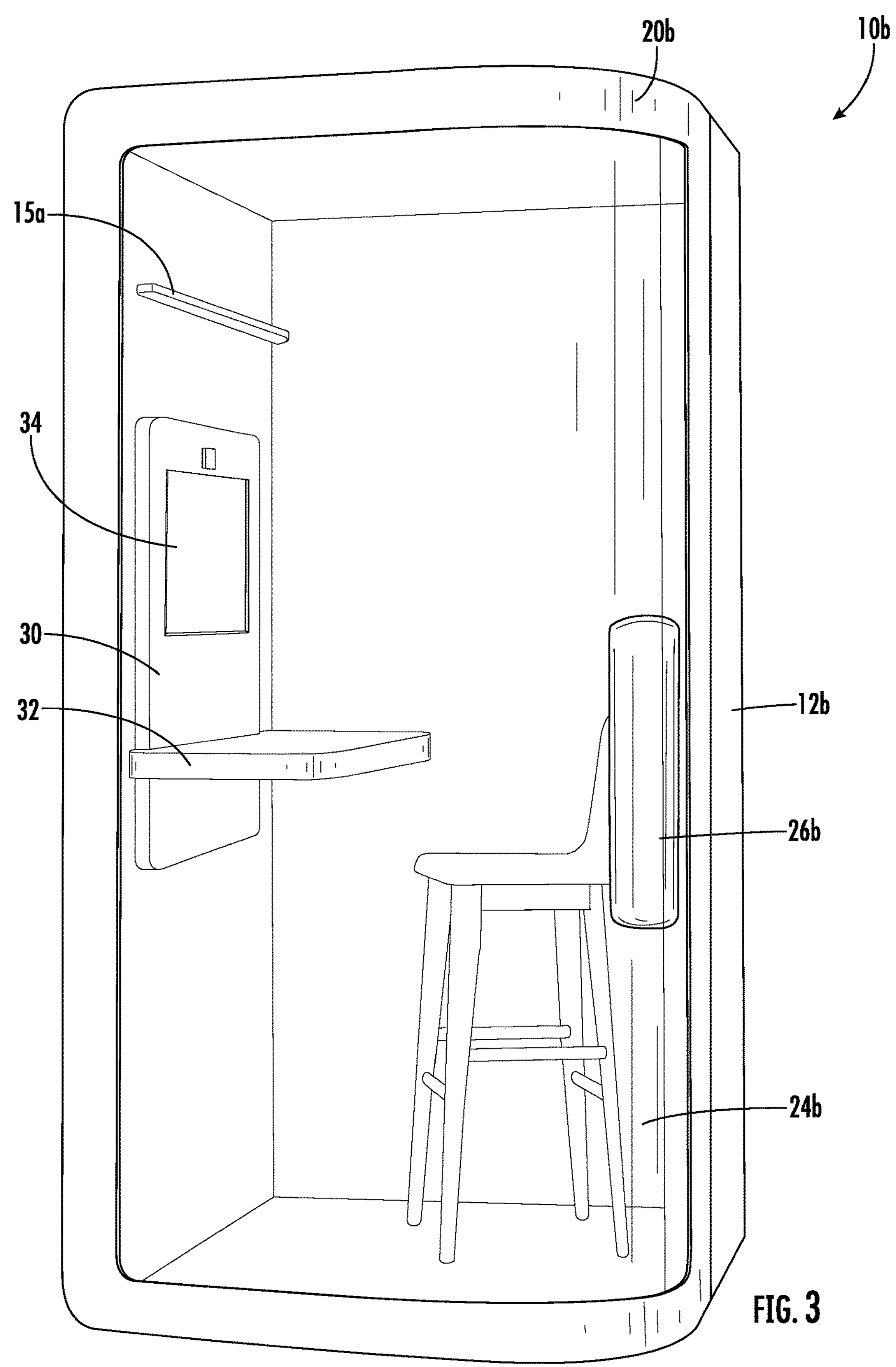
FIG. 3 is a perspective front view of an exemplary stand-alone private space enclosure of the present disclosure.
Figures 4, 5:
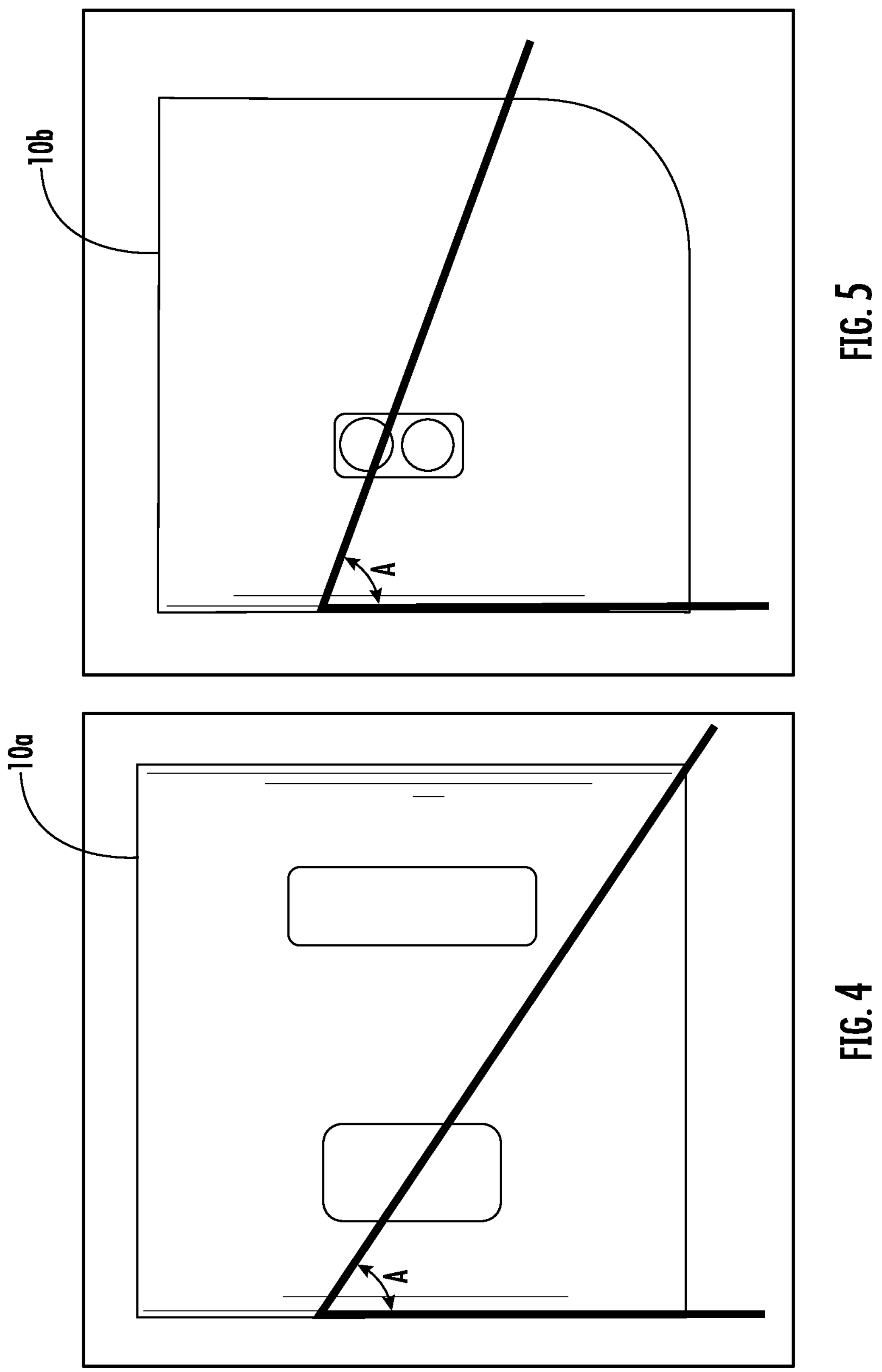
FIG. 4 is a top down view of the internal sight lines in a stand-alone private space enclosure according to an aspect of the present disclosure having a door as shown in FIG. 1.
FIG. 5 is a top down view of the internal sight lines in a stand-alone private space enclosure according to an aspect of the present disclosure having a door as shown in FIG. 3.
Figure 63:
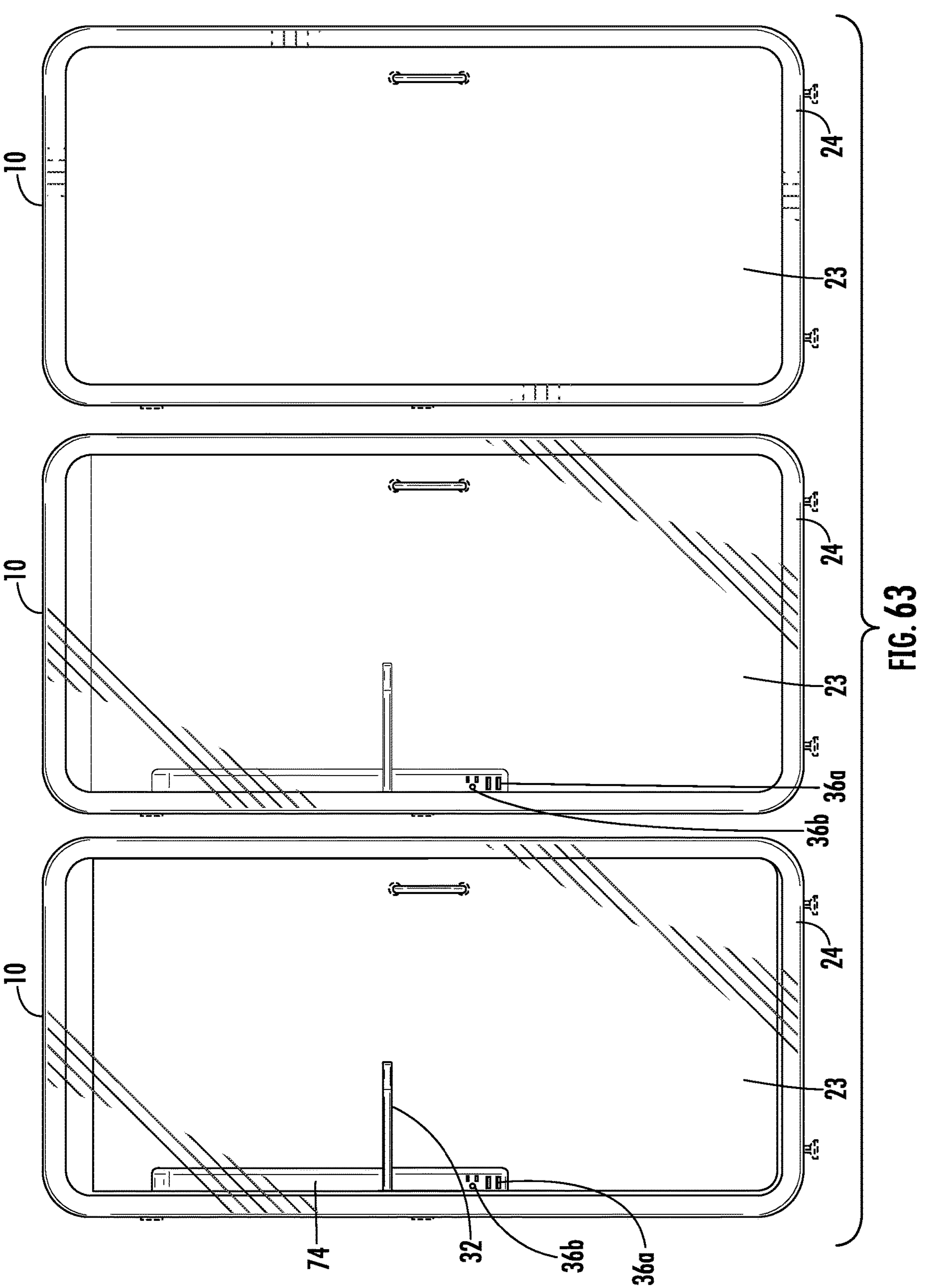
FIG. 63 is a front view of a stand-alone private space enclosure according to an aspect of the present disclosure showing three different exemplary states among infinite states/stages of opaqueness of the glass door, which may be constructed of electrochromic glass or a portion that contains electrochromic glass.
Figure 64:
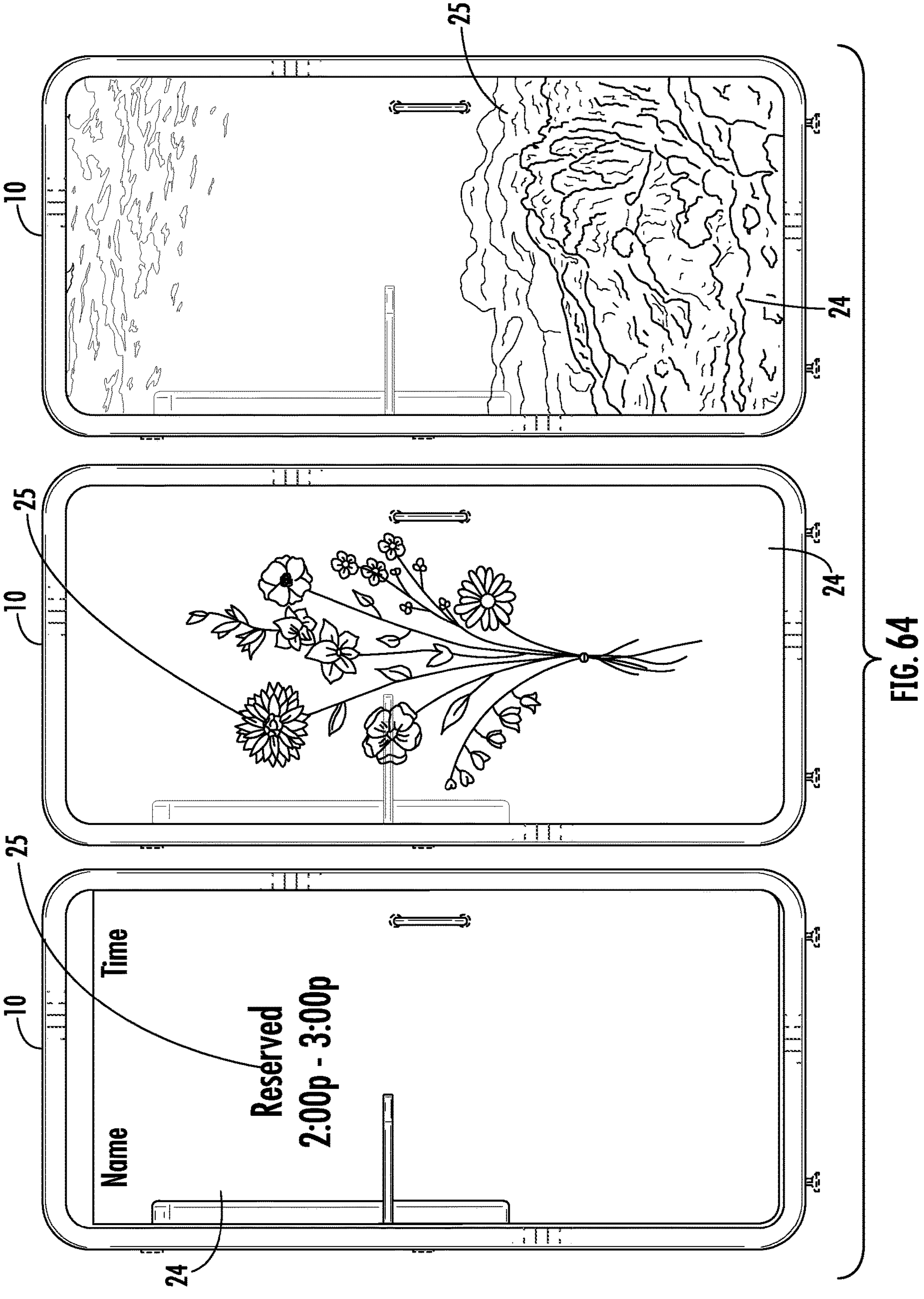
FIG. 64 is a front view of a stand-alone private space enclosure according to an aspect of the present disclosure showing three different display options among infinite display options for the door of a stand-alone private space enclosure according to an aspect of the present disclosure.

As shown in FIG. 2, in an embodiment the door 24 may be a flat front door 24*a* having a handle 26*a*. In another embodiment, the door 24 may be a panoramic door 24*b* that allows for more visibility out of and more ambient light to shine in through at least a portion of the side wall 12. Also, as shown in FIGS. 2-3, the light 15*a* may be used in addition to or instead of the "halo" or other ceiling light. This side wall light 15*a* (and/or the ceiling mounted light(s)) may be automatically adjusted in warmth/Kelvin level when a videoconference is scheduled to be conducted, for example, and then back to a predetermined level. The side wall light provides more direct lighting to the top desk surface and the front of the user when the user is facing the video display. Regarding the door, in practice, as shown in FIG. 3 the front panel 20*b* may wrap around farther into side wall 12*b* to fully enclose the panoramic door 24*b* within a single wall for ease of assembly. In this version of the "door" a portion of the door, when closed, forms a part of the right side wall and the side of the door with the handle typically has a curved portion of the glass that extends around to at least a portion of a side wall of the stand-alone private space enclosure. FIGS. 4 and 5 show the increased exterior visibility of a user sitting or standing at a desk within the stand-alone private space enclosure 10. The user sitting or standing in interior volume of the stand-alone private space enclosure can view outwardly at angle A. This helps to prevent someone from outside the stand-alone private space enclosure from entering the stand-alone private space enclosure without the user of the stand-alone private space enclosure being aware of the outsider's potential entry into the stand-alone private space enclosure making the stand-alone private space enclosure safer than other devices not constructed with the user having this broad range of vision from within while in use. The angle A is typically from 100 to about 120 degrees. In other embodiments such as shown in FIG. 63, the entire front panel 20 may be the door 24. In another embodiment as shown in FIG. 64, the door 24 may be inset into the front wall 20. In any case, the door glass may be made of a single pane of plexiglass, or in other embodiments may comprise a first or inside pane of plexiglass and a second or outside pane of plexiglass. The double pane plexiglass may provide better sound insulation from the interior of the stand-alone private space enclosure. As discussed above the glass may be an electrochromic glass material in whole or in part as well. Additionally, the plexiglass material may create a permanent state for the "glass" door regarding the level of transparency or the lack thereof such that the transparency level is not dynamic or user adjustable, which would be the case when the glass is electrochromic or when the glass has at least one coating that is an electrically activated privacy film on or within the glass. When used, the electric privacy film typically contains liquid crystals that align to an applied electric field, creating transparency (on state). When the electric field is removed the liquid crystals scatter the light making the glass to appear opaque (off state). Of course, the glass may be naturally frosted, patterned (such as with the logo of the owner of the stand-alone private space enclosure), bubbled, a raindrop effect, ribbed or reeded. While the door may be opaque, it is typically translucent and more typically at least substantially transparent or transparent such that the occupancy of the stand-alone private space enclosure 10 is evident without opening the door. The glass or material used for the door could conceivably also be electrochromic and change the transparency to tint the material based on a condition or time of day or other factor or factors. The door may also include a built-in door retractor that automatically pulls the door shut when there is not an external force keeping it open. The door retractor is typically mounted within the door facing perimeter edge of the ceiling of the stand-alone private space enclosure and is a gas powered spring biased force applicator to pull the door closed. The door retractor is typically not visible by a user during use and is connected to the door via a metal rod linkage that is typically flat with a fastener engaging the end of the door retractor and a traversing retainer that traverses within a track within the top perimeter edge of the door between an open and closed position. Some additional examples of suitable retracting mechanisms include cable retractors and door closers, and may depend on whether the door takes up only a single side or is a panoramic door. The retractor may further include the ability to be locked into place while it is fully or partially opened thereby maintaining the door in a given position selected by the user.

Within the stand-alone private space enclosure 10 may be a moveable workstation assembly 30. The moveable workstation assembly 30 may include a desk 32 and a monitor 34 for a user to work using an onboard computer (described in more detail below) or the user's own laptop 38. The monitor of the moveable workstation assembly 30 may be a size of between 12 inches and 42 inches in diameter, but could conceivably be larger if the frame were to be strengthened. The moveable workstation assembly 30 typically also includes a camera 84 that is typically a camera module for video or still image capturing, at least one speaker, and at least one microphone module. The at least one speaker may be located within the same assembly as the microphone module 78 or along one or more perimeter surfaces of the moveable workstation assembly 30 that extend away from the left side wall 14. It is possible to use the microphone and/or speakers of the user's own computing device such as a laptop or IPAD® either alone or in conjunction with the audio video systems of the stand-alone private space enclosure of the present disclosure.

Figures 26, 27, 28:
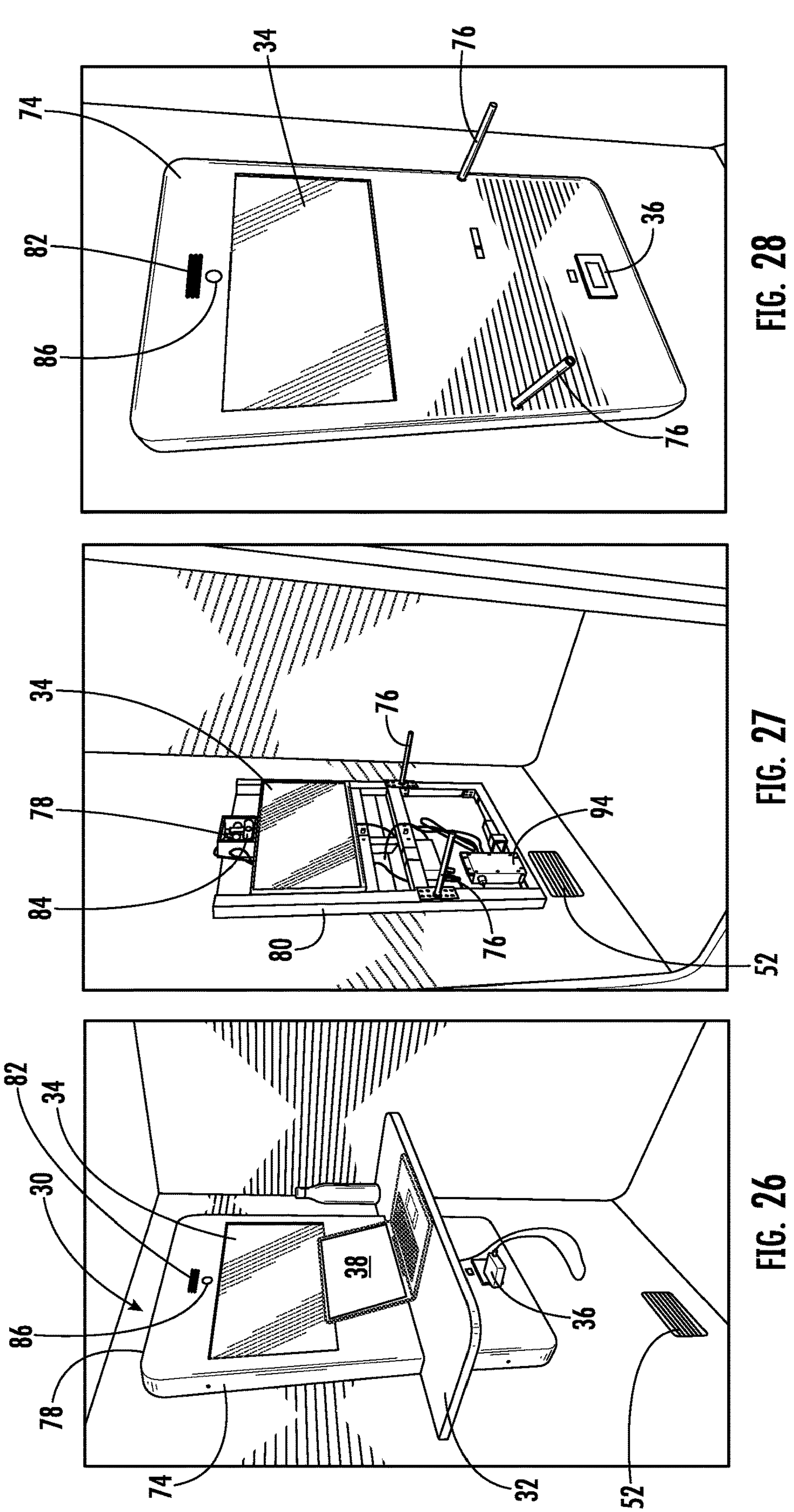
FIG. 26 is an interior perspective view of the workstation of a stand-alone private space enclosure according to an aspect of the present disclosure.
FIG. 27 is an interior perspective view of the workstation of a stand-alone private space enclosure according to an aspect of the present disclosure with the cover/façade and the desktop removed to show the interior mechanical and electrical systems of the workstation.
FIG. 28 is an interior perspective view of a unified integrated moveable workstation of a stand-alone private space enclosure with the desktop removed to show exemplary attachment rods of the workstation for the desktop according to an aspect of the present disclosure.

An electrical outlet 36 or a plurality of electrical outlets may be provided to provide the necessary electrical power to run a laptop, charge a phone or other personal device(s), or any other device for which a user needs AC electrical power. The outlet may be placed in any convenient location on the cover/façade 74 or on an interior facing surface of a wall of the stand-alone private space enclosure for a user to plug in their electrical equipment. In FIG. 26, the electrical outlet 36 is located below the desk 32 in the middle of the cover/façade 74, which is also a façade over the interior components and open portion in the side wall 14, although it could be placed anywhere convenient. The cover/façade 74 is typically a covering that encases the main audio and video components as well as the other electrical and mechanical systems that allows the entire audio, video and desk assembly to traverse from a lowered position to an upper position and any location therebetween. As shown in FIG. 63, the electrical outlet includes a Universal Serial Bus (USB) outlet **36*a* and a standard 120V outlet 36*b* on the side of the cover/façade 74. It should be known that any combination of standard and USB-A, USB-B, and USB-C outlets could be placed on the cover/façade 74 or the side wall 22 that is convenient for a user to attach power cords. For wireless charging needs, a wireless charger 36*c* (see FIGS. 30-31**) such as a Qi certified charger may be placed on the desk in a convenient position to charge certain personal portable electronics that support such charging.

Figures 6, 7:
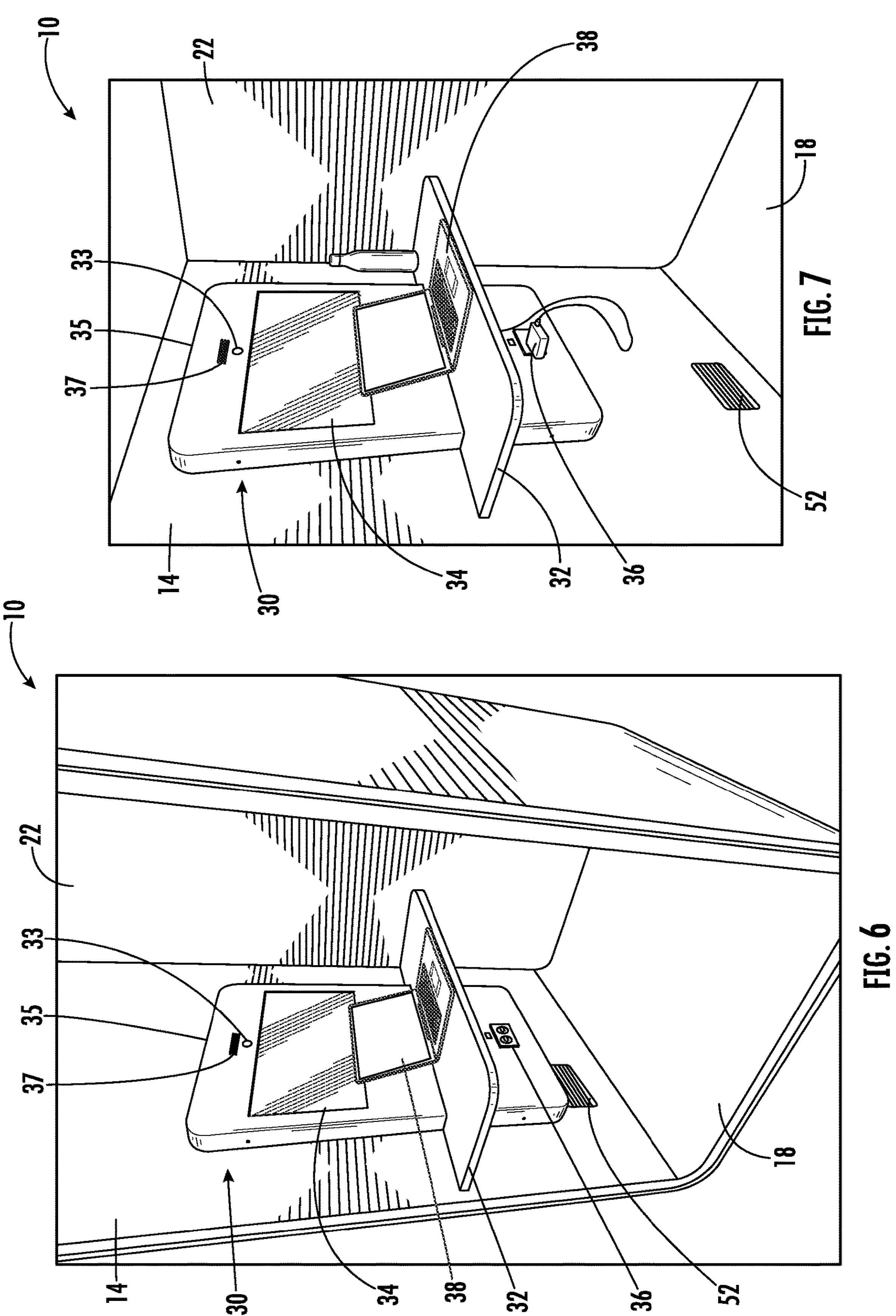
FIG. 6 is an internal view showing the desktop of a stand-alone private space enclosure according to an aspect of the present disclosure in a lower position.
FIG. 7 is an internal view showing the desktop of a stand-alone private space enclosure according to an aspect of the present disclosure in an upper position that is higher than the lower position shown in FIG. 6.
Figure 12:
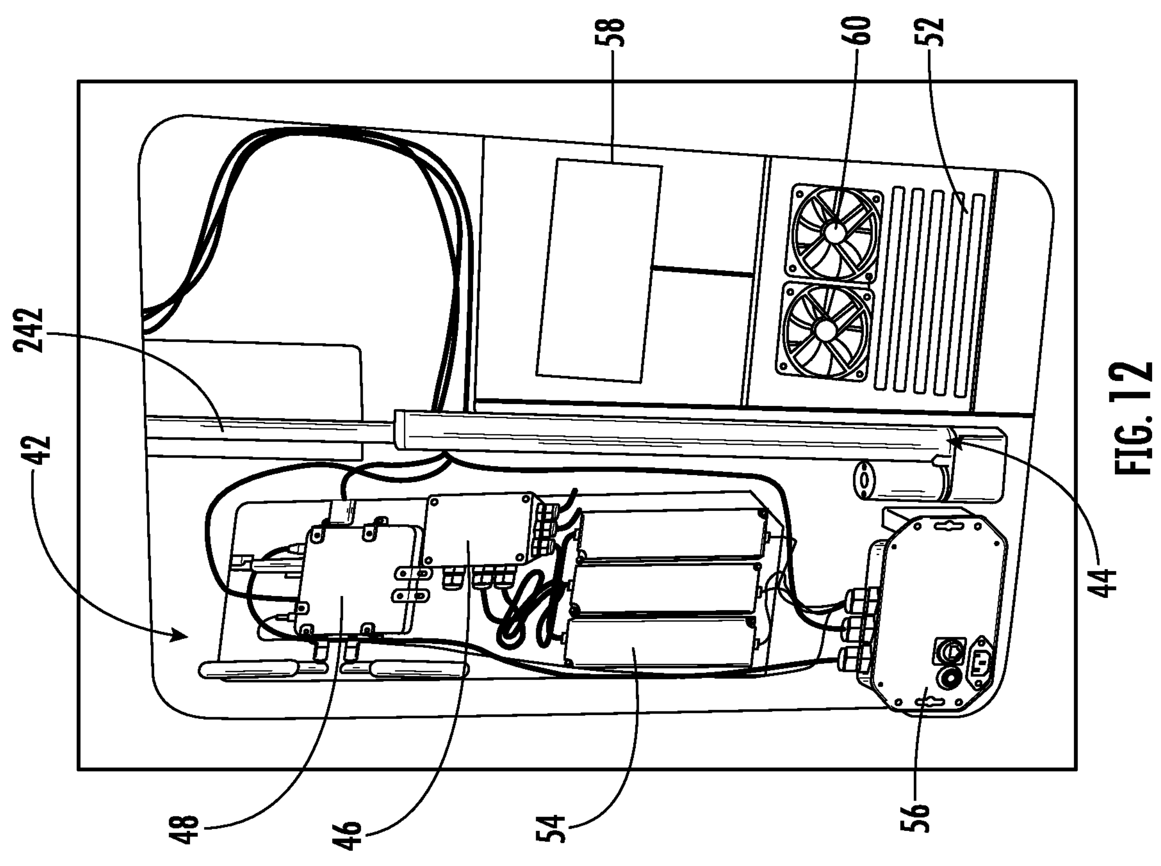
FIG. 12 is a perspective view of the exterior of the first side wall of a stand-alone private space enclosure according to an aspect of the present disclosure with the panel removed showing the internal mechanical and electrical systems of a wall carrying the movable desk and display system of the stand-alone private space enclosure.
Figure 11:
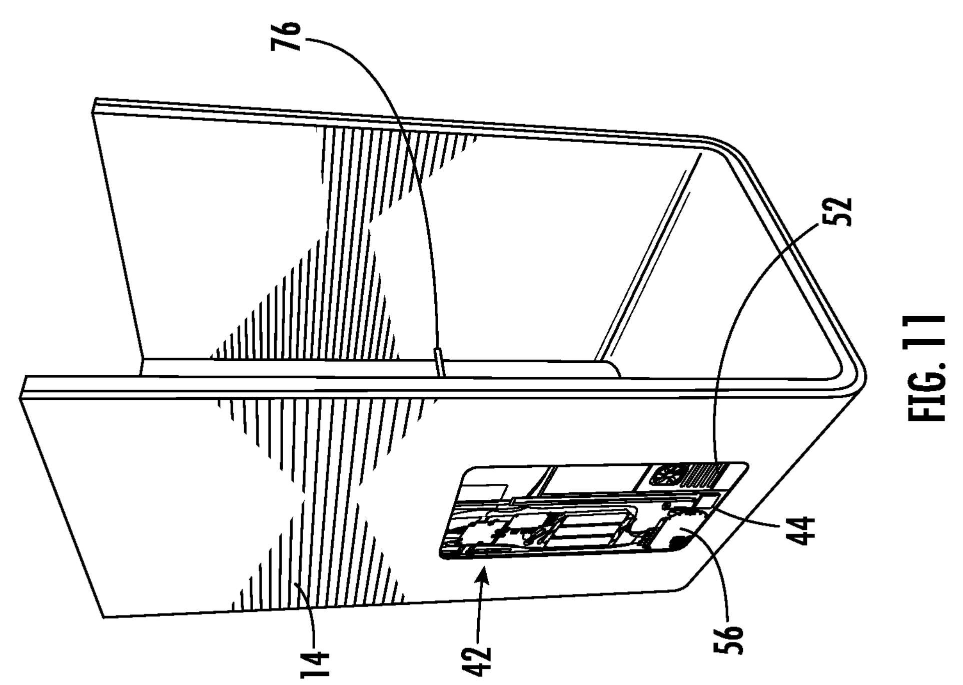
FIG. 11 is an isometric perspective view of a stand-alone private space enclosure according to an aspect of the present disclosure including the first side wall, second side wall, rear wall, and floor, with the panel removed from the first side wall.

The moveable workstation assembly 30 may be moveable from a lower position as shown in FIG. 6 that is typically used when the user is in a seated position using the stand-alone private space enclosure to an upper position as shown in FIG. 7, which is typically used when the user is using the stand-alone private space enclosure in a standing position. The complete adjustability of the moveable workstation assembly such that it may be securely held against at least 200 pounds and up to about 400 pounds of downward pressure on the desk at any position between the lowest and the highest position, which typically range such that the bottom edge of the moveable workstation assembly is positioned from about 28½ inches from the floor of the enclosure to about 50 inches from the floor of the enclosure, allows for a user to stand within the stand-alone private space enclosure 10 at the desk 32 no matter their height, or use a chair and sit within the stand-alone private space enclosure 10. There may also be a register 52 near the bottom of the interior of the left-side wall 14 that allows fresh air into the interior of the stand-alone private space enclosure 10.

Figures 13, 14:
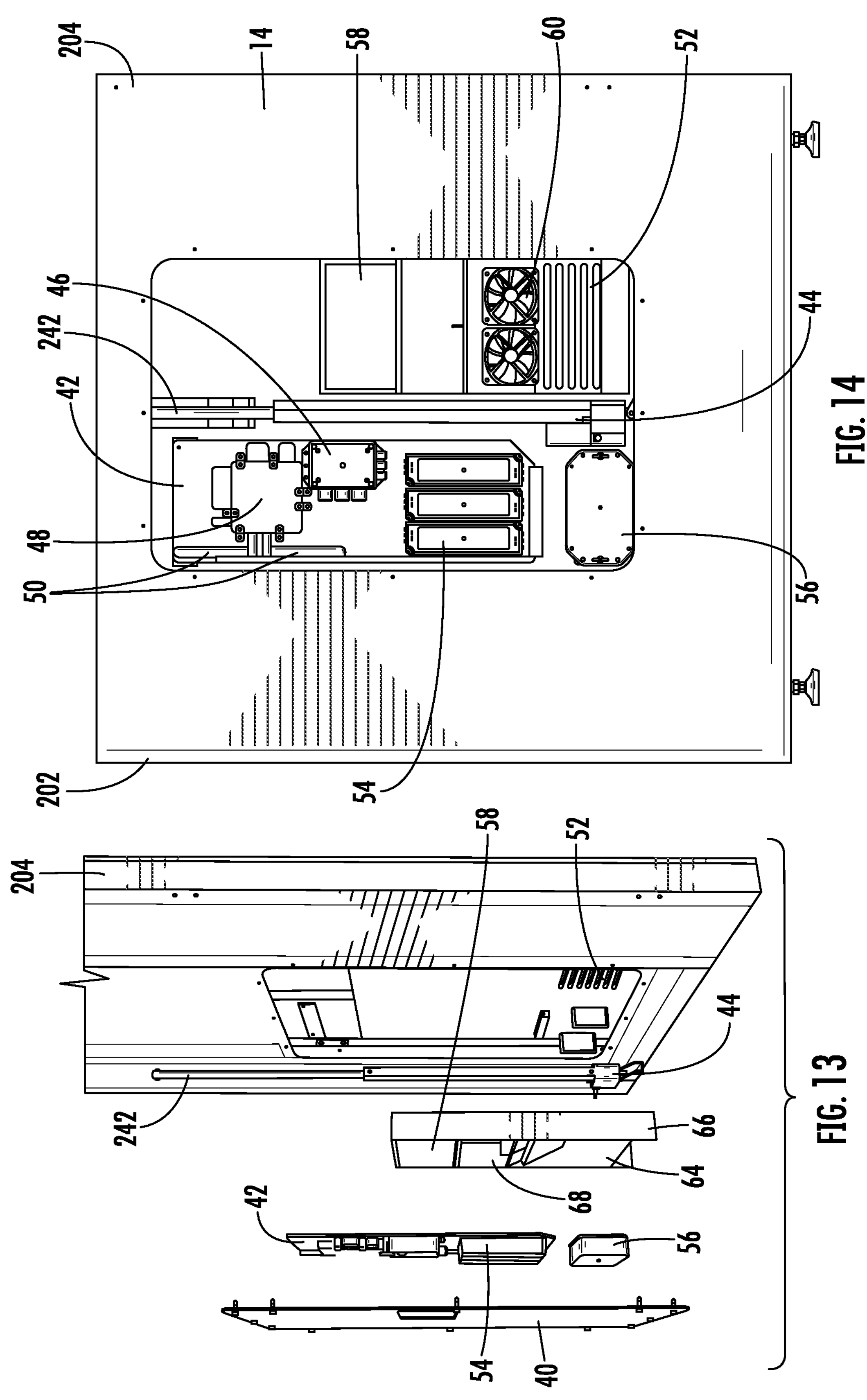
FIG. 13 is a perspective exploded view of the internal mechanical and electrical systems of the first side wall of a stand-alone private space enclosure according to an aspect of the present disclosure.
FIG. 14 is another side view of the first side wall of a stand-alone private space enclosure according to an aspect of the present disclosure showing the panel removed and the leveling feet.
Figure 16:
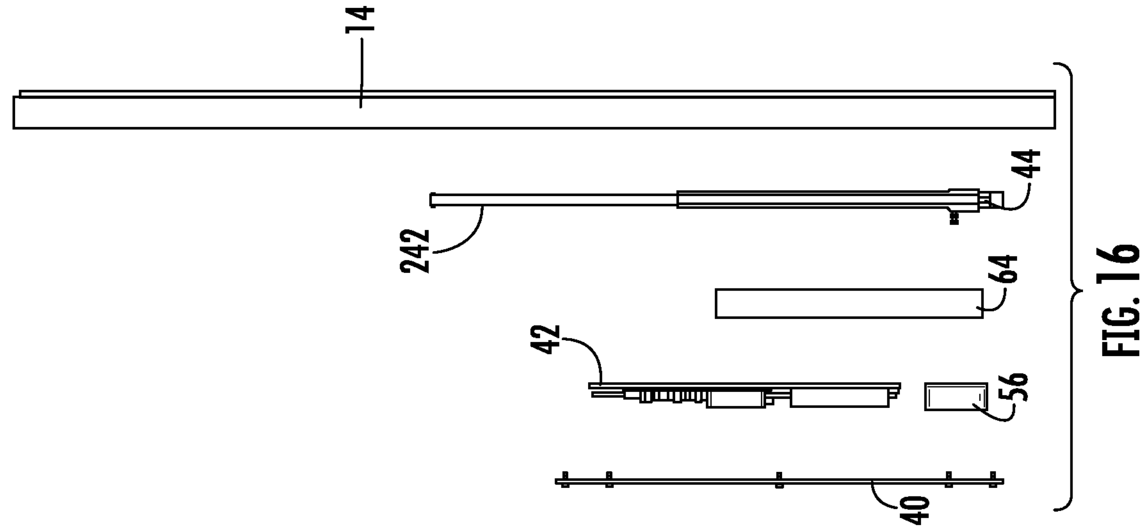
FIG. 16 is a front exploded view of the internal mechanical and electrical systems of the first side wall of a stand-alone private space enclosure according to an aspect of the present disclosure.
Figure 15:
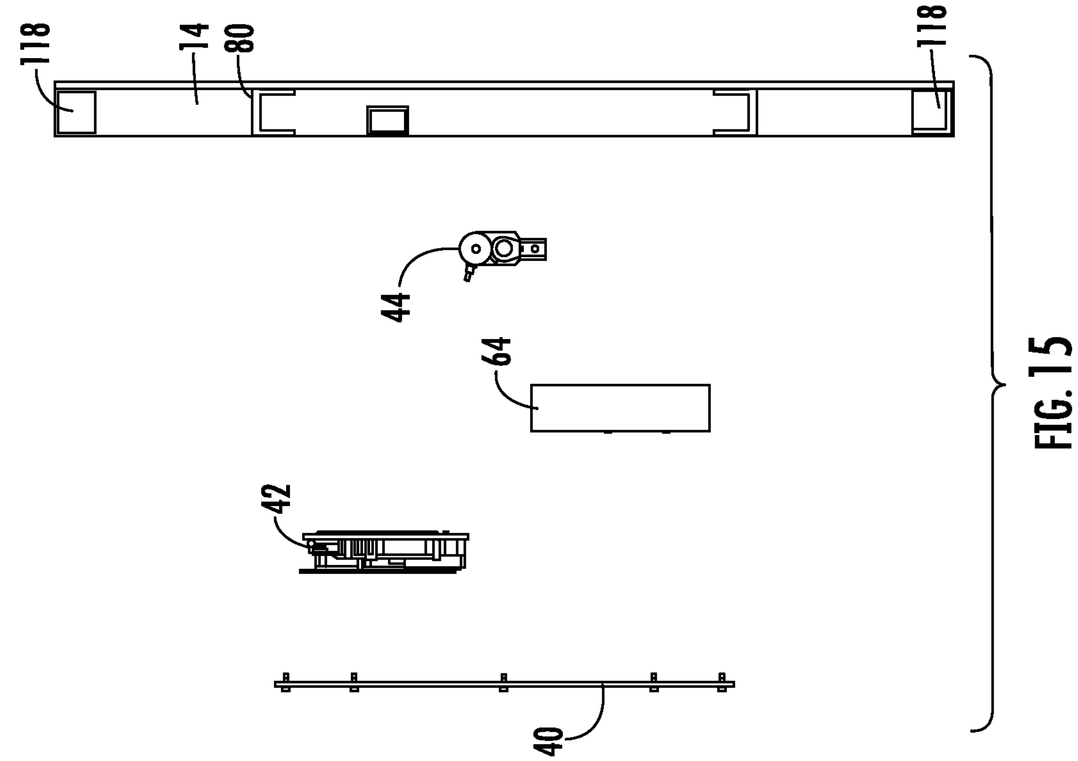
FIG. 15 is a top exploded view of the internal mechanical and electrical systems of the first side wall of a stand-alone private space enclosure according to an aspect of the present disclosure.
Figure 17:
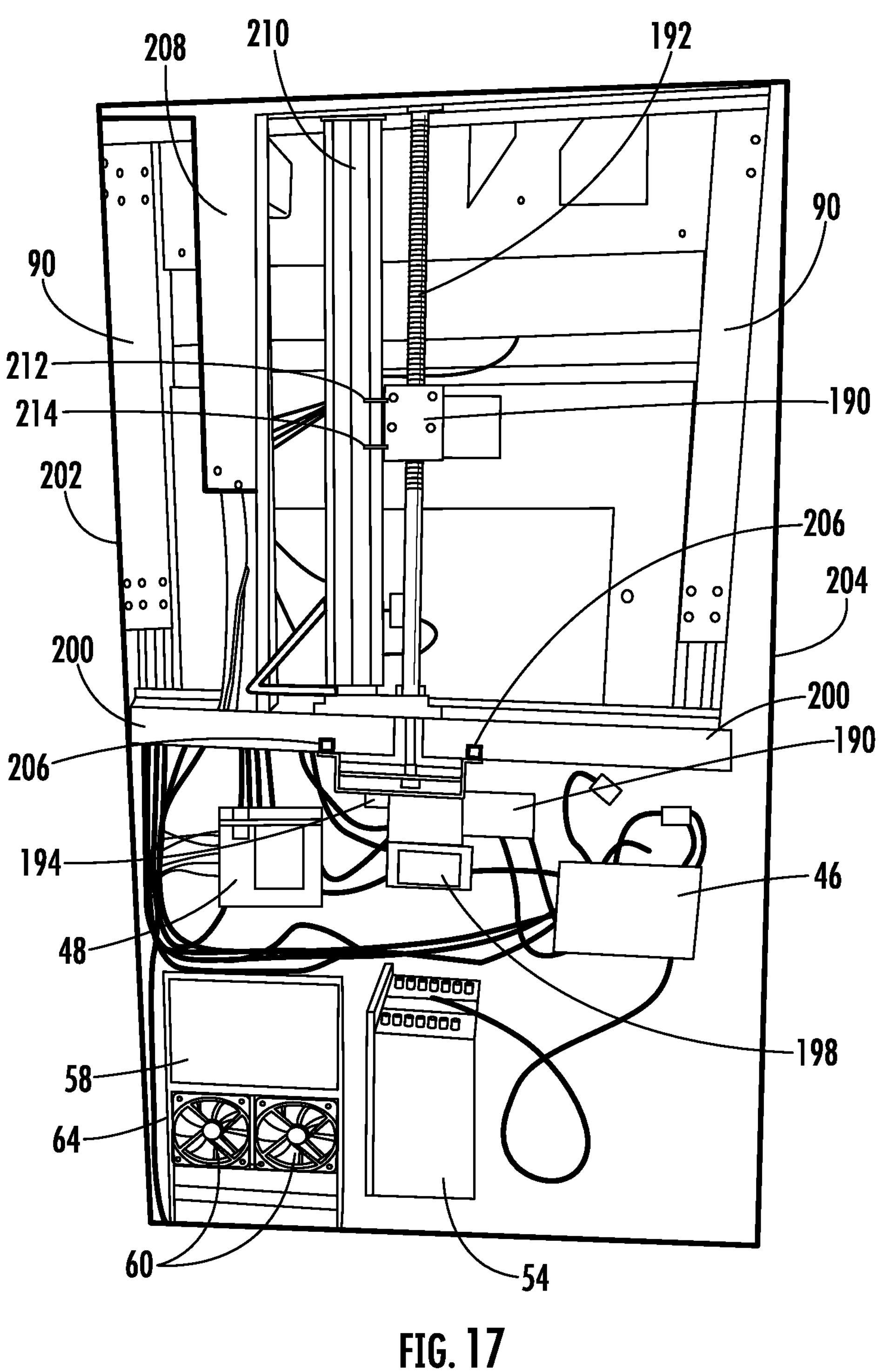
FIG. 17 is a perspective view of the exterior of the first side wall of a stand-alone private space enclosure according to an aspect of the present disclosure with the panel removed showing alternative internal mechanical and electrical systems including a screw stepper motor system.
Figure 18:
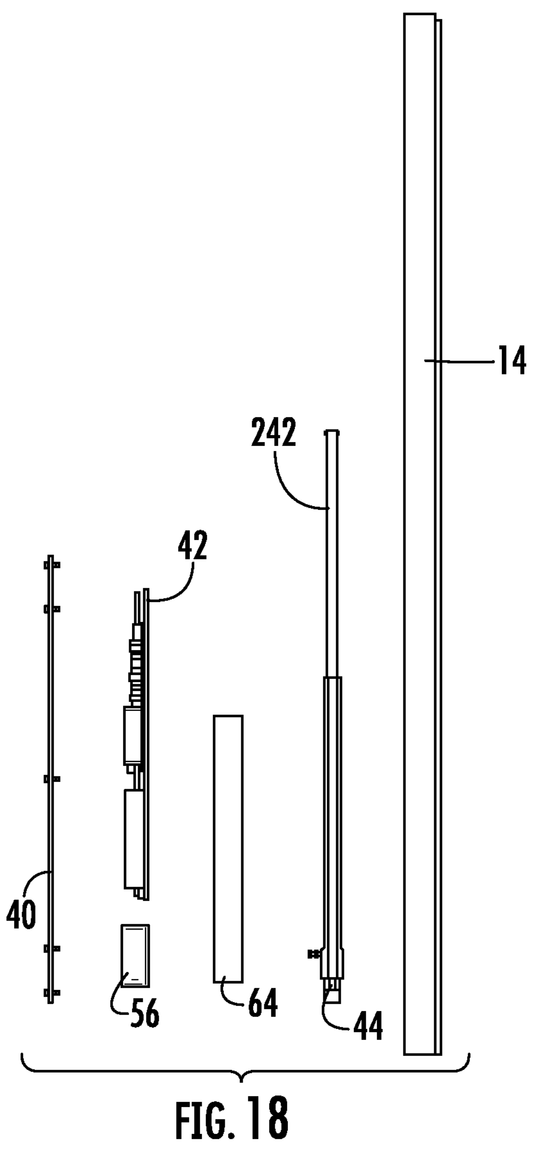
FIG. 18 is a front exploded view of the internal mechanical and electrical systems of the first side wall of a stand-alone private space enclosure according to an aspect of the present disclosure.

As shown in FIGS. 8-18, the rear wall 22 may include a removable panel 40 or door having a hinged side and a handle that may be secured with a lock to provide easy access to the mechanics of the movable desk and the on-board computer or electrical panel 42 (See FIG. 9) by hand and without the use of tools without removal of the entire outwardly facing surface of the side wall. The mechanics of the movable desk include an actuator 44 that is typically anchored in the side panel 22 on the bottom according to one embodiment of the present disclosure as shown in FIGS. 15-16, and 18 and is coupled to the moveable workstation assembly 30 at the top end. In this embodiment the actuator is a linear actuator with an 18 inch stroke and 150 lbs of force rated such as the feedback linear actuator model P-14P-18-150 available from Progressive Automations located at 6015 180th Street, NE, Suite 103 in Arlington, Washington, 98223. The retracted hole-to-hole length should be about 23 inches and the extended hole-to-hole length should be about 42 inches. The actuator of this embodiment can move at a rate of from about 0.3 inches per second to about 1.4 inches per second under a full load and from about 0.3 inches per second to about 2 inches per second under no load. The current under full load is 5 Amps and no load is 1 Amp. The linear actuator has an operating noise of 45 decibels or less. The actuator 44 is able to move vertically which allows a user to locate the moveable workstation assembly 30 at a height that is most efficient for them whether sitting or standing at the moveable workstation assembly 30.

Alternatively, the actuator may be a screw stepper motor system that is mounted to a support that is proximate the center of the side wall as discussed in more detail herein and shown in FIG. 17. In a currently preferred embodiment shown in FIG. 17, the actuator is a combination of a screw stepper motor 190, a screw stepper drive shaft 192, a potentiometer 194, and a moveable workstation assembly mounting bracket 196. The systems of this embodiment also typically employ an additional power supply, a display power supply 198, which serves to supply constant and stable power to the display of the moveable workstation assembly 30. The screw stepper motor 190 is typically mounted to the downward facing surface of a horizontally positioned actuator mounting frame 200 that extends across the width of the side wall 14 from one upwardly extending support 202 to an opposite upwardly extending support 204 along each vertically oriented side of the side wall 14. The horizontally positioned actuator mounting frame is typically spot welded to each of the upwardly extending support 202 and the opposite upwardly extending support 204, but could be bolted and otherwise fastened to engaged the components, but this would typically not be as strong and would add labor costs as well and therefore is not typically employed.

In this embodiment of the stand-alone private space enclosure of the present disclosure, a cable chain mounting frame 208 may extend downward from the top of the side wall. It typically extends downward about 50-75% of the distance to the horizontally positioned actuator mounting frame 200. The cable chain is mounted to the interior side of the cable chain mounting frame and carries the electrical and signaling cables and cords to ensure they are prevented from undue wear and possible deterioration during use beyond typical wear and tear on the cabling. This helps prevent the computer or electrical or other wiring from being severed when the overall moveable workspace assembly 30 moves between positions upward and downward. Additionally, the stand-alone private space enclosure according to this embodiment of the actuator system of the present disclosure further includes a stationary stability mounting frame 210 that extends from the top of the side wall 14 to the top surface of the horizontally positioned actuator mounting frame 200. The stationary stability mounting frame 210 is typically secured by a weld, but could also be fastened to secure the stationary stability mounting frame 210 into position. The stationary stability mounting frame 210 serves two primary functions. One, it provides overall stability to the entire side wall 14 preventing the metal of the side wall from deforming especially if a high amount of force is regularly applied to the desk of the moveable workstation assembly 30 during use. Second, the stationary stability mounting frame 210 has two push button switches, one located proximate the top and one located proximate the bottom that are triggered or otherwise activated when the top switch lever 212 hits the push button switch proximate the top of the stationary stability mounting frame 210 or the bottom switch lever 214 engages the push button switch proximate the bottom of the stationary stability mounting frame 210.

Surprisingly, the screw motor has increased speed and efficiency over other variants of the actuator such as a pneumatic actuator or other piston type actuators. The screw stepper motor 190 is typically mounted using a plurality of fasteners such as metal screws or bolts that traverse an outwardly extending flange on each side of the screw stepper motor 190 at locations 206. The actuator systems shown in FIG. 17 can raise or lower the entire moveable workstation assembly at speeds 0.91 inches per second under a full load and under no load at speeds of about 1.03 inches per second whereas other design, while useful and capable of holding the weight/withstanding forces applied to the desk and therefore the overall moveable workstation assembly, do not move as quickly between positions and typically do so at a speed of up to about 0.37 inches per second under no load and about 0.28 inches per second under a full load. Nevertheless, all of the actuator systems and described herein are considered within the scope of the present disclosure.

The electrical panel 42 may include various elements that are integrally provided with the stand-alone private space enclosure 10. The elements that may be included are a CPU 48 and its attached wireless antennas 50, a microcontroller 46, and LED power supplies 54. An input/output (or IO) box 56 (a power junction box that houses one or more electrical wiring connections of the stand-alone private space enclosure) is electrically coupled to an external source of power (such as a 120V household power supply) and ethernet for Internet capability. The IO unit or input/output box 56 supplies the power necessary to drive the computer, lighting, fans, and any other user power necessary and plugged into the electrical outlet 36.

Figure 21:
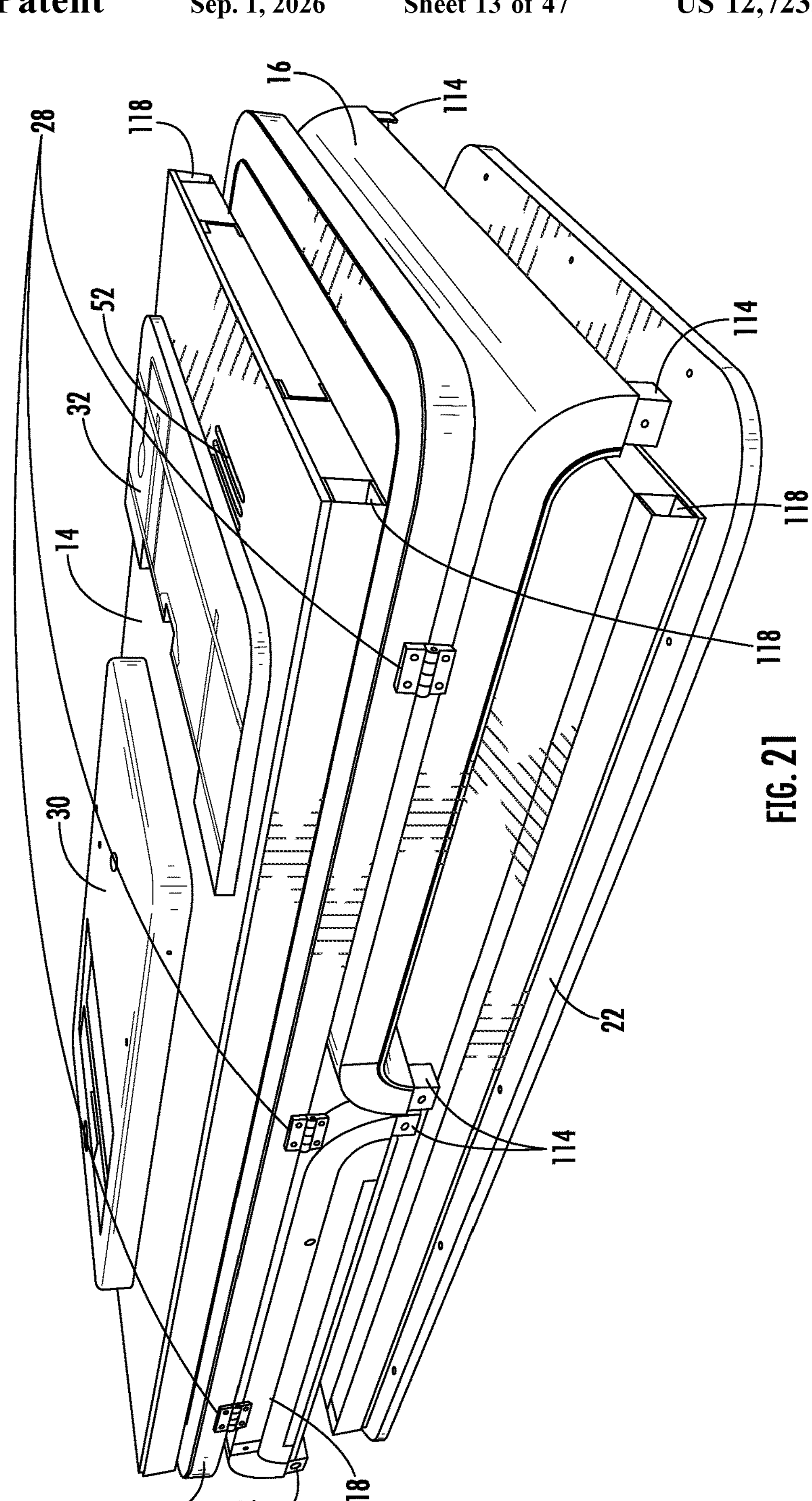
FIG. 21 is an isometric perspective view of a stand-alone private space enclosure according to an aspect of the present disclosure in a disassembled and efficiently and substantially flat/substantially planar packaged state for transportation to a remote location, typically a remote location from the place of original manufacture. This configuration allows for the overall stand-alone private space enclosure to be crated or otherwise packaged and shipped without substantial risk of damage and lowering shipping volume and therefore shipping costs.
Figure 22:
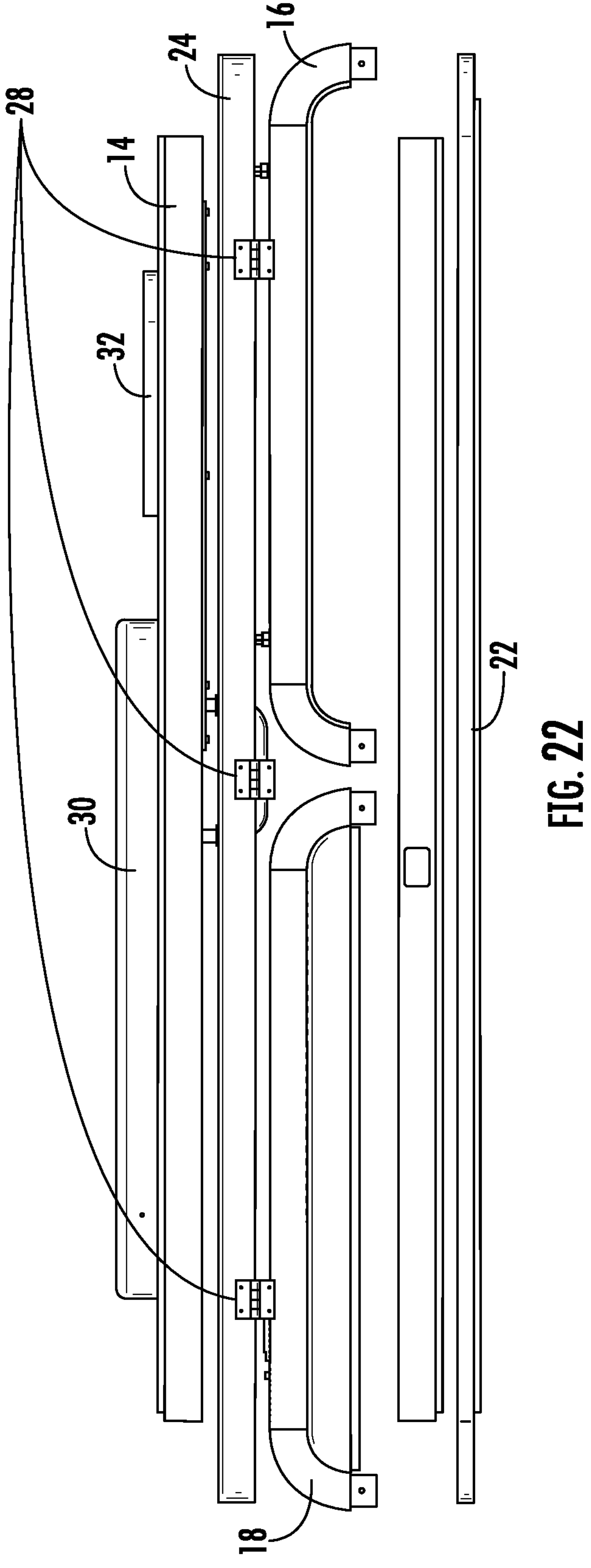
FIG. 22 is a front view of a stand-alone private space enclosure according to an aspect of the present disclosure in a disassembled and efficiently packaged state for transportation.

As shown in FIGS. 21 and 22, the stand-alone private space enclosure 10 may be originally packaged or broken down and packaged in a planar fashion and tightly/efficiently for ease of transport and delivery and also lower cost of transport and delivery by providing a crated or otherwise packaged system that take up substantially less volume than an assembled or partially assembled unit. The overall volume of the crated system will fit vertically on a standard pallet and may be packaged such that the overall dimensions of the crated product are about 1000 mm in length by 1300 mm in depth by 2200 mm in height. As shown in FIGS. 21-22, the second or left side wall 14 is typically placed on top with the moveable workstation assembly 30 and desk 32 attached to the left side wall 14. The front wall 24 may be placed below the workstation left side wall 14, and the top and bottom walls 16, 18 below the front wall. Finally, the rear wall 22 may be placed on the bottom of the stack and provides support for the other components during placement prior to packaging for shipment. These panels are stacked such that they can be packaged as efficiently as possible to lower costs and for ease of transport after an initial installation, if transport becomes necessary to another location where the stand-alone private space enclosure will be located such as when a company relocates or conceivably an individual moves the location of their residence if used within a residential location such as a home, apartment or condominium.

As shown in FIGS. 23-25, an embodiment of a stand-alone private space enclosure of the present disclosure, typically stand-alone private space enclosures used in the commercial environment whether accessible to the public generally or not, may include a manual or an electronic lock device 70 located on the front wall with a latch or multiple latches 72 reaching into a catch within the door 24, preventing the door 24 from being opened until it is authorized. That authorization may include an electronic payment or verified subscription, a reservation confirmation, or any other electronic authorization method. When the proper authorization is obtained from a user, the latch 72 slides out of the catch in the door 24, which allows the door to be opened by the user. A signal may convey the authorization from a user's mobile computing device via a wireless signal such as a cellular or BLUETOOTH® signal to actuate the lock into a disengaged position. This authorization does not necessarily require payment to gain access to the stand-alone private space enclosure, but could be instead based on permissions within a company who owns the stand-alone private space enclosure being accessed.

Figures 29, 30:
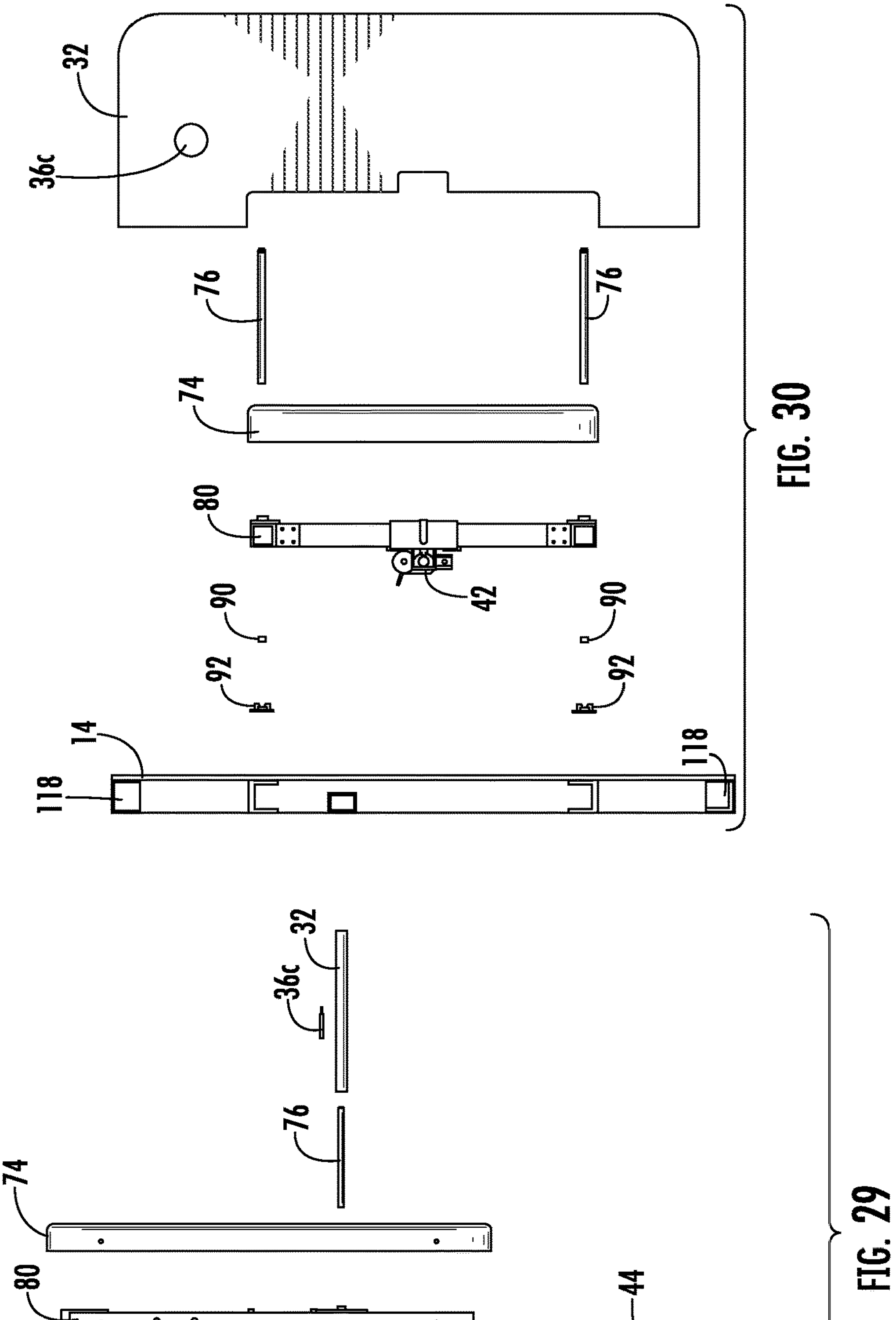
FIG. 29 is a front exploded view of the mechanical and electrical systems of a unified integrated moveable workstation of a stand-alone private space enclosure according to an aspect of the present disclosure.
FIG. 30 is a top exploded view of the mechanical and electrical systems of a unified integrated moveable workstation of a stand-alone private space enclosure according to an aspect of the present disclosure.
Figure 31:
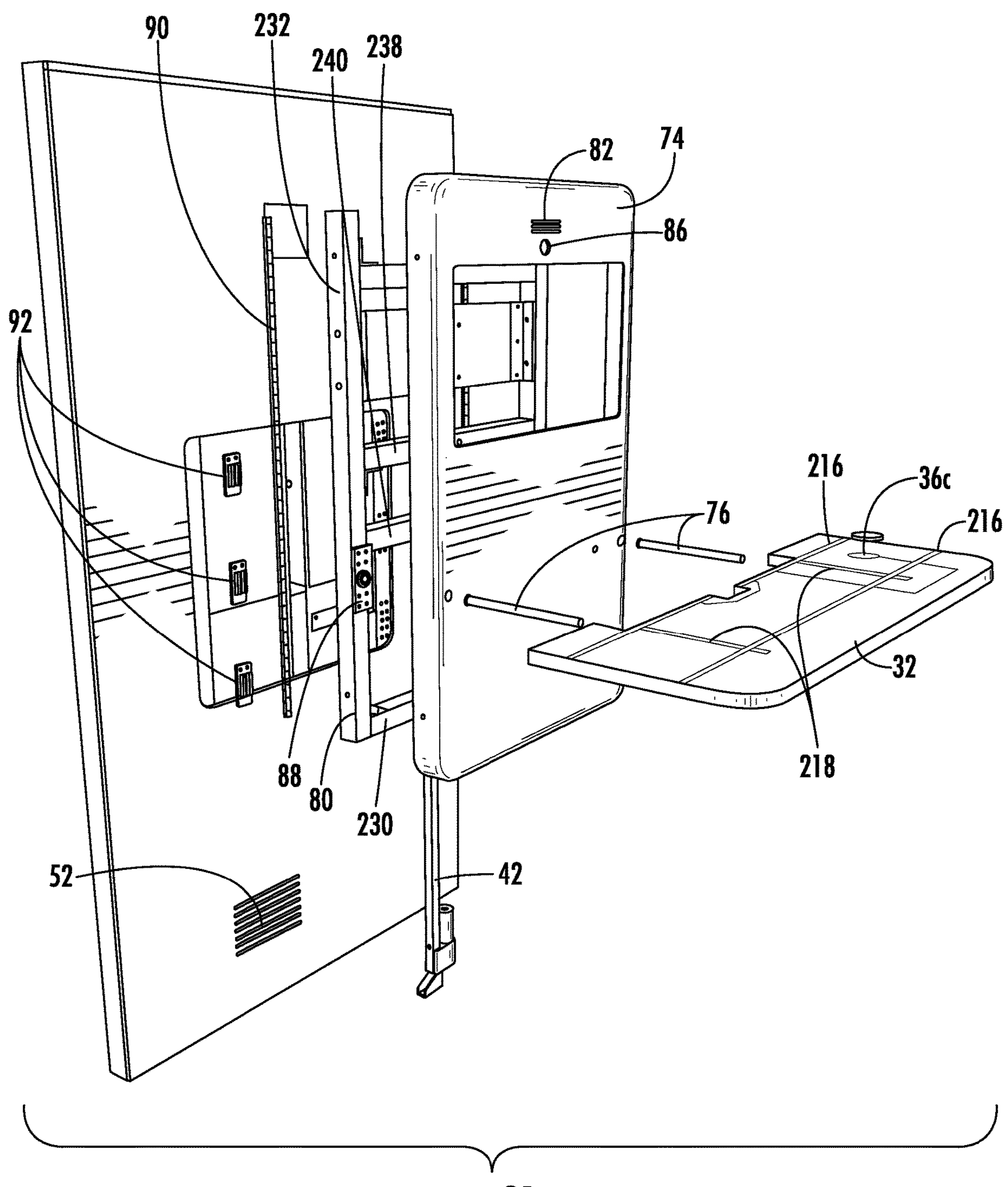
FIG. 31 is a perspective exploded view of the mechanical and electrical systems of a unified integrated moveable workstation of a stand-alone private space enclosure according to an aspect of the present disclosure.
Figures 32, 33, 34:
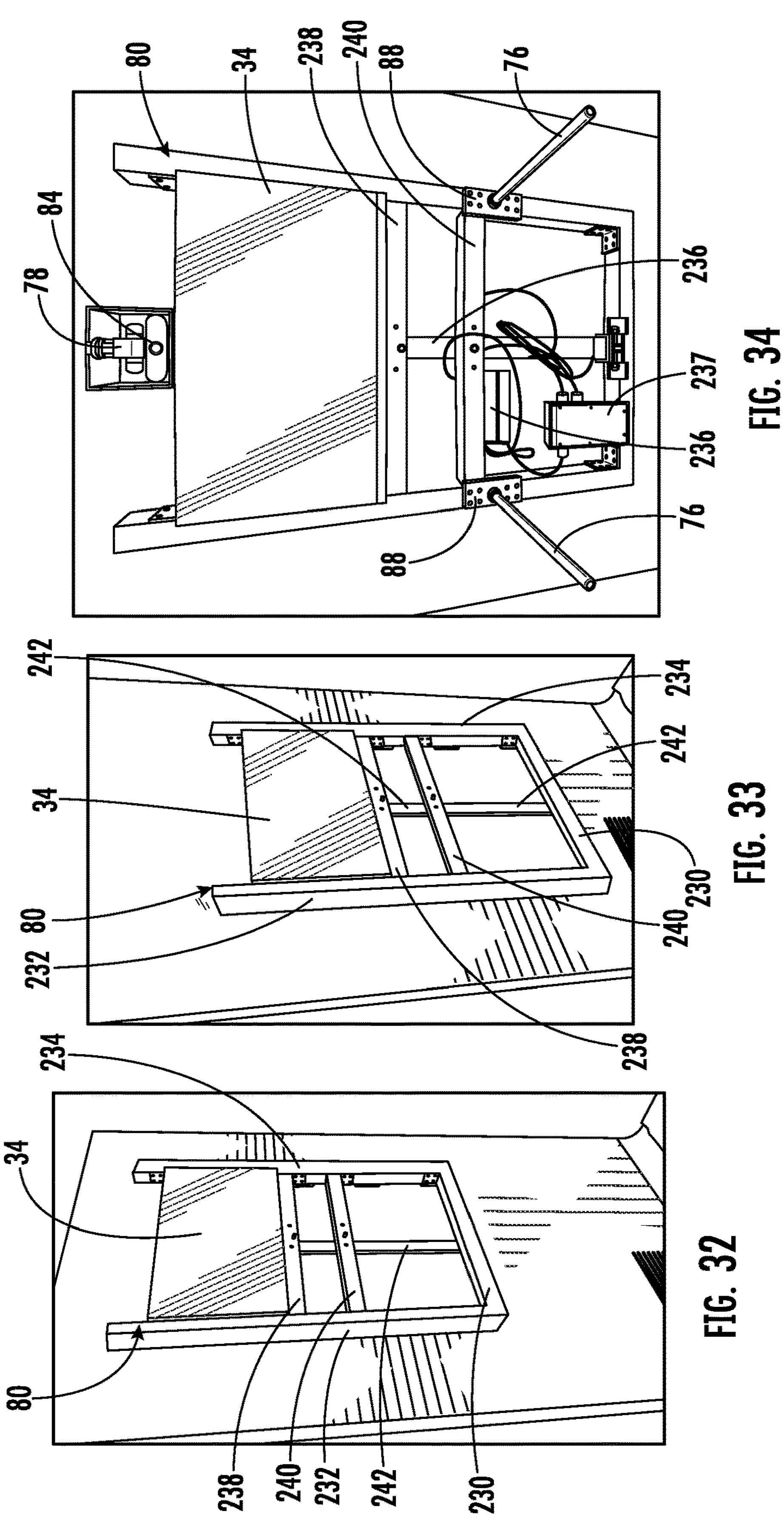
FIG. 32 is an interior perspective view of the frame of a unified integrated moveable workstation of a stand-alone private space enclosure according to an aspect of the present disclosure in the upper position.
FIG. 33 is an interior perspective view of the frame of a unified integrated moveable workstation of a stand-alone private space enclosure according to an aspect of the present disclosure in the lower position.
FIG. 34 is an interior perspective view of the frame that carries a unified integrated moveable workstation of a stand-alone private space enclosure according to an aspect of the present disclosure including the camera and the desktop attachment rods with the desk removed from the rods.
Figures 35, 36, 37:
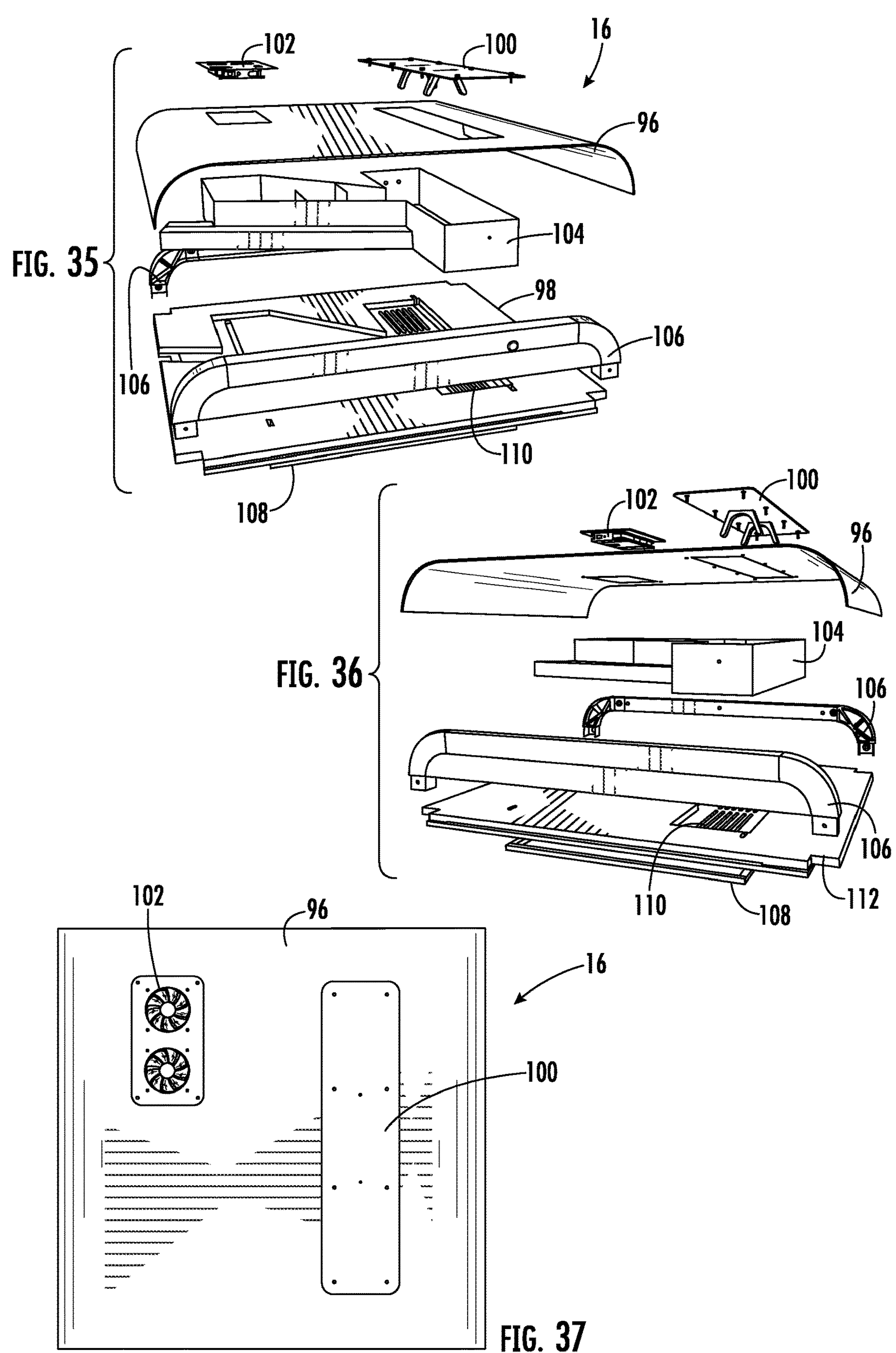
FIG. 35 is a front perspective exploded view of the top wall, the air circulation system, and the lighting panel of a stand-alone private space enclosure according to an aspect of the present disclosure.
FIG. 36 is a side perspective exploded view of the top wall, the air circulation system, and the lighting panel of a stand-alone private space enclosure according to an aspect of the present disclosure.
FIG. 37 is a top view of the top wall of a stand-alone private space enclosure according to an aspect of the present disclosure.
Figures 38, 39, 40:
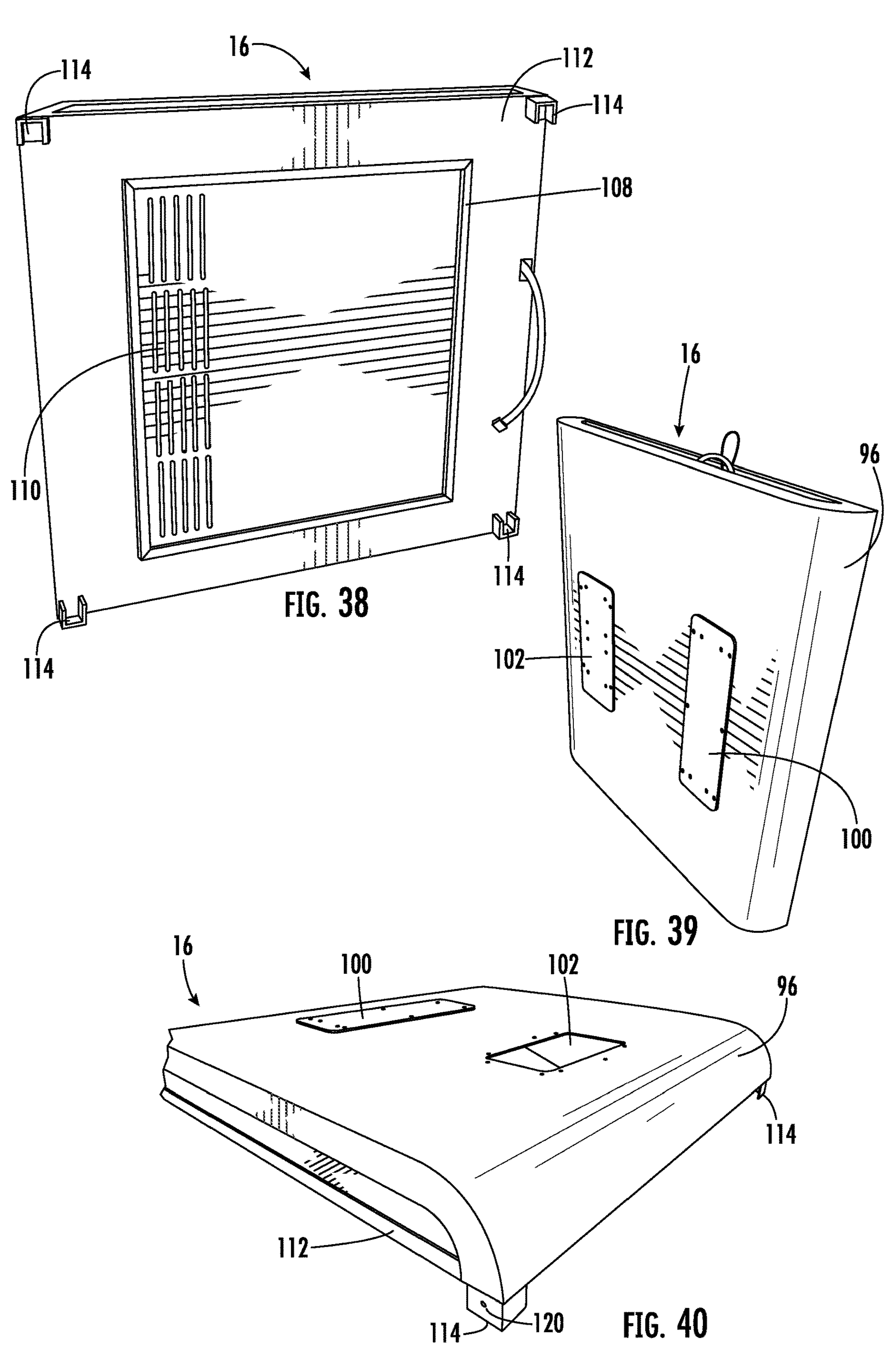
FIG. 38 is a bottom perspective view of the top wall of a stand-alone private space enclosure according to an aspect of the present disclosure showing the air circulation register and the internal lighting.
FIG. 39 is a top perspective view of the top wall of a stand-alone private space enclosure according to an aspect of the present disclosure with the access panels in place and covering the electrical and mechanical systems.
FIG. 40 is a perspective view of the top wall of a stand-alone private space enclosure according to an aspect of the present disclosure with the access panels in place and showing the attachment legs to the supporting walls.
Figure 41:
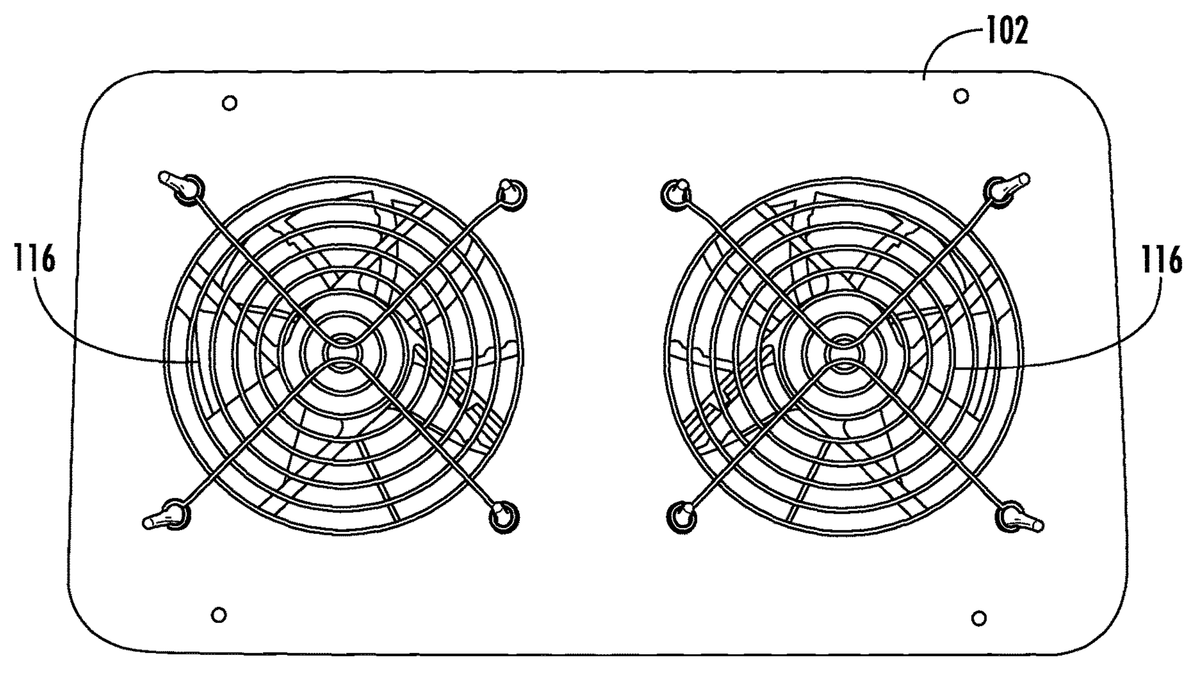
FIG. 41 is a top view of the fans of the air circulation system of a stand-alone private space enclosure according to an aspect of the present disclosure.
Figure 42:
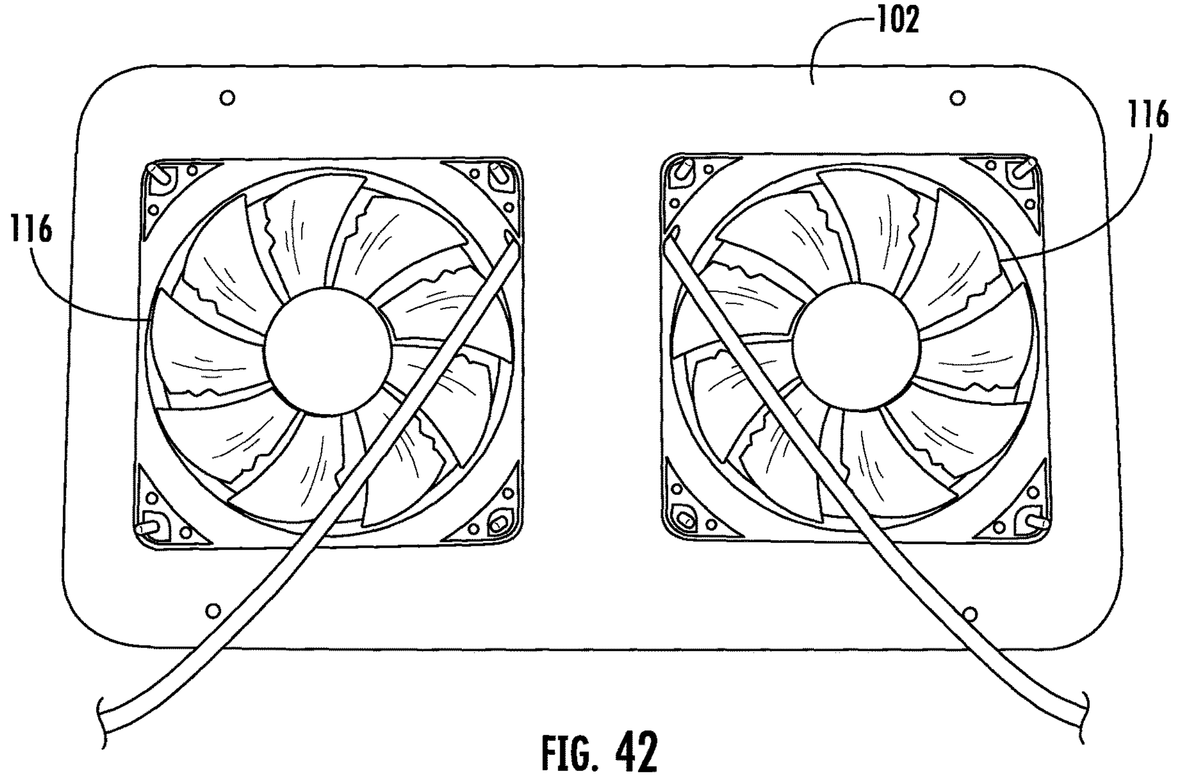
FIG. 42 is a bottom view of the fans of the air circulation system of a stand-alone private space enclosure according to an aspect of the present disclosure.
Figures 43, 44, 45:
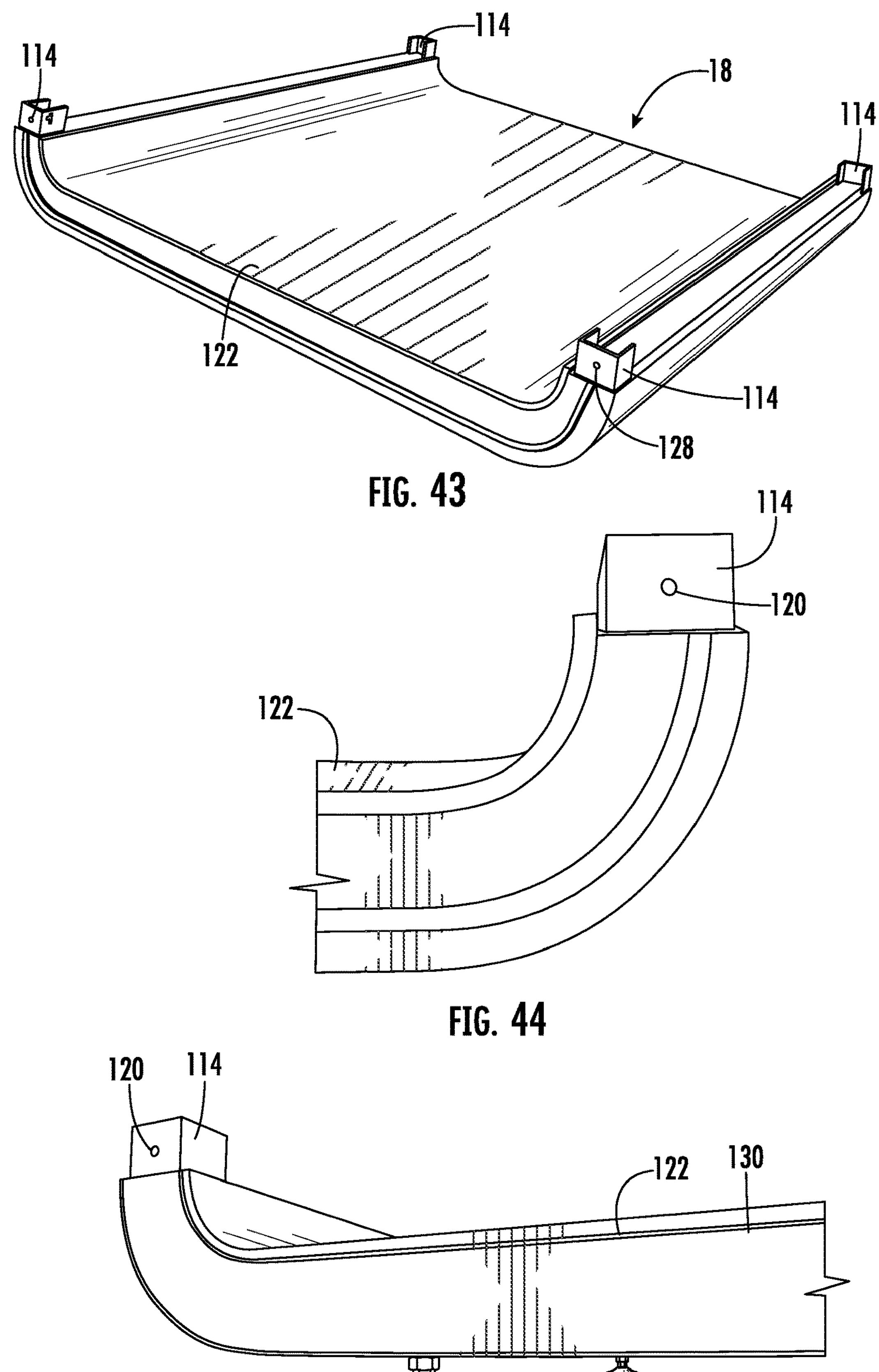
FIG. 43 is a perspective view of the floor panel of a stand-alone private space enclosure according to an aspect of the present disclosure showing the upwardly extending attachment legs of the floor segment that engage with the supporting walls.
FIG. 44 is a cutaway view of a bottom right corner of the floor panel of a stand-alone private space enclosure according to an aspect of the present disclosure showing an upwardly extending attachment leg that engage with the supporting walls.
FIG. 45 is a perspective view of the sides of the floor panel of a stand-alone private space enclosure according to an aspect of the present disclosure showing a bottom left corner of the floor and an upwardly extending attachment leg to the supporting walls and two of the leveling feet.
Figure 46:
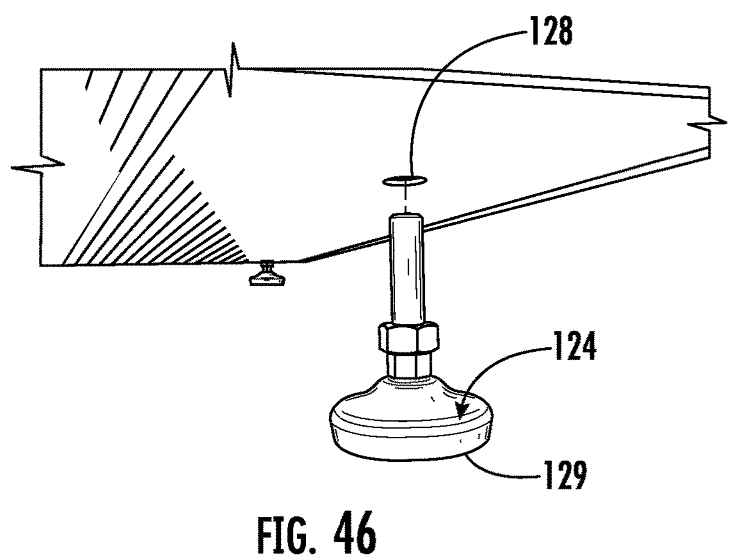
FIG. 46 is a perspective view of the leveling feet and the floor panel of a stand-alone private space enclosure according to an aspect of the present disclosure.
Figure 47:
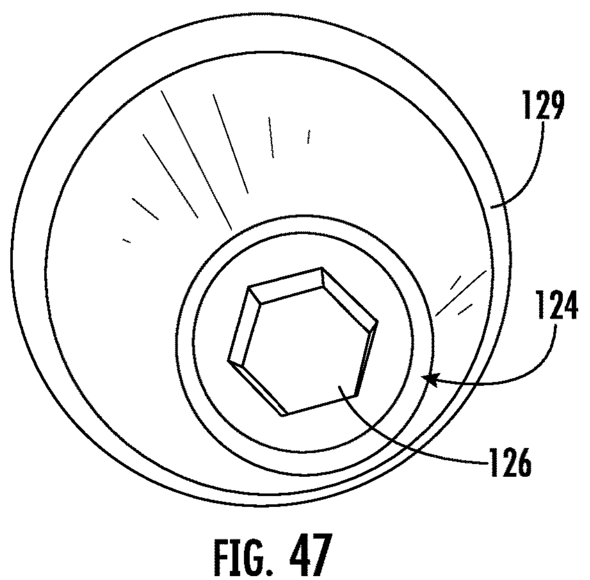
FIG. 47 is an interior perspective view of the top of the leveling feet from the inside of a stand-alone private space enclosure according to an aspect of the present disclosure.
Figure 48:
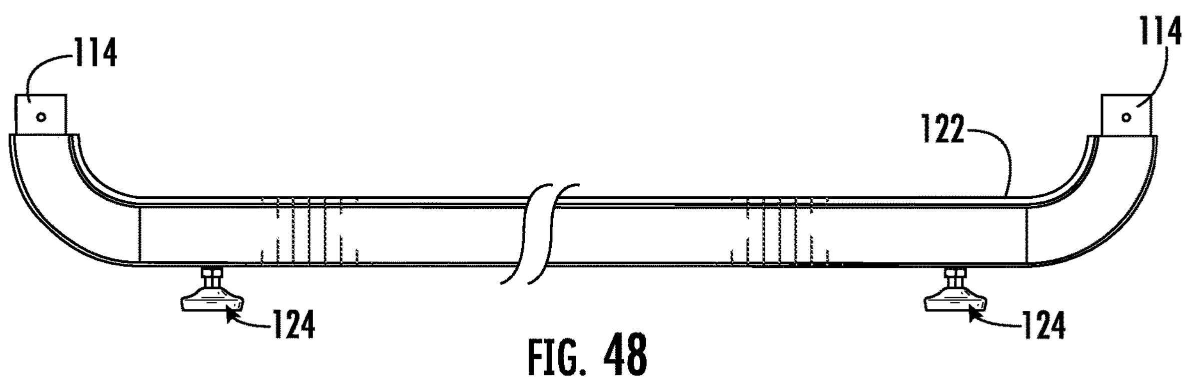
FIG. 48 is a front view of the floor panel of an embodiment of the disclosure showing the front upwardly extending attachment legs to the supporting walls and the leveling feet.
Figure 49:
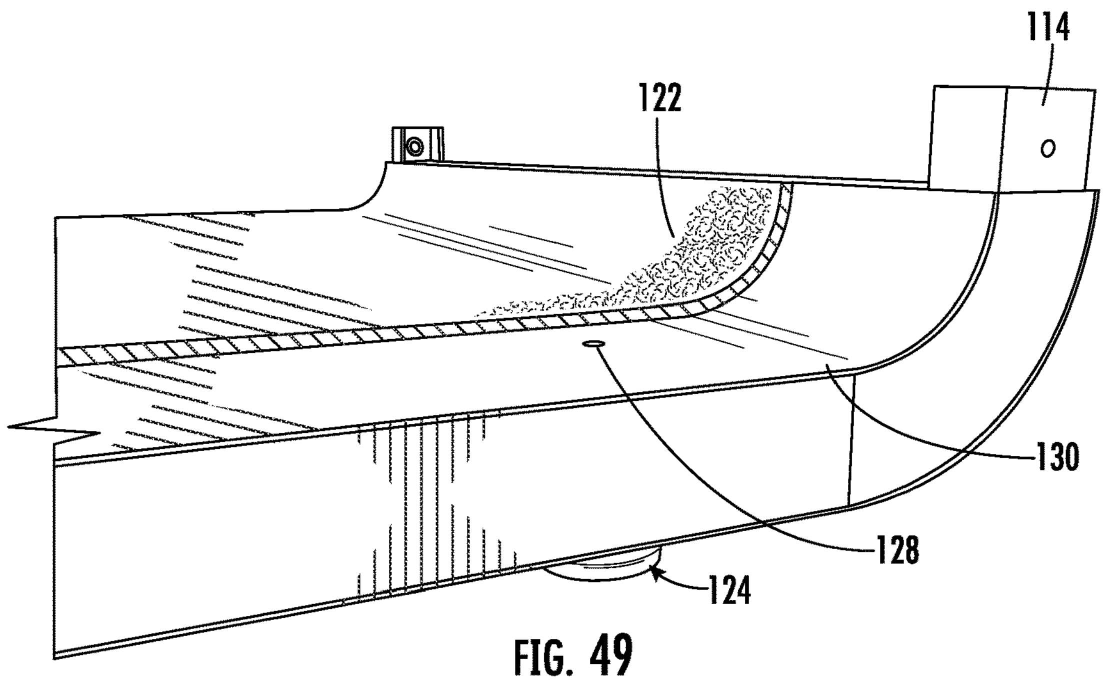
FIG. 49 is a perspective view of the floor panel of a stand-alone private space enclosure according to an aspect of the present disclosure showing the carpet, the leveling feet, and the interior holes to access the leveling feet from the interior of the enclosure enabling ease of leveling by a single user.
Figure 50:
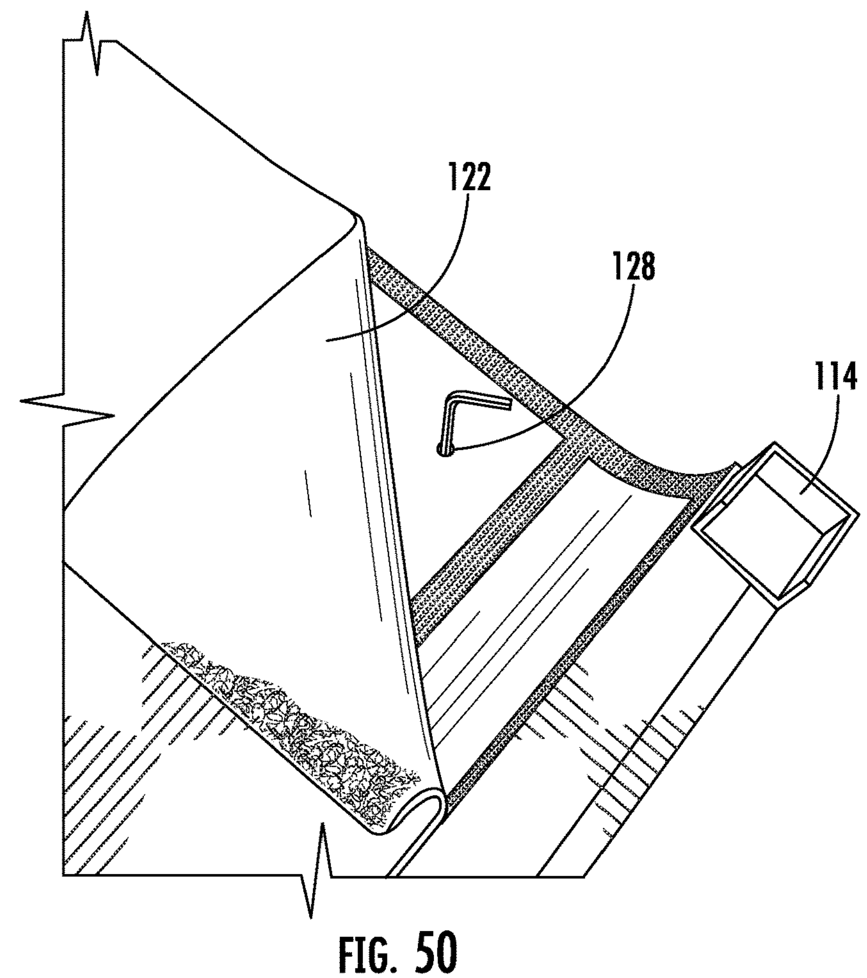
FIG. 50 is an interior perspective view of the floor panel of a stand-alone private space enclosure according to an aspect of the present disclosure showing the carpet pulled back from the floor panel and the interior holes to access the leveling feet from the interior of the enclosure.
Figure 51:
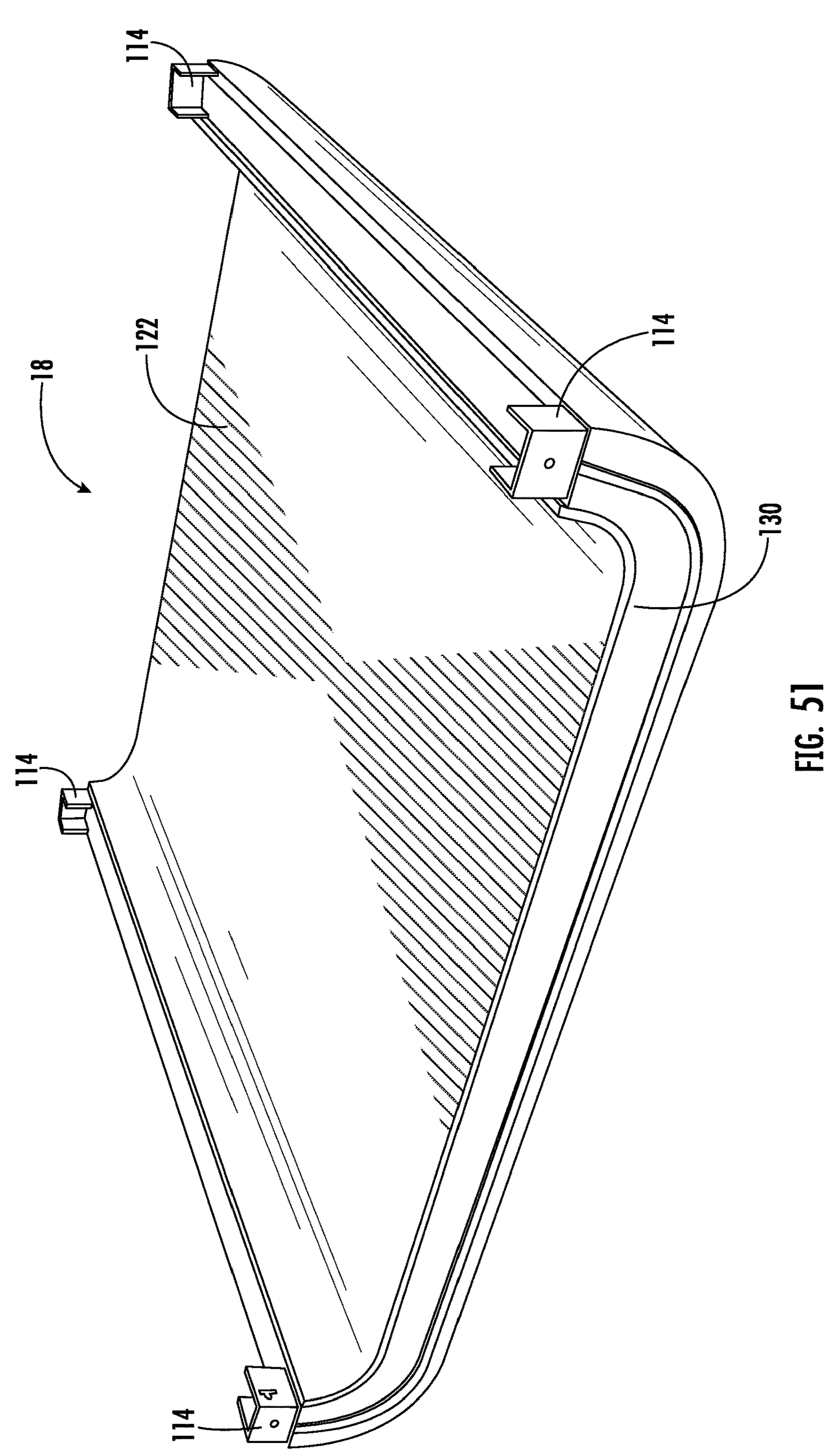
FIG. 51 is an upper perspective view of the floor panel of a stand-alone private space enclosure according to an aspect of the present disclosure showing the attachment legs to the supporting walls.
Figure 52:
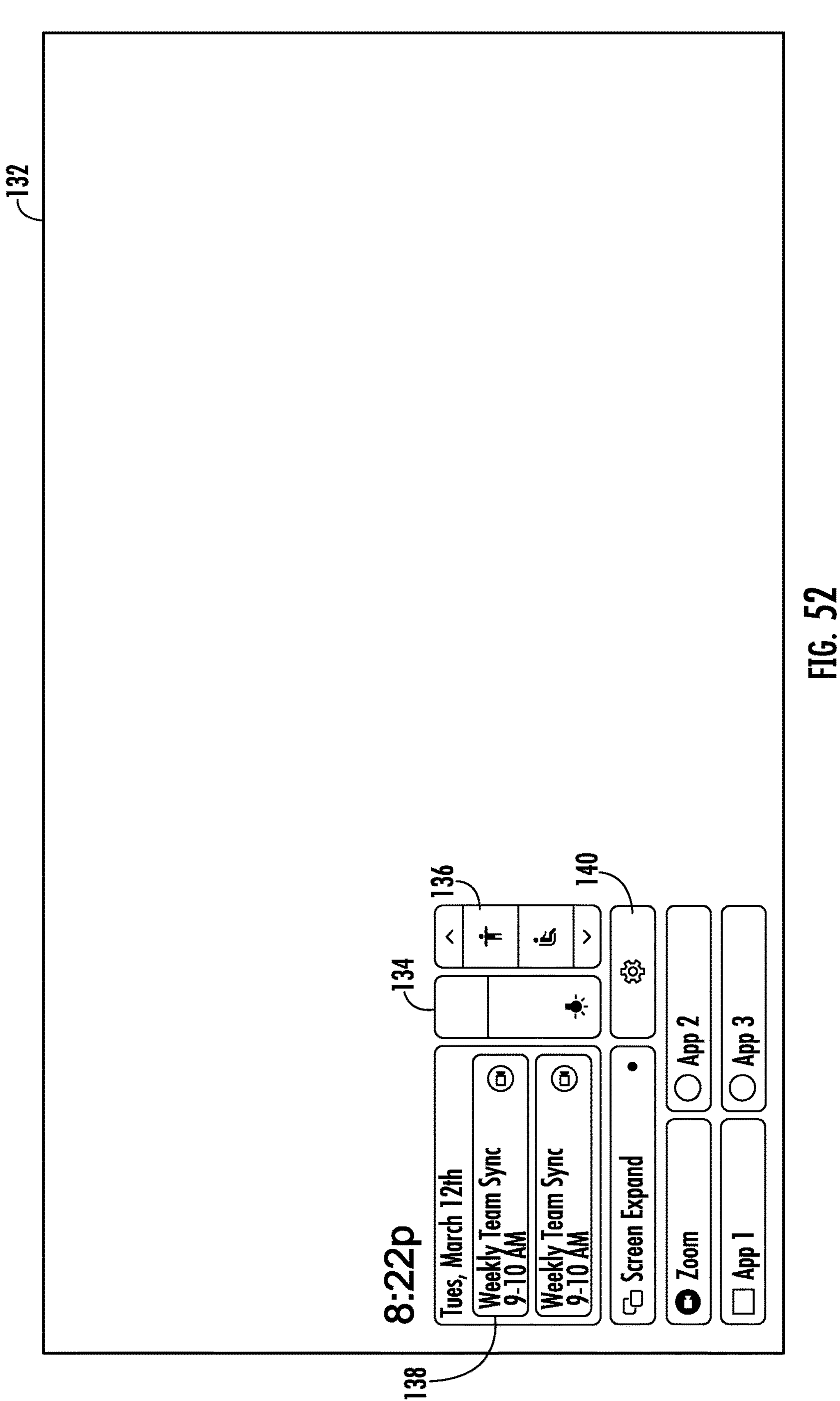
FIG. 52 is an exemplary graphical user interface view of the enclosure options display of a stand-alone private space enclosure according to an aspect of the present disclosure showing a user extending their bring your own device display to a second display screen for more efficient work on two display or conceivably mirroring the display of the device instead of extending the display.
Figure 53:
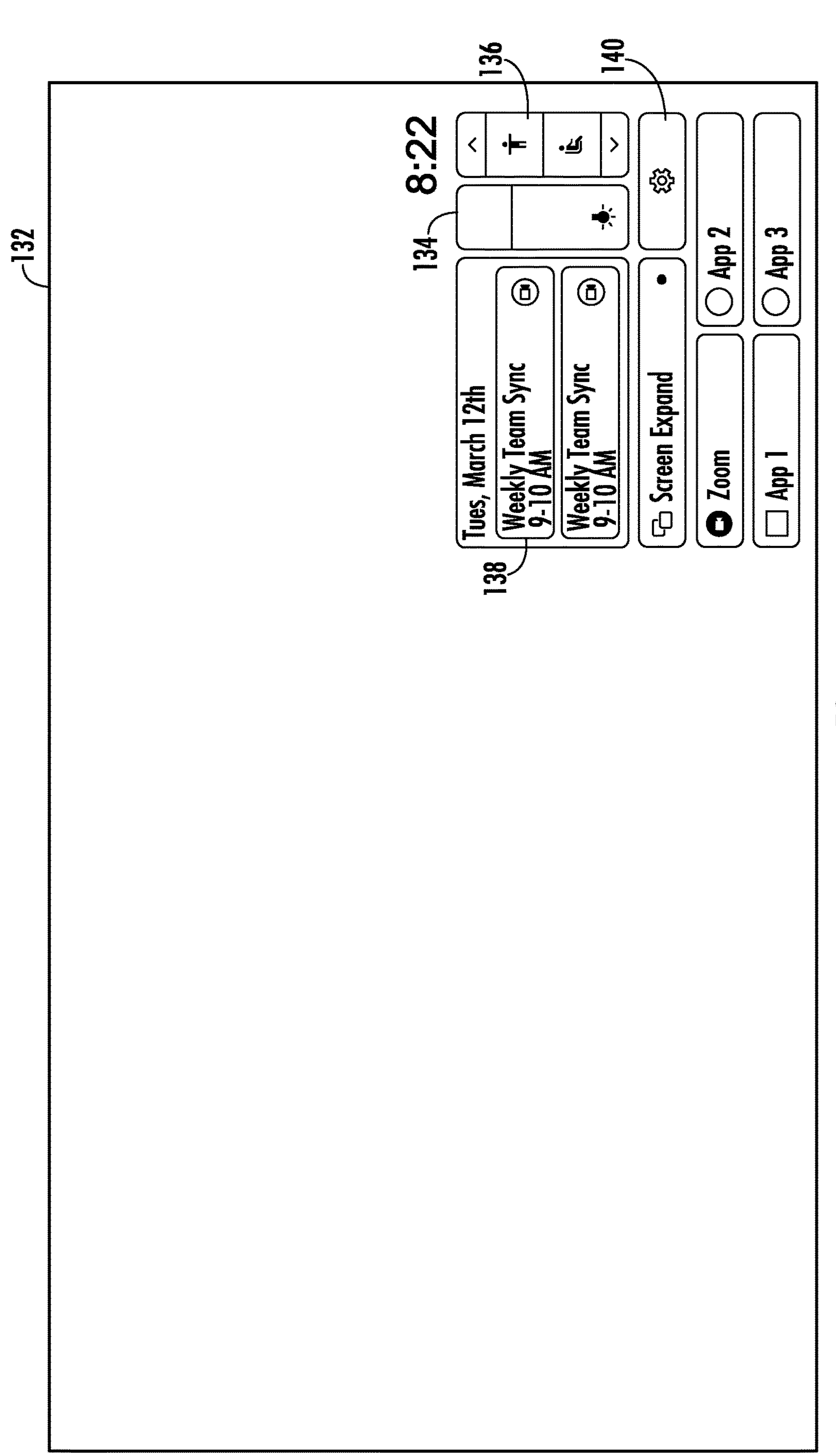
FIG. 53 is another exemplary graphical user interface view of the enclosure options display of a stand-alone private space enclosure according to an aspect of the present disclosure.

FIGS. 26-34 show the moveable workstation assembly 30 and its various components. The moveable workstation assembly 30 typically includes a cover/façade 74 to contain and hide the underlying components behind it and to cover the aperture through which signal and electrical wires pass through the interior facing surface of the side wall 14 such that the user of the stand-alone private space enclosure does not see any track or aperture or other components covered by the cover/façade. The desk 32 may be mounted onto a pair of desk supports 76 that slide into desk support receiving cavities 218 that extend from the side wall facing edge of the desk into an interior and within the desk such that the desk supports are not visible to the user when the desk 32 is in use and engaged with the overall moveable workstation assembly 30. The desk 32, as shown in at least FIG. 31, also typically has at least one and typically a plurality of supports 216 within the structure of the desk and extending from proximate a first side/left side of the desk to proximate a second side/right side of the desk when the user is looking at the desk. The support(s) 216 are not typically visible to the user or exposed to the user when viewing the side edges of the desk from either the left or right side. The supports 216 are typically embedded within the layers of wood that typically make up the desk. If the desk is constructed of metal, the supports might be visible if a person views underneath the desk, but the desk is typically constructed of plywood or a solid hardwood such as American Red Oak. The support(s) provide added stability to the desk as it is used in either a standing configuration or a seated configuration. As shown in FIG. 31, the desk supports 76 mount into support brackets 88 that are attached to a workstation frame 80. The support brackets 88 may be attached to the workstation frame 80 by welds, screws, or any other fastener or attachment method known in the art. As best shown in FIGS. 32-33, the workstation frame 80 typically includes a bottom frame member 230, a left side wall 232, and a right side wall 234. The workstation frame also typically includes a monitor mounting support 238 and desk support frame member 240 that extends between the right side wall 234 and the left side wall 232. The desk support frame member 240 adds the structural support for the desk to be carried by the overall moveable workstation assembly 30. Also shown in FIGS. 30-32 is a piston rod 242 or the screw stepper drive shaft. A display and wireless charging power supply 236 may be included in the overall moveable workstation assembly. The display and wireless charging power supply provides dedicated power to user interfacing devices that require power for use including, but not limited to, the display or monitor of the moveable workstation assembly and the wireless changing system(s) that are typically embedded within the desk of the assembly. The display and wireless charging power supply 236 receives power from the power grid via the power junction box 237 that is proximate the bottom of the side wall.

Mounted to the workstation frame 80 may be a power unit 94 that supplies the power to the monitor 34 and the electrical outlet 36. Above the monitor 34 there may be a speaker that plays through a grate 82 in the cover/façade 74. There may also be a camera 84 that can view through a hole 86 in the cover/façade 74. All components of the moveable workstation assembly 30 are part of a single system and move as a single system. The distance between the desk 32 and the bottom of the monitor's visible area is typically between about 200 mm and about 280 mm. This ensures that if a user brings an additional device, such as a laptop, smartphone, or IPAD®, there will be ample space for the additional device to fully view the screens of the external device and the monitor at the same time without any overlapping of the additional device on the monitor or being too far away to see both at once.

Figure 67:
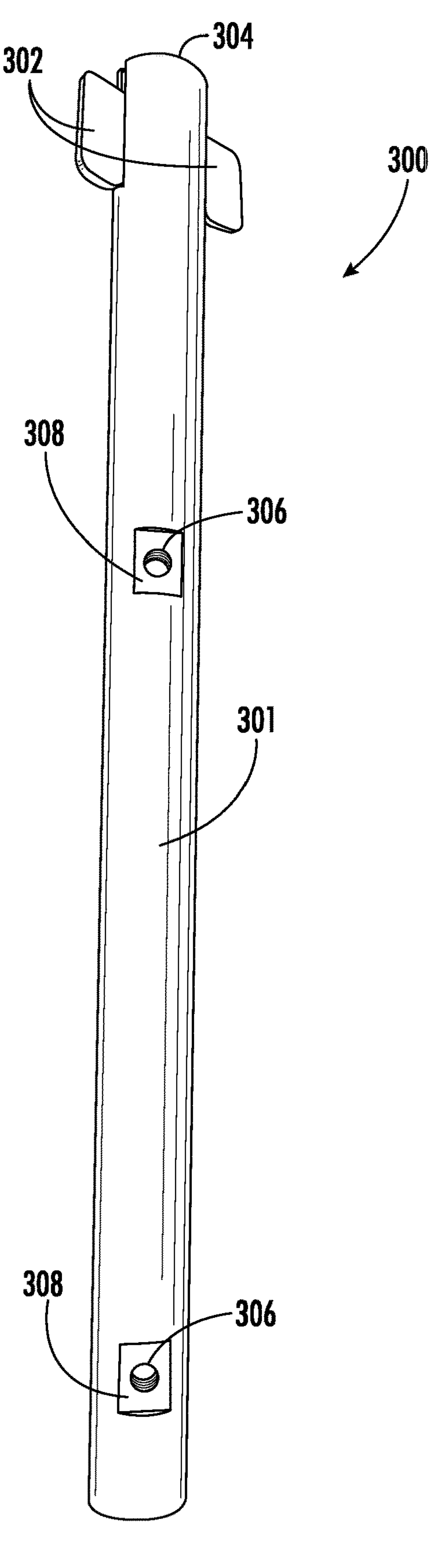
FIG. 67 is a front perspective view of a rotatable desk installation rod of a stand-alone private space enclosure according to an aspect of the present disclosure.
Figure 68:
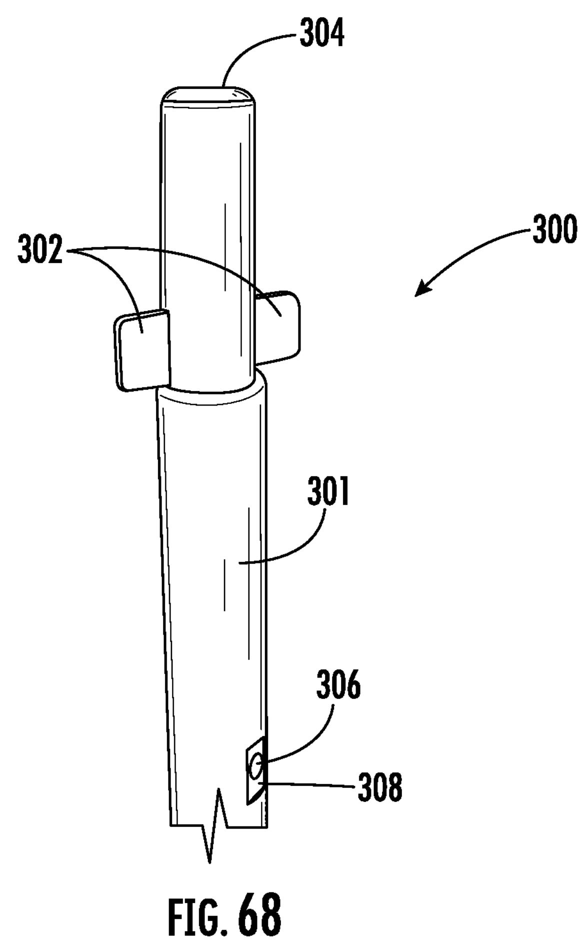
FIG. 68 is a perspective view of an end of a rotatable desk installation rod of a stand-alone private space enclosure according to an aspect of the present disclosure.
Figure 69:
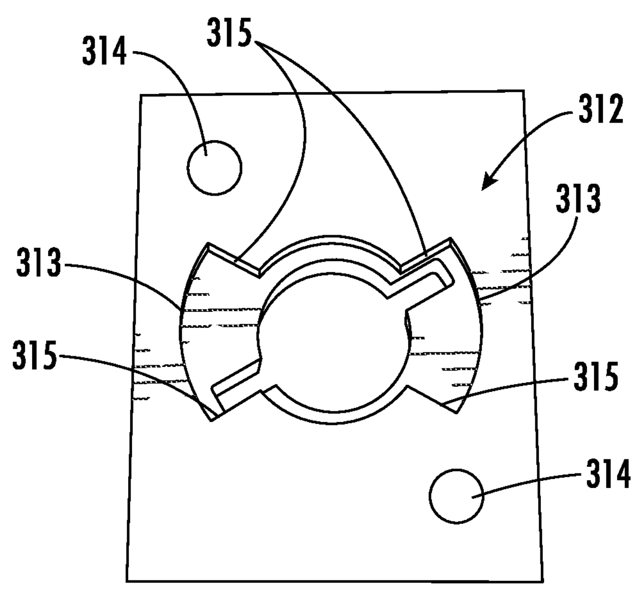
FIG. 69 is a front perspective view of a rotatable desk installation rod locking mechanism of a stand-alone private space enclosure according to an aspect of the present disclosure.
Figures 70, 71:
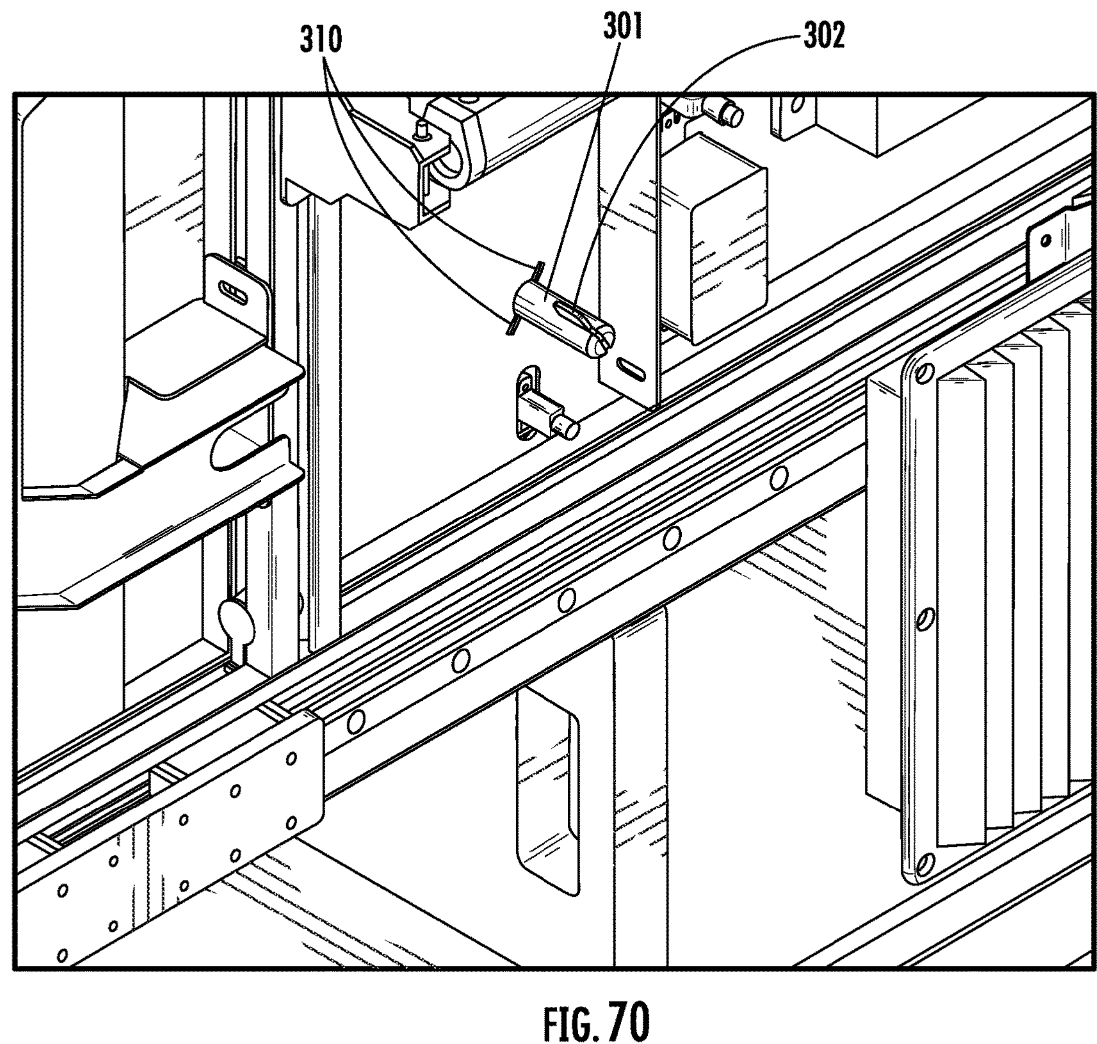
FIG. 70 is a perspective view showing the interior of a wall with a rotatable desk installation rod inserted and locked into place by rotating the rotatable desk installation rod after insertion into the wall of the stand-alone private space enclosure according to an aspect of the present disclosure.
FIG. 71 is a side perspective view of a rotatable desk installation rod inserted into the exterior wall of a stand-alone private space enclosure according to an aspect of the present disclosure.
Figure 72:
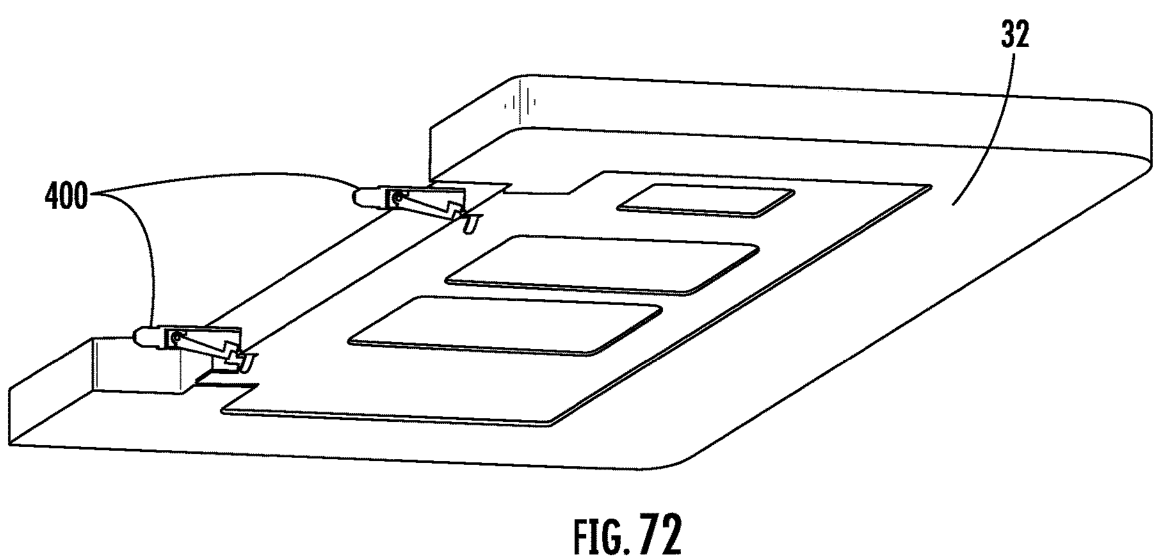
FIG. 72 is a bottom perspective view of an attachable desk with portions of the desk installation rod cut away so that the desk slide latches are visible according to an aspect of the present disclosure.
Figure 73:
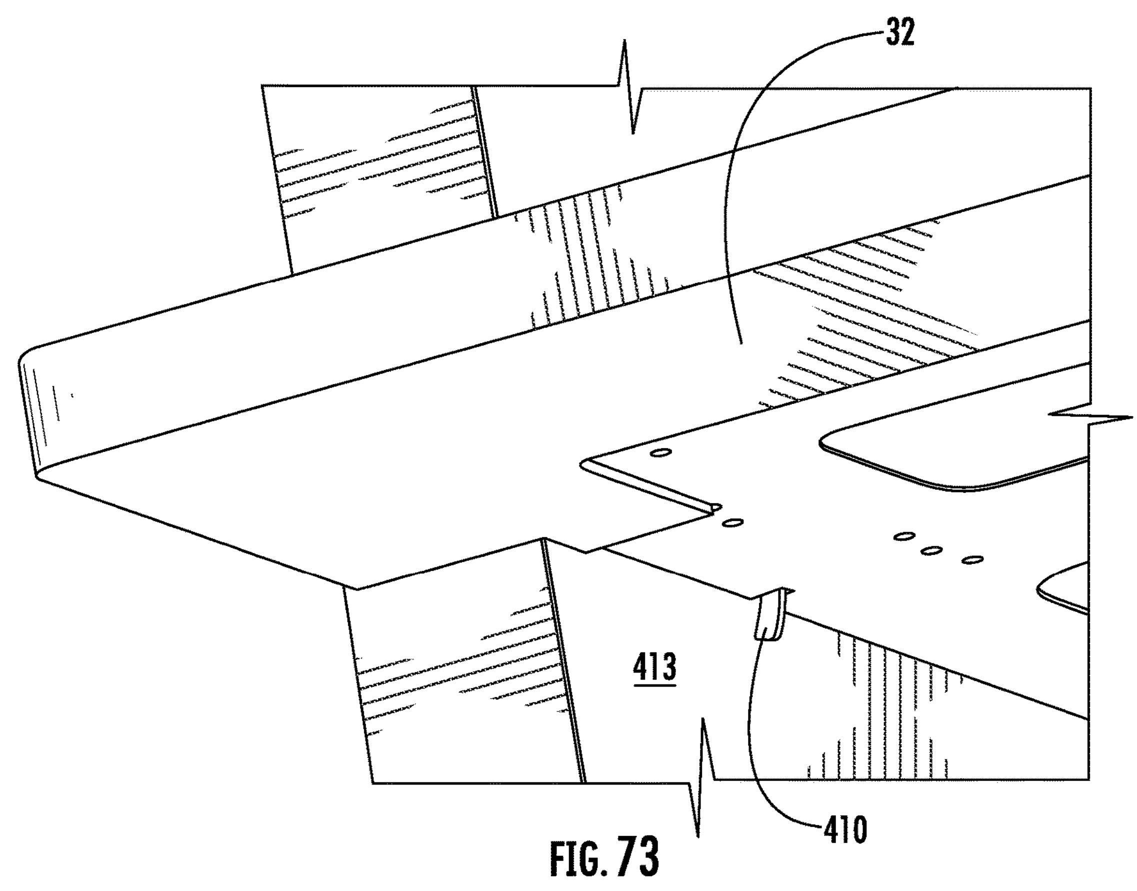
FIG. 73 is a bottom perspective view of an attachable desk engaged with a wall of a stand-alone private space enclosure according to an aspect of the present disclosure.

As shown in FIGS. 67-68, the desk supports may be in the form of a rotatable desk rod 300, which is typically metal. The rotatable desk rods 300 are straight rods with a main body portion 301 having a circular cross section and have at least one vertical flange 302, but typically have two vertical flanges 302 proximate a first end 304 that is inserted into the moveable workstation. The rotatable desk rods also typically have at least two spaced apart threaded desk mounting screw receiving apertures 306 in cutouts 308 along the main body portion 301. To attach the rotatable desk rod to the side wall, a user first inserts each of the rotatable desk rods into a corresponding hole located along the moveable workstation assembly 30. The hole is a space that has a circular shape with at least one rectangular wing where the number of wings correspond to the number of flanges. This shape is substantially the same as the cross section of the rotatable desk rod and the at least one flange. The rotatable desk rod can only pass through the hole when the at least one flange aligns with the at least one rectangular wing of the hole as shown in FIG. 70. Once aligned, the rotatable desk rod can be pushed inward and then rotated so that the at least one flange is out of alignment with the at least one rectangular wing and preventing the rod from being pulled directly out. A support bracket 312 as shown in FIG. 69 may be mounted to the internal surface of the moveable workstation assembly's covering/façade 74 using screws or another fastener through the apertures 314. The support bracket 312 typically has a portion removed or cut out 313 to accommodate the flange(s) as they rotate into position for engagement of the desk with the enclosure and form a stop to prevent over rotation of the rotatable desk rod by the flange(s) encountering the stops 315 on the top and/or bottom of the cut out 313. A rotatable desk rod 300 is inserted through the aperture on each side, into engagement with the support bracket 312 on each side and into engagement with a second back bracket that is mounted or otherwise engaged with the left side wall 232 and the right side wall 234 of the workstation frame 80 depending on which side the support rod is being inserted. The desk 32 then fits over a second end of the rotatable desk rods such that the second ends 236 are inside holes inside the enclosure facing side of the desk 32. Once the desk is installed onto the rods, the desk is secured to the rods by engaging two fasteners, one into each of the threaded desk mounting screw receiving apertures 306 through an aperture in the bottom surface of the desk and into engagement with the rods.

Figure 77:
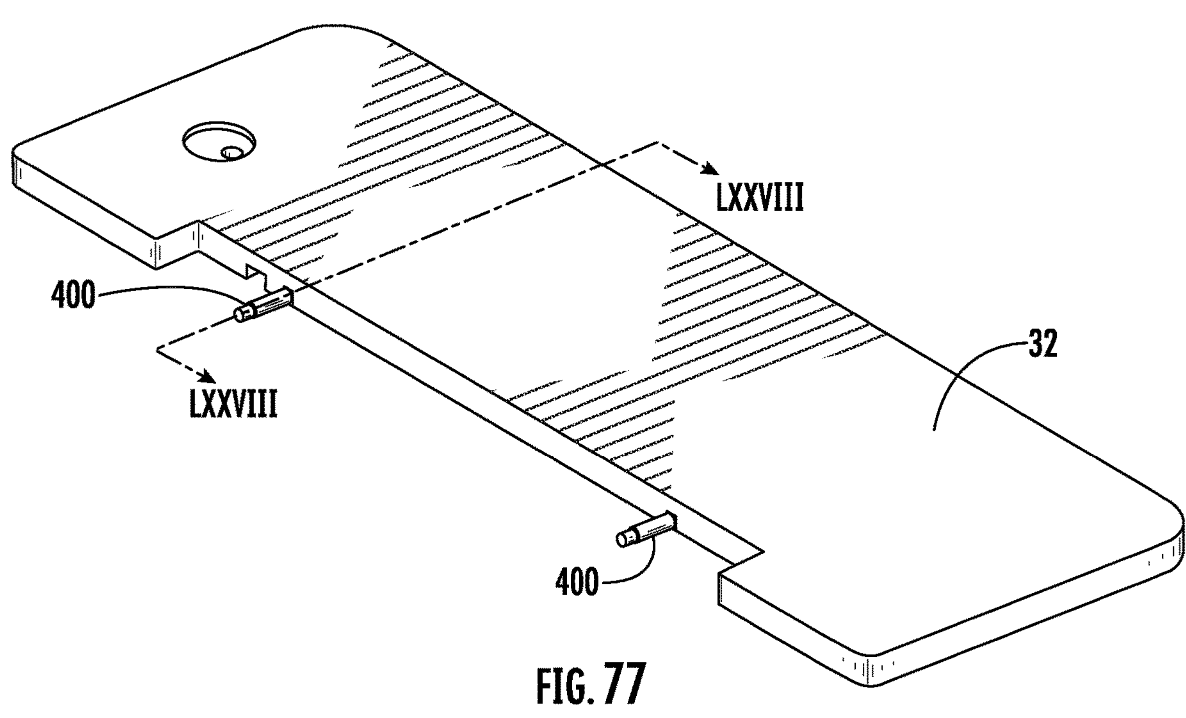
FIG. 77 is a perspective view of an exemplary desk with alternative desk slide latches and desk installation rods according to an aspect of the present disclosure.
Figure 78:
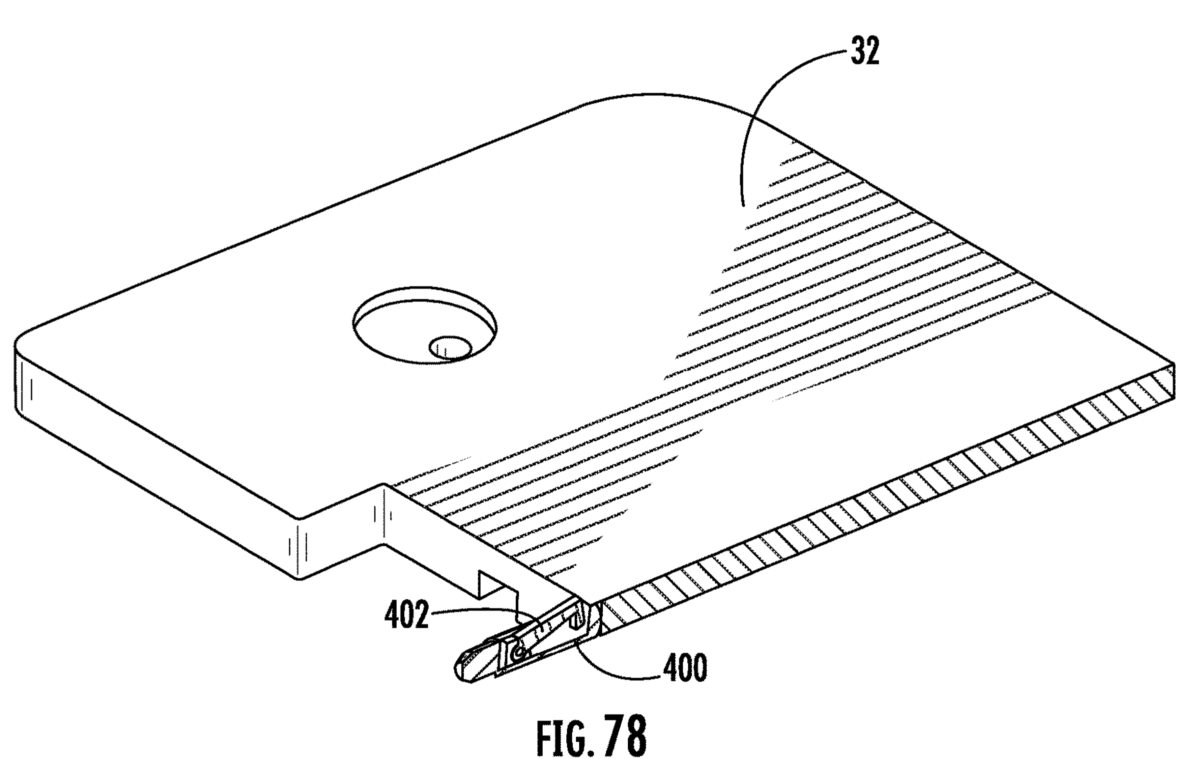
FIG. 78 is a cross-sectional view of the exemplary desk of FIG. 77 taken along line LXXVIII-LXXVIII.

In another configuration shown in 72-78, the desk supports 400 may also have a slot located along the desk support oriented either upwards or downwards. Inside the slot is a spring biased hook lever 402 attached via a hinge 404 located in the slot closest to the first end 406. In the case of an upward oriented slot, as shown in FIGS. 77-78, the slot further contains a spring that forces the hook lever upwards. When the spring is compressed, the hook lever recedes into the slot and is substantially form fitted to the slot as to make a smooth, uninterrupted outer surface of the desk support. To attach the desk, a user lines up the desk supports with the holes in the moveable workstation assembly and presses the desk supports into the holes. The rim of the holes will meet the portion of the hook lever attached to the hinge, and thus will push the hook lever down. Once the hook lever is fully past the hole, the spring forces the hook lever up where it will catch on the rim of the hole. The desk will not be removable by pulling the desk back out without human force application, and will need to be accessed from behind the moveable workstation to push the hook lever down so that the desk support can fit through the hole.

Figure 74:
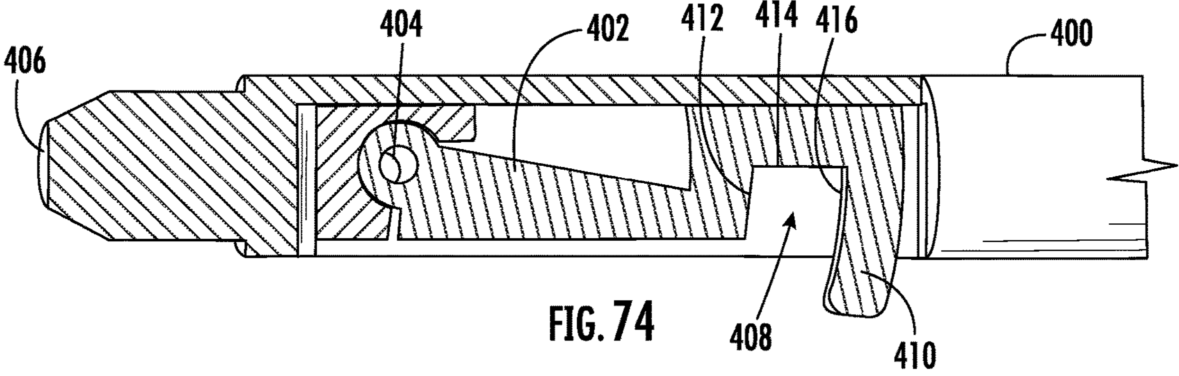
FIG. 74 is a cross-sectional view of the desk installation rod according to an aspect of the present disclosure in an unengaged position.
Figure 75:
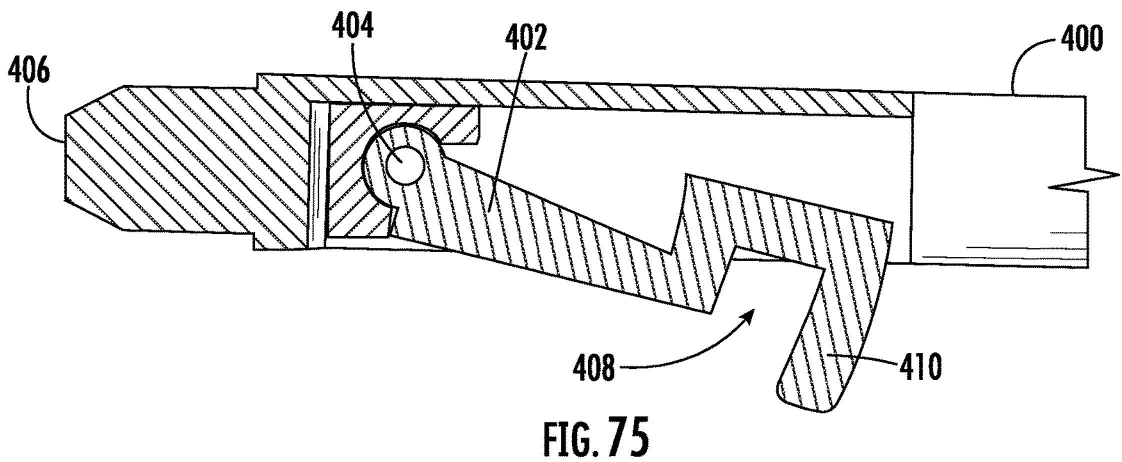
FIG. 75 is a cross-sectional view of the desk installation rod according to an aspect of the present disclosure spring biased into an engaged position.
Figure 76:
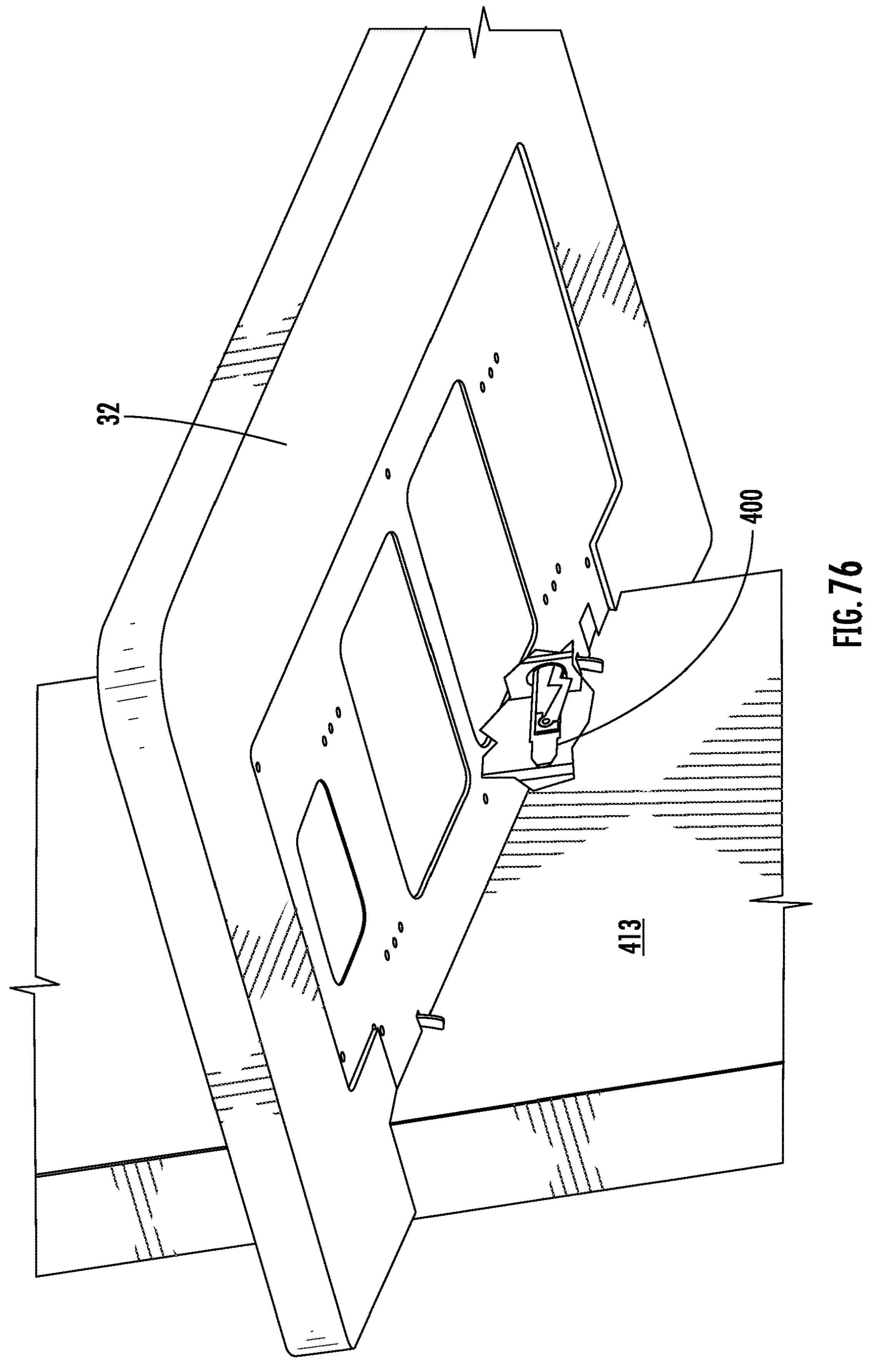
FIG. 76 is a bottom perspective view of a desk that may be removed by hand and without the use of tools attached to a wall of a stand-alone private space enclosure showing how the desk installation rod locks the attachable desk to a wall of the stand-alone private space enclosure with a cutaway to show the desk slide latch hooking onto the covering/façade.

In the case of a downwards facing slot, as shown in FIGS. 74-76 the hook lever 402 further includes a rim engaging divot 408 that creates downwardly projecting leg 410. The user pushes the desk supports into the holes of the moveable workspace, and the rims of the holes force the hook lever up as the desk supports slide through. When the rim of the hole aligns with the divot 408 in the hook lever, the hook lever is biased down and fits the divot 408 over the rim of the hole in the interior facing surface of the wall of the enclosure with the downwardly projecting leg 410 on the interior facing side of the wall of the enclosure. This locks the desk in place and stops it from being pulled directly out unless a human provides an upward force to the downwardly projecting leg 410. A user simply pushes the hook lever upwards, typically by hand and without the use of tools, so that the divot is no longer locked around the rim of the hole in order to pull the desk free. The "divot" is typically defined by a back side engaging surface 412 that engages the rearward side of the internal surface 413 of the wall of the enclosure, a top surface 414 that engages the top of the aperture in the wall that the rod is installed through and within, and an interior facing surface engaging side 416 that engages the interior surface of the wall underneath the desk when the desk is installed.

The workstation frame 80 is movable in both an upward direction and downward direction, which also moves everything attached to the workstation frame 80 up and down in unison so as to be adjustable for a user. The workstation frame 80 is attached to an actuator 44 on the back side of the workstation frame 80. The frame slides along rails 90 having ball bearings 92 within the left side wall 14 to make the transitions as smooth as possible. The workstation frame 80 is completely covered by the cover/façade 74 as to be hidden from the view of a user.

FIGS. 35-42 show the top wall 16 in detail. The top wall 16 is specifically designed to give the user as much comfort as possible by providing ventilation, sound, and lighting to the user's preference. The top wall 16 may include a top cover 96. Attached to the top cover 96 may be a speaker access panel 100 and a fan access panel 102. Below the top cover may be a ventilation chamber 104. The ventilation chamber 104 receives blown air from the fan or fans 116 within fan access panel 102 and distributes it to be blown through ventilation grates 110 located within a lower panel 112 of the top wall 16 and into the interior of the enclosure 10. The ventilation chamber 104 may include ventilation barriers **104*a* that force the air to take a circuitous route between the fans 116** and the interior of the stand-alone private space enclosure. These ventilation barriers reduce the incoming rush of air, reducing the sound to the user, while at the same time reducing the amount of exterior sound that is able to come into the interior of the stand-alone private space enclosure from the outside.

Attached on the underside of the lower panel 112 may be a lighting square, which is typically an LED lighting square 108. The LED lighting square 108 may be a set of light emitting diodes (LEDs) that can shine light in many colors and at many intensities into the interior of the stand-alone private space enclosure 10, depending on what the user desires.

When the top wall 16 is placed on top of the first side wall 12 and second side wall 14, attachment flanges 114 are fit within corresponding holes 118 (see FIGS. 15, 17, and 26) in the first side wall 12 and second side wall 14. The attachment flanges 114 fit snugly within the holes 118 and then a fastener (not shown) may be run from the side walls and into the hole 120 within the attachment flanges 114. This arrangement allows for easy assembly of all of the walls together.

Looking at the bottom wall 18, as shown in FIGS. 43-51, there may be a floor panel 130 that may be covered with a carpet 122 or other flexible covering increasing the comfort inside of the stand-alone private space enclosure 10. Underneath the bottom wall 18 may be four feet 124 to provide stability to and to level out the stand-alone private space enclosure 10. The feet 124 are adjustable from the inside of the stand-alone private space enclosure 10 by peeling back the carpet 122 in the corners to reveal holes 128. The carpet 122 may be attached to the floor panel 130 by a removable attachment such as a hook and loop fastener (such as VELCRO®) or with another attachment means such as screws. The top sides of the feet 124 may include a head 126 (a hex head as shown, although it may be a star head, Phillips head, or any other type of head) that is accessible through the holes 128. The feet 124 also typically have a soft and/or elastomeric/rubber base portion that directly contacts the floor or other support surface when the stand-alone private space enclosure 10 is fully constructed and upright. The ability to adjust the height of individual feet from inside the stand-alone private space enclosure 10 allows a single user to level the stand-alone private space enclosure 10 from the interior by placing a level on the floor and adjusting the feet using a tool (such as an Allen wrench) until the level shows that the stand-alone private space enclosure 10 is level.

Figure 54:
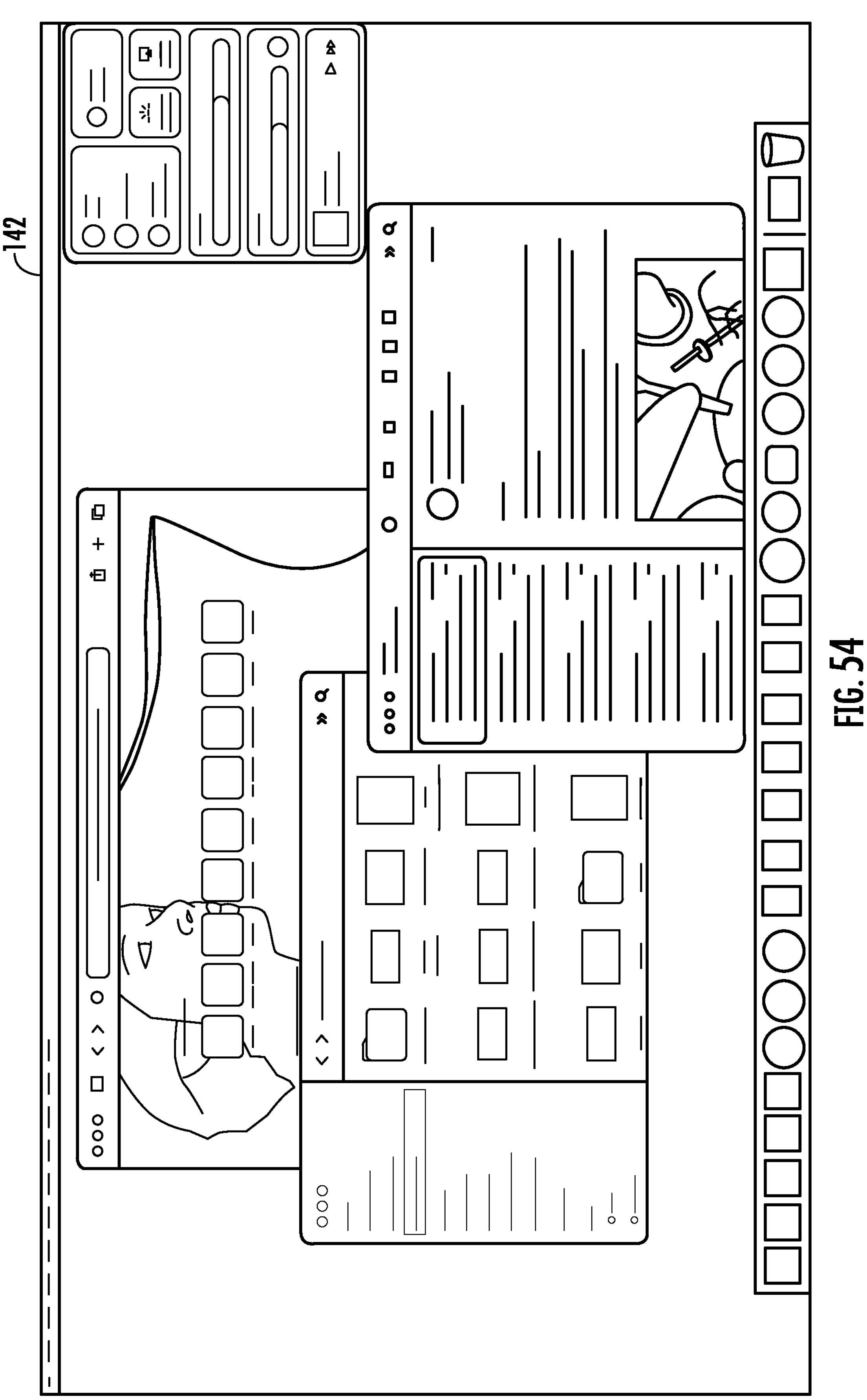
FIG. 54 is another exemplary graphical user interface view of the desktop display of a stand-alone private space enclosure according to an aspect of the present disclosure.
Figure 55:
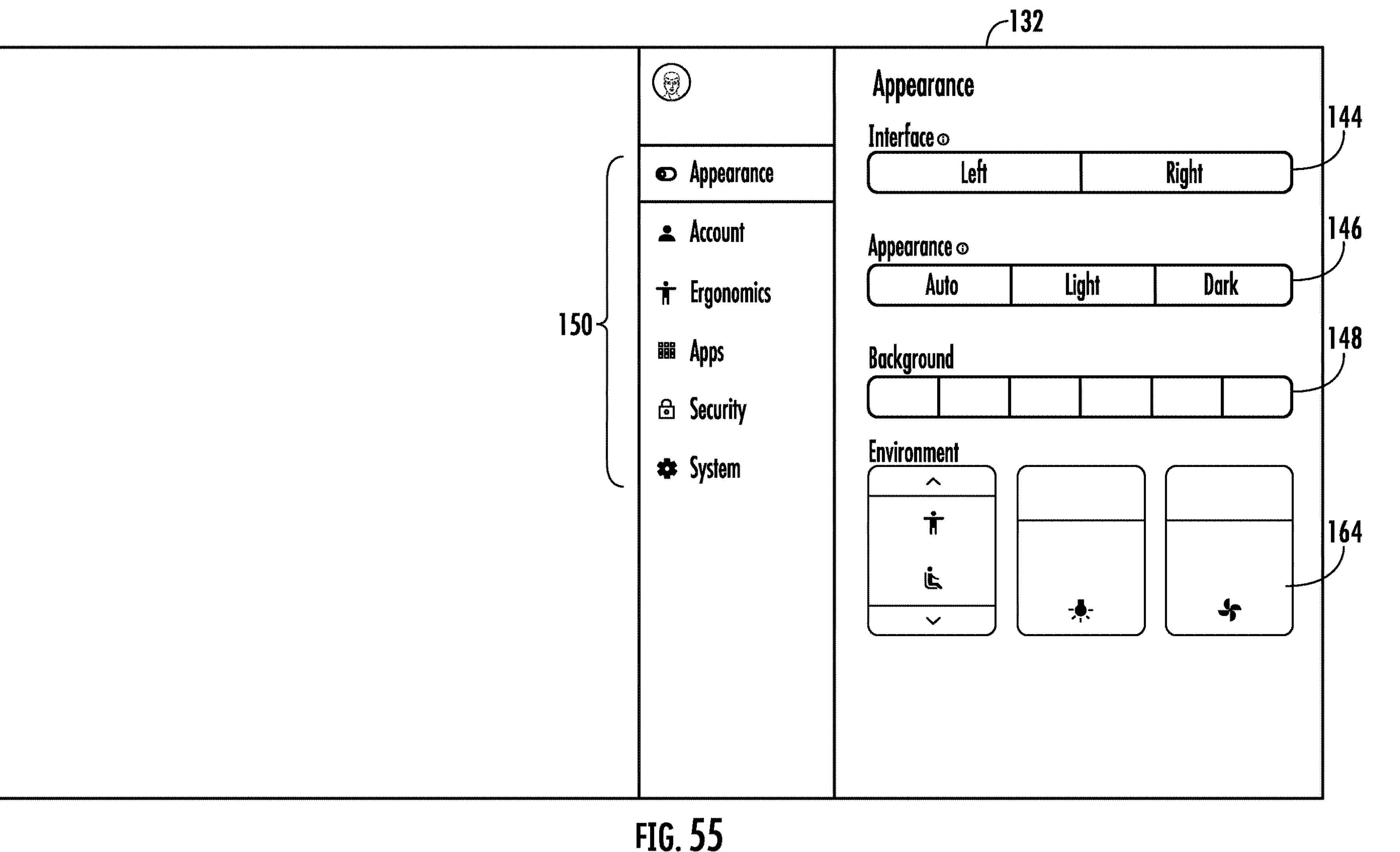
FIG. 55 is an exemplary graphical user interface view of the detailed enclosure options display of a stand-alone private space enclosure according to an aspect of the present disclosure.

FIGS. 52-62 show examples of screens that may be shown on the monitor 34 to allow a user to tailor the experience within the stand-alone private space enclosure to their liking, to schedule times within the stand-alone private space enclosure 10, and other options that the user may desire. For instance, in FIGS. 52 through 62 a graphical user interface screen 132 is shown that may be displayed on the monitor of the stand-alone private space enclosure 10 and either interacted with by the user via touch when the monitor 34 is a touch sensitive display or other input device such as a mouse. The graphical user interface screen 132 gives the user the option to raise or lower the workstation at 136, to brighten or soften the light at 134 gives a calendar of events at 138 that may be individualized to the user and/or group or company wide notifications/events, or open a system settings computer software application at 140. FIG. 54 shows an example of a user screen whereby the user has coupled their own laptop or other device to the system and is showing it on the monitor 34 of the stand-alone private space enclosure 10. FIG. 55 shows a screen 132 that includes options such as allowing the user to change the interface to the left (like in FIG. 52) or the right (like in FIG. 53) at 144, change the appearance of the interface light, dark, or automatic based on ambient light at 146, change the background lighting color at 148, increase or decrease the ventilation fans at 164, and other system options at 150.

Figure 56:
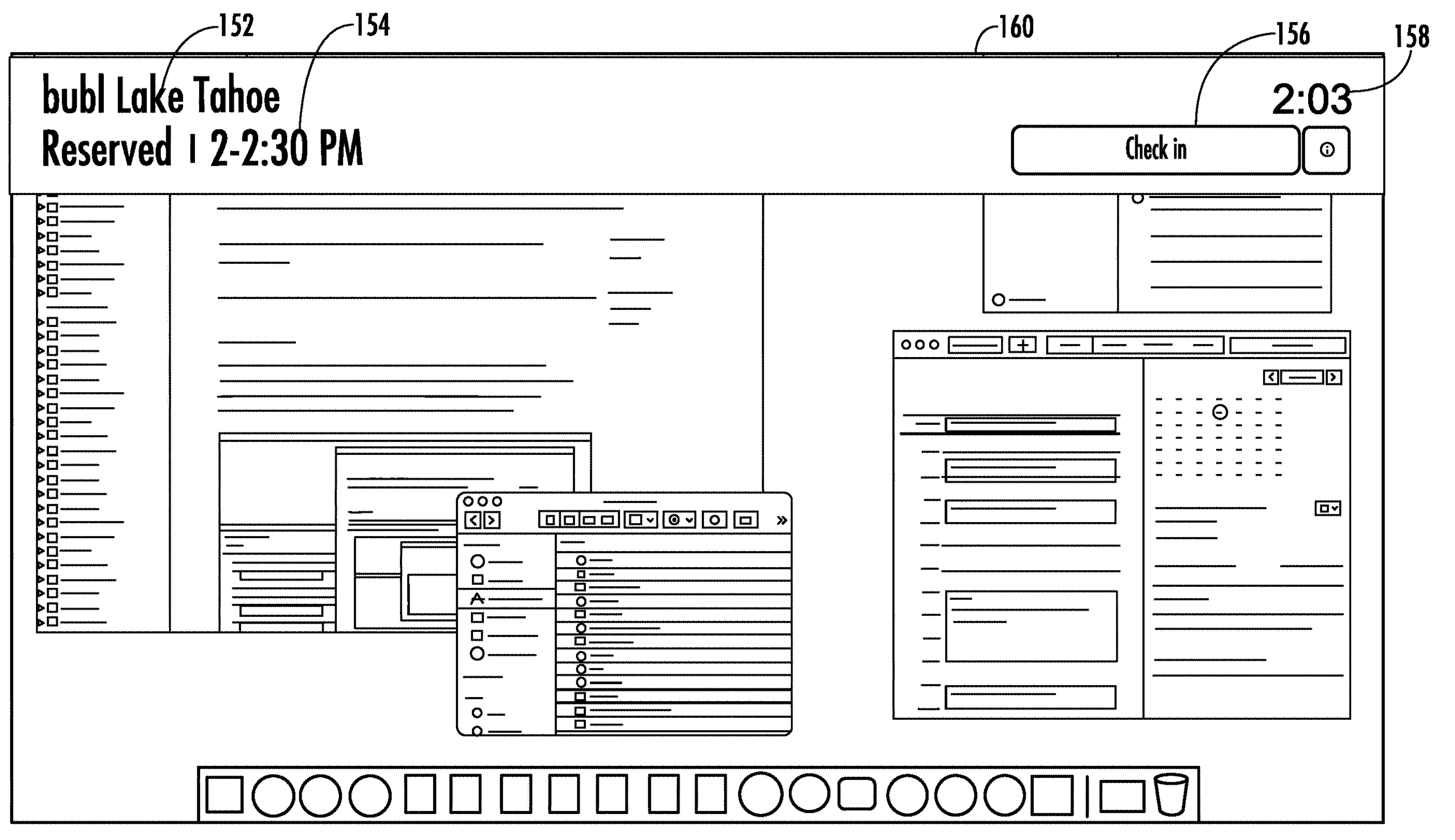
FIG. 56 is a view of a check-in options graphical user interface display of a stand-alone private space enclosure according to an aspect of the present disclosure.
Figure 57:
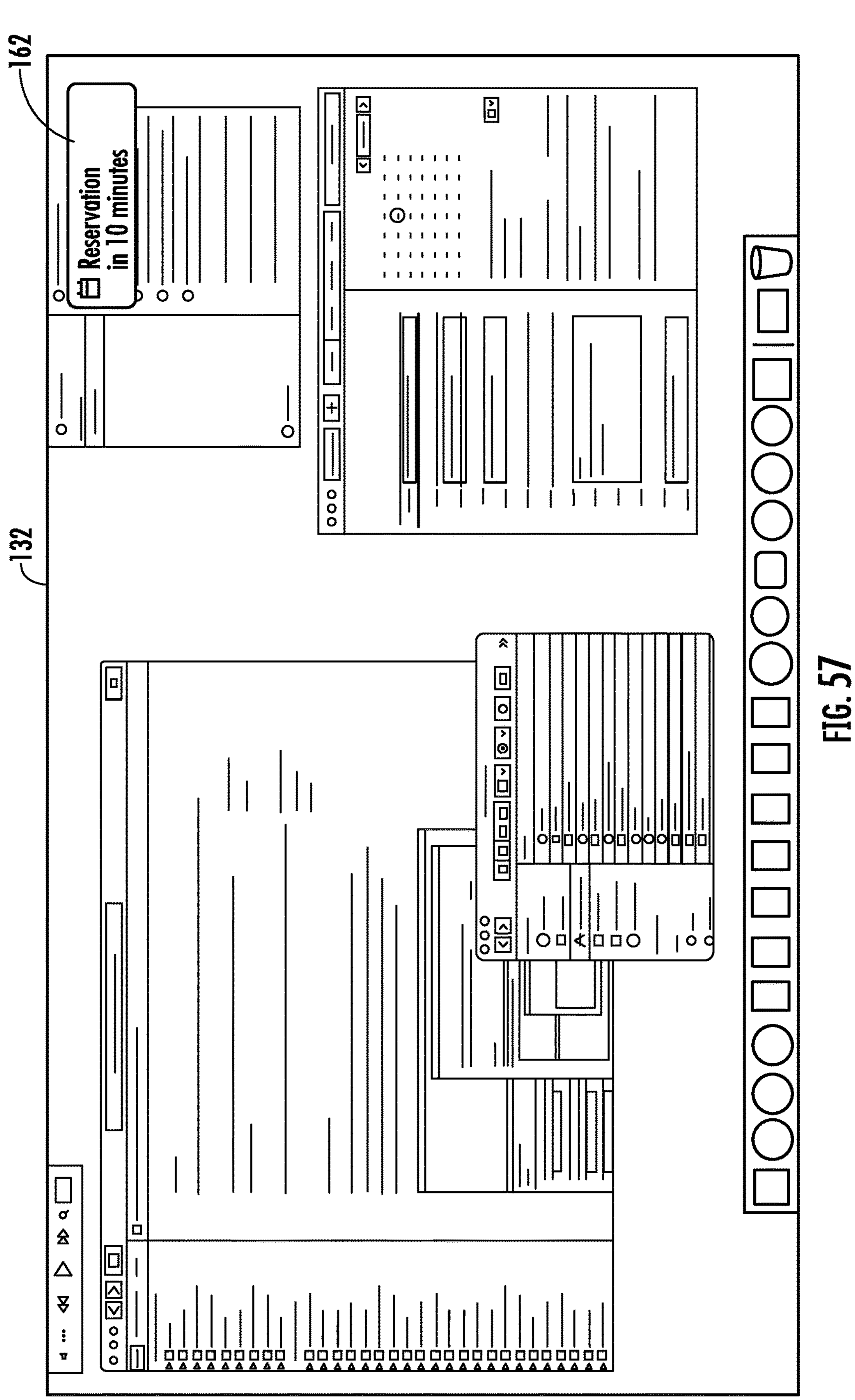
FIG. 57 is another view of a check-in options graphical user interface display of a stand-alone private space enclosure according to an aspect of the present disclosure.
Figure 58:
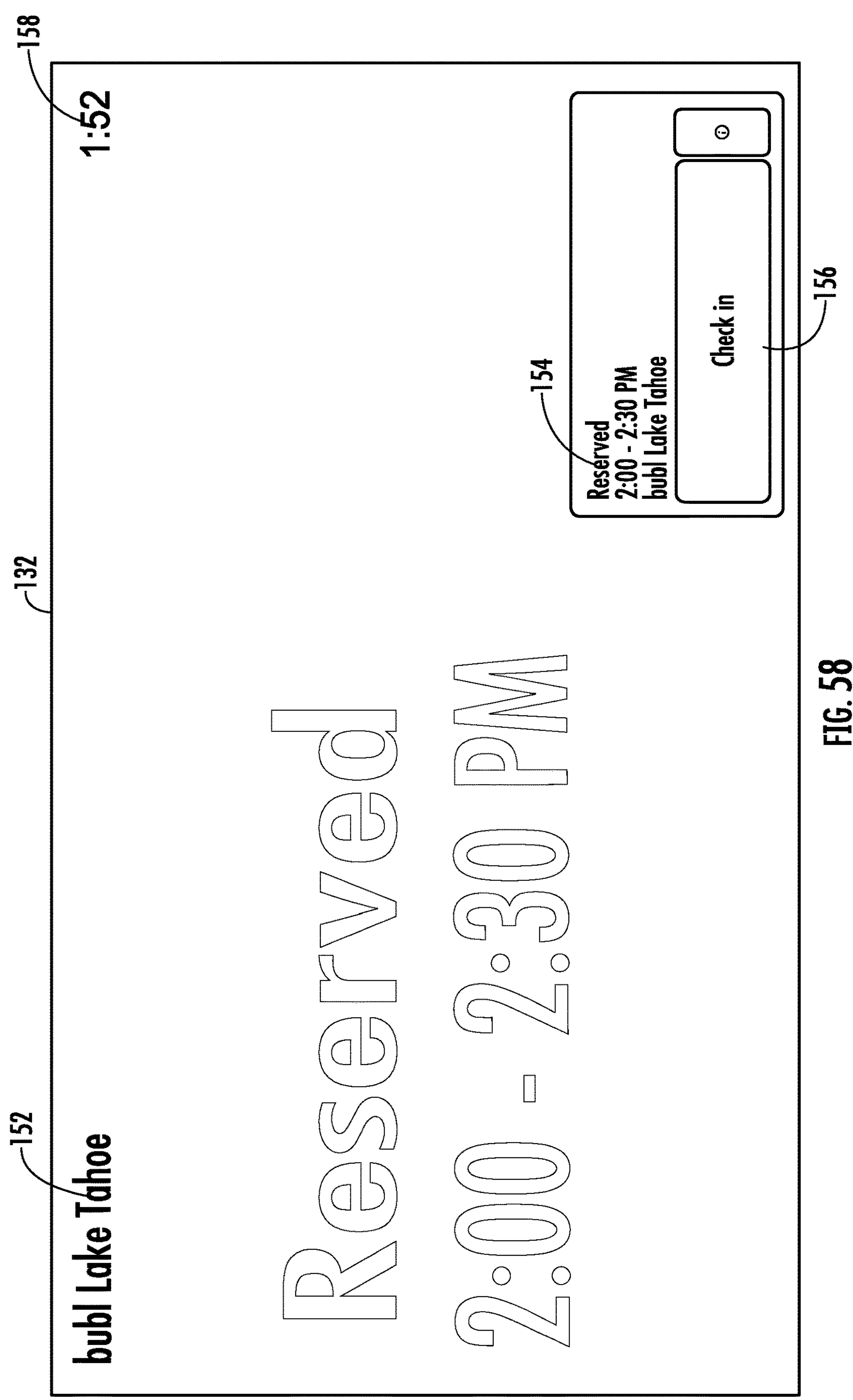
FIG. 58 is another view of check-in options and reservation graphical user interface display of a stand-alone private space enclosure according to an aspect of the present disclosure.

FIG. 56 shows a typical login screen 160. The login screen 160 may include the name and/or location 152 of the stand-alone private space enclosure 10, the reservation status 154, provides a button to check in 156, and displays the current time 158. FIG. 57 shows a graphical user interface screen 132 that is illustrating a pop up 162 that displays to a user that another reservation is approaching, allowing the current user an opportunity to wrap up what they are working on in advance of having to vacate the stand-alone private space enclosure 10 so that another user can enter the interior of the stand-alone private space enclosure 10.

FIG. 56 shows a graphical user interface screen 132 of a currently unoccupied stand-alone private space enclosure 10. The graphical user interface screen shows that there is a reservation approaching, so anyone looking for an open stand-alone private space enclosure 10 may have a limited time to use the stand-alone private space enclosure. It also allows a user to check-in using the button 156, shows the location 152, reservation status 154, and current time 158.

Figure 59:
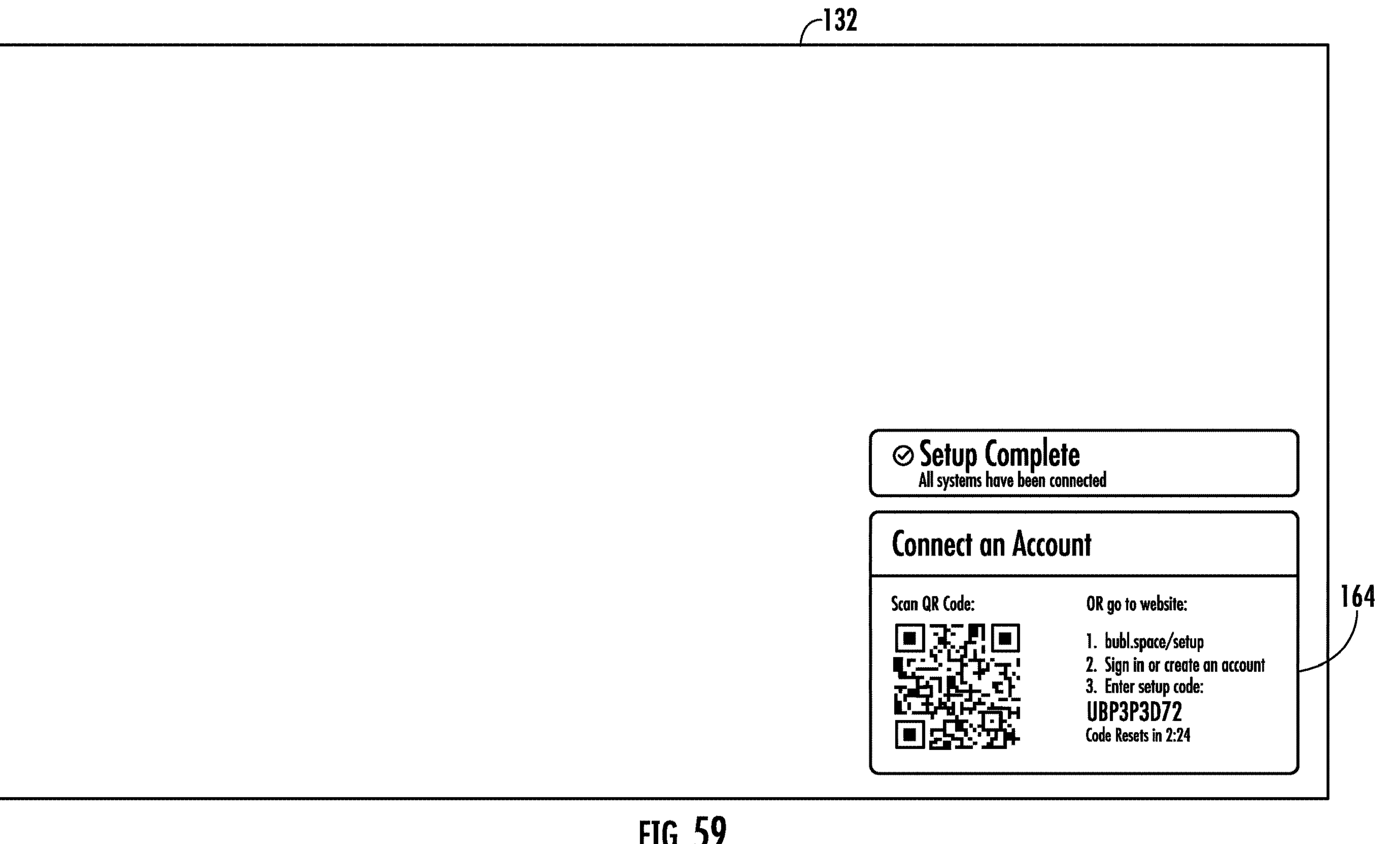
FIG. 59 is another view of check-in options and reservation graphical user interface display of a stand-alone private space enclosure according to an aspect of the present disclosure.

FIG. 59 shows a graphical user interface screen 132 that allows a user to connect to a mobile software application on their smartphone or other mobile computing device or other computing device such as an APPLE WATCH® for easily reserving and paying for the use of the stand-alone private space enclosure 10. The graphical user interface screen 132 may include a window 164 that may include a QR code that the user can scan using their smartphone or other smart device to connect to the system.

Figure 60:
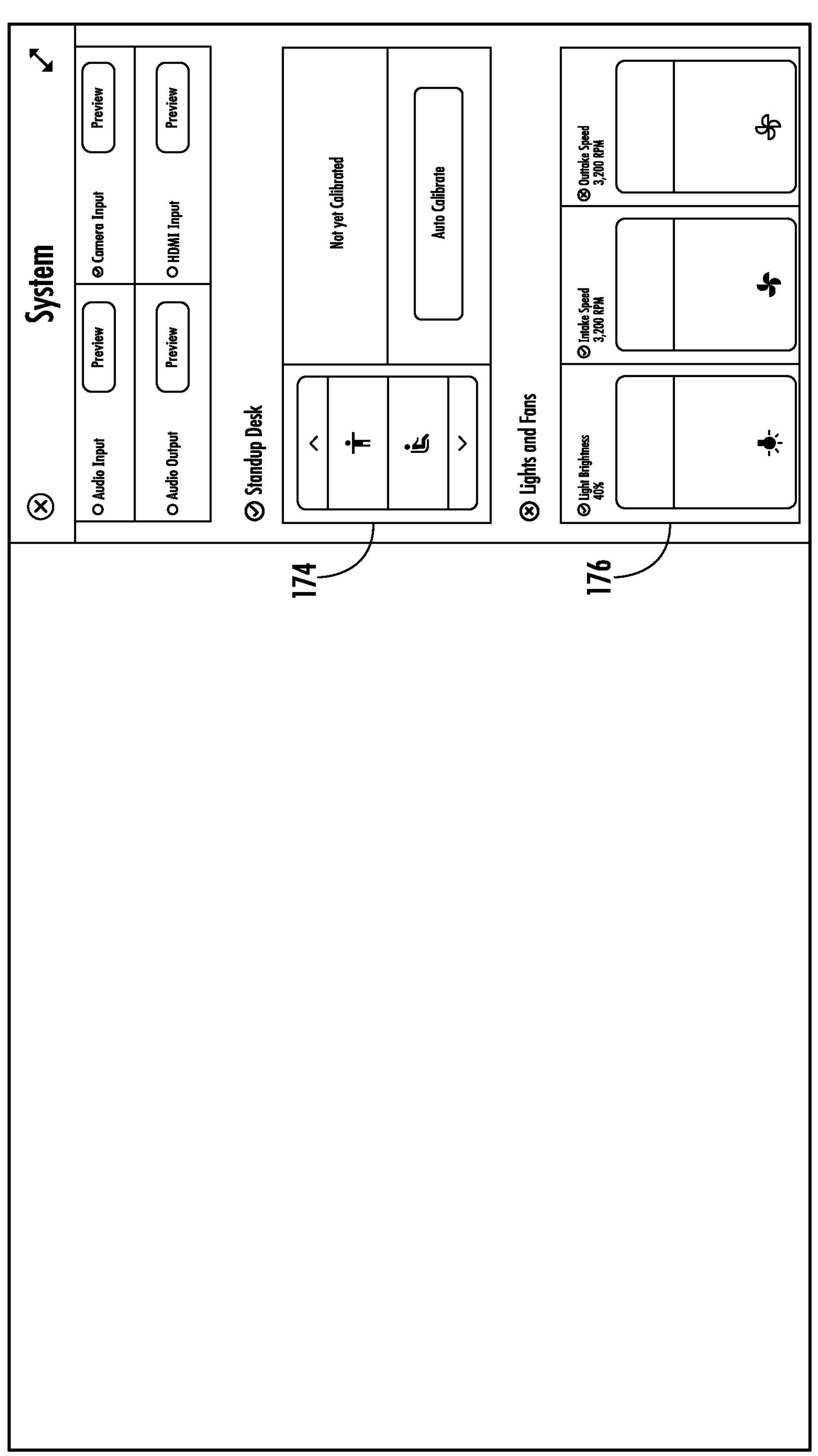
FIG. 60 is another view of the detailed enclosure options graphical user interface display of a stand-alone private space enclosure according to an aspect of the present disclosure.
Figure 61:
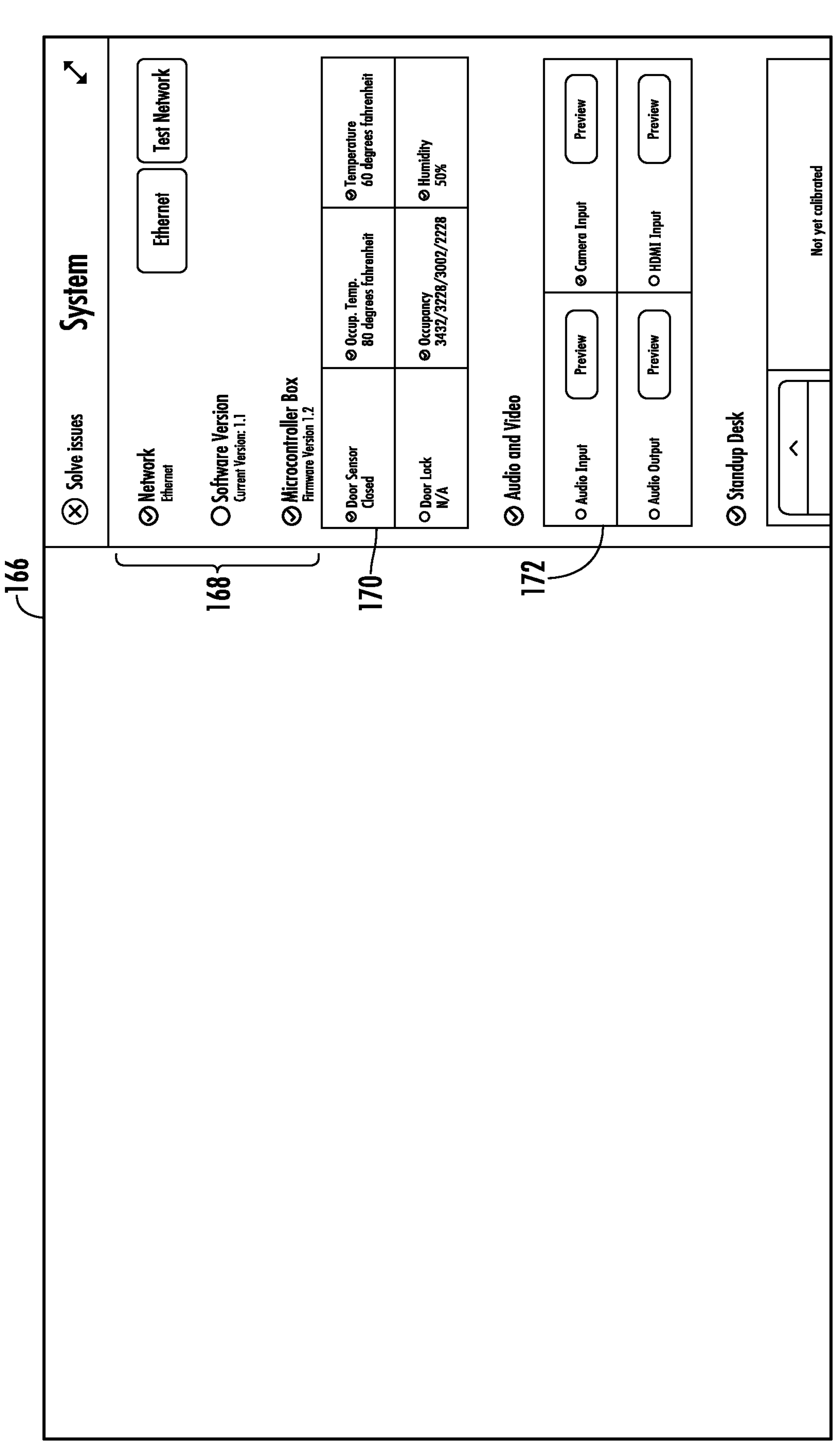
FIG. 61 is another view of the detailed enclosure options graphical user interface display of a stand-alone private space enclosure according to an aspect of the present disclosure.

FIGS. 60-61 show the system setting options that were discussed above. The system settings may include many different options. Starting with FIG. 61, the options may include network availability and testing at 168, current conditions of the stand-alone private space enclosure at 170, and audio and video options and testing at 172. In FIG. 60, there further may be options for raising and lowering the desk or calibrating the desk height for sitting vs. standing at 174, and options for setting the light intensity, the intake ventilations fans, and the outtake fans at 176.

Figure 62:
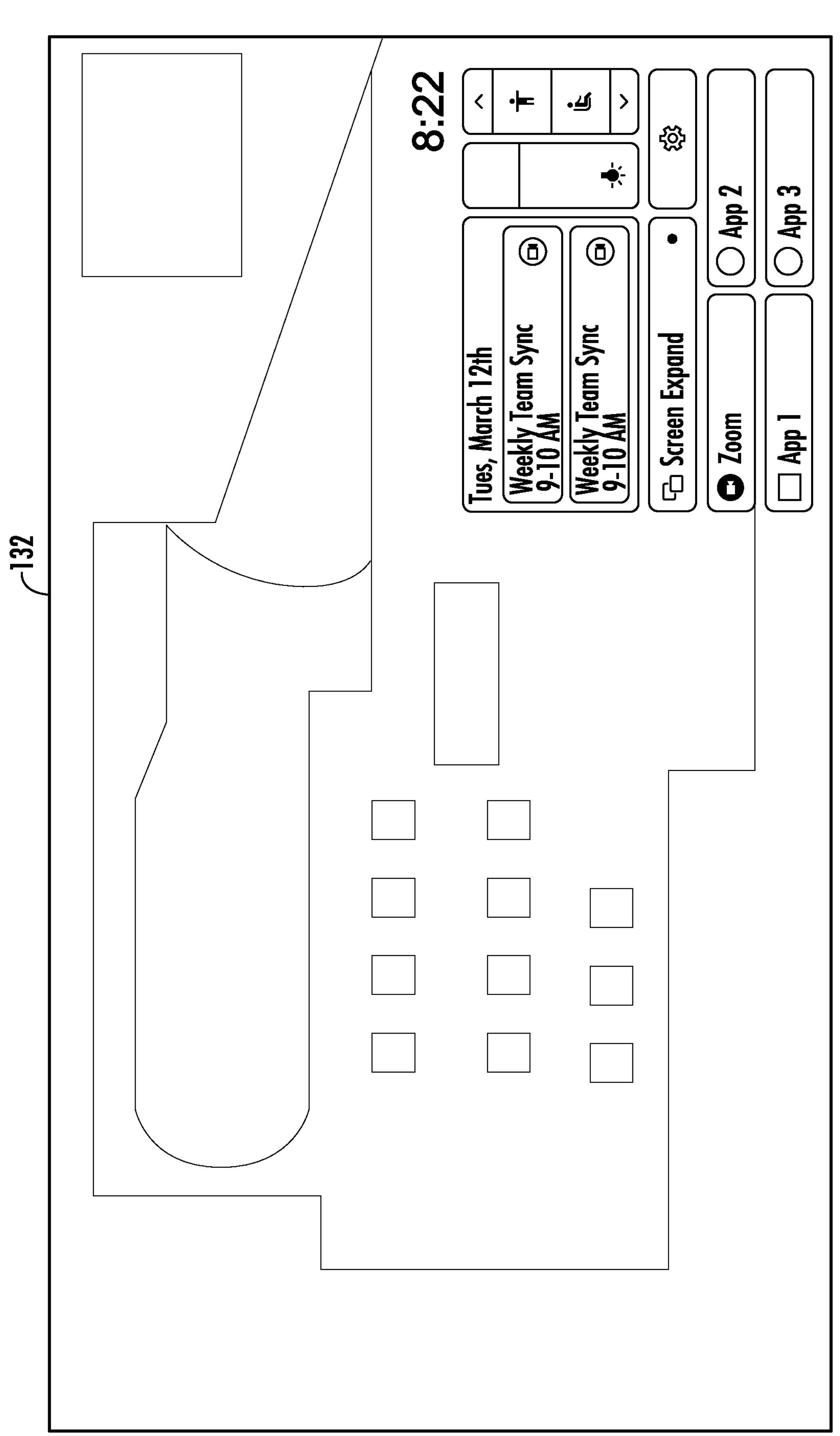
FIG. 62 is a view of the enclosure options graphical user interface display on the desktop as a user is using their own device for the main display of the desktop of a stand-alone private space enclosure according to an aspect of the present disclosure.

FIG. 62 is showing that the interface may be brought up on the screen even if the user has their own laptop or other device connected and showing on the monitor 34. Similarly, to FIG. 54, the user's screen is shown, but may be blurred out, while the interface is overlaid and accessible to the user to change any of the available options.

Details of the use of input data, on-board processing functionality, and respective hardware outputs is detailed below.

Automatic Configuration of Air Quality and Ventilation

The system includes a processor and a non-transitory computer-readable medium (for instance a Raspberry Pi computer as a non-limiting example) storing instructions that, when executed by the CPU 48, causes the CPU 48 to perform operations including determining the current state of an environment based on input data from sensors and connected systems. Air fixtures activate based on receiving a signal based on current data.

Figure 19:
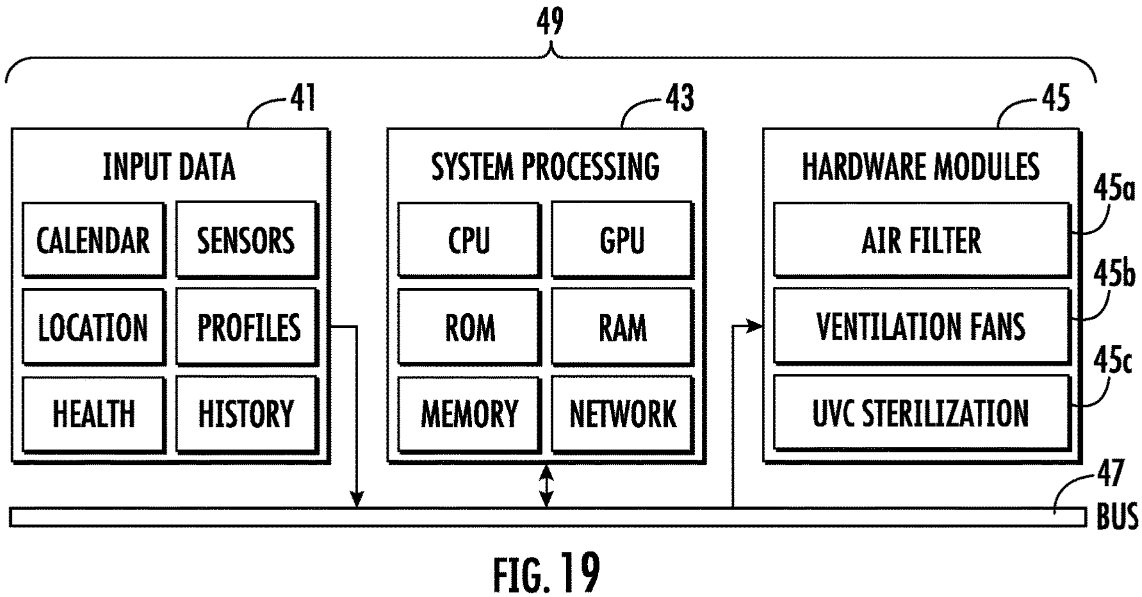
FIG. 19 is a schematic drawing of an exemplary computer system of a stand-alone private space enclosure according to an aspect of the present disclosure.

In more detail, the microcontroller 46 is electrically coupled to the CPU 48 for receiving instructions, and is electrically coupled through a bus 47 to a number of input data 41 and hardware modules 45 such as, but not limited to, lights, the actuator 44 for actuating the moveable workstation assembly 30, and the fan 60 (and any other fan within the stand-alone private space enclosure 10) for urging air into and circulating air within the interior of the stand-alone private space enclosure 10. As shown in the schematic of FIG. 19, a number of input data 41 are received by the system processing module 43 and turned into instructions for the hardware modules 45. The input data 41, system processing module 43, and hardware modules 45 all are in electrical communication through a bus 47.

The removable panel 40 may include a window 62 to allow air on the outside of the stand-alone private space enclosure 10 to be urged into the interior of the stand-alone private space enclosure 10. The stand-alone private space enclosures 10 of the present disclosure are typically constructed to provide the user of the stand-alone private space enclosure with independent air temperature control of the environment within the stand-alone private space enclosure. Also, the outside air may enter through the window 62, pass through an air filter 58, which is typically a high efficiency particulate air (HEPA) filter, but alternatively or in addition to the HEPA filter also be an electrostatic filter, pleated filter, or other air filter, then through the fan or fans 60, and finally through the register 52 on the interior of the left side wall 14. In this way, fresh, filtered air may be circulated through the stand-alone private space enclosure even when a user is within the stand-alone private space enclosure for an extended time without opening the door. The air filter 58 and fan 60 may be assembled into a shroud 64 having side walls 66 and 68 to better guide the air and prevent leakage into the left side wall 14 as the air is urged through the window 62, the air filter 58, the fan 60, and the register 52. It should be known by one of ordinary skill in the art that the order of the filter and fan may be reversed without deviating from the scope of the disclosure.

Figure 20:
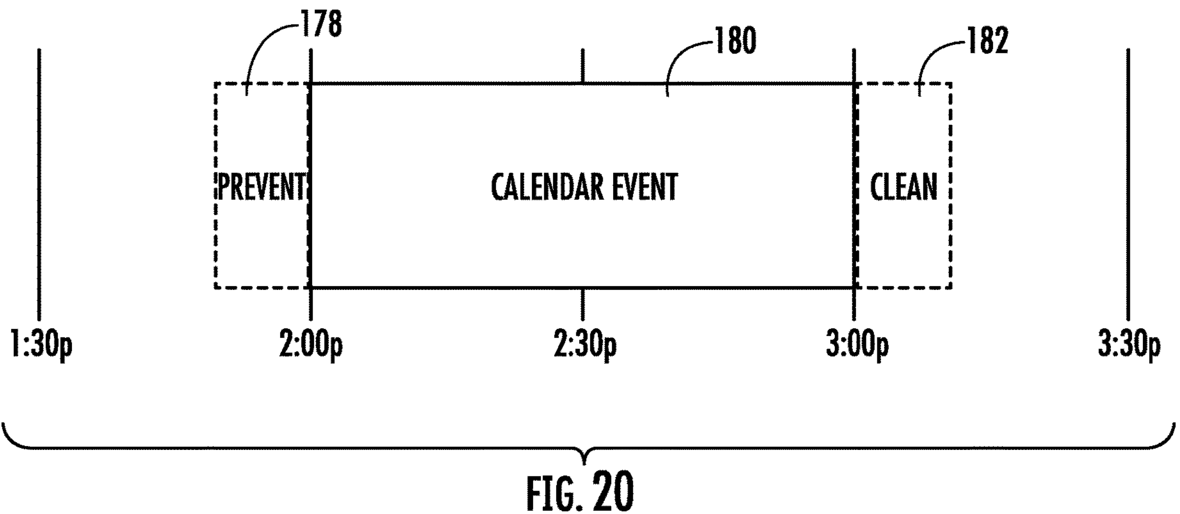
FIG. 20 is an example preparation and cleaning schedule around a given calendar event of a scheduling system of a computer system integrated with or associated with a stand-alone private space enclosure according to an aspect of the present disclosure.

Looking at FIG. 19, when not occupied, hardware modules 45*a*, 45*b*, 45*c* may trigger based on upcoming calendar events 180 at a pre-occupation time 178 to pre-filter, sanitize, and cool/heat or otherwise condition the space to a predetermined level customized to the particular user before the user arrives to use the stand-alone private space enclosure. Similarly, at a post-occupation time 182 (See FIG. 20), certain hardware modules 45*a*, 45*b*, 45*c* may be activated in order to clean or sanitize the environment within the stand-alone private space enclosure 10. After operating hours, the hardware modules may not activate to save on electricity cost. Occupancy sensing can overwrite this function.

The system processing modules 43 may use input data 41 to sense occupancy status and control hardware modules based on current occupancy status. For instance, when the status is unoccupied, the system processing modules 43 may turn off or slow down hardware modules 45 to save energy. When occupied, system processing modules 43 may activate hardware modules 45 to provide cool, filtered air ventilation or conceivably heated air ventilation.

Temperature data may be actively monitored and fan speeds automatically adjusted to maintain temperature control. Humidity data may be actively monitored and fan speeds automatically adjusted to maintain proper humidity control. Air quality may be actively monitored via the VOC sensor and shared in real time with the occupant and admin. Data from the VOC sensor is also used to adjust fan speed, change the air filter, and activate UVC light. Microphones may be included in the hardware modules and may be utilized to actively listen to fan noise. This information can be applied to adjust the fan speed or activate noise cancellation via the internal speakers. Fan RPM speeds may be monitored to ensure fans are correctly operating at the current set setting. Fan speeds may also be adjusted on-demand by the user through the unit display, mobile device, voice commands (microphone connected to computer module), or by web interface as detailed below.

Among other sensors that may be included within the hardware modules 45, a location sensor may calculate GPS Coordinates which can then be used to determine the local weather, sunrise/sunset, time and date. This information can then be used to optimize hardware modules to maximize user experience and comfort. Specific user profiles may be set up such that users, groups, or company profiles can house custom settings that when present in a space control the hardware modules 45 with custom specifications.

Fixtures, schedules, and settings can be adjusted based on best practice of health standards at the current moment in time. When the system processing modules sense from the input data 41 that occupancy turns from occupied to unoccupied (with no upcoming calendar event) the system may initiate a cleaning cycle, which may include a sanitization cycle consisting of locking the door, speeding up the fan and air filtration system, displaying cleaning information on the touch display, adjusting the lighting, and if present turning on UVC Lighting. An administrative dashboard may monitor, inform, and automatically distribute HEPA Air Filters when they need replaced. The geolocation coordinates of the environment can be determined via a computer module 49 located within the environment (via GPS, 4G/5G, WiFi, or other methods).

Fixtures, schedules, and settings can be adjusted based on best practice of health standards at the current moment in time. The system processing modules 43 may compute and track lifetime airflow through the HEPA filter near the intake fans, and determine how much life the filter or filters have left. The System sends notifications to automatically send replacement HEPA filters to the environment's location.

Space heaters and cooling systems may also be included within the hardware modules 45 and used to automatically optimize temperature for users' comfort and performance. Spaces can be pre-heated or cooled before arrival of the user using heating and cooling elements.

In an embodiment shown in FIGS. 13-14, the removable panel 40 may be larger in order to allow access to the back side of the monitor 34 and other elements including the workstation frame 80 of the moveable workstation assembly 30.

Adjustable Privacy within a Stand-Alone Private Space (Workspace) Enclosure

FIGS. 63-64 show different levels of transparency of the stand-alone private space enclosure 10. Users may have the ability to increase or decrease the amount of transparency on the clear panels of the door 24 in the environment. This enables controllable privacy when occupying the environment.

The door 24 may include an overlay film 25. The overlay film 25 material may be any of, but not limited to, the following: LED film (for example 14 mm Transparent LED Film), electrode tinted film (when stimulated with electricity, film changes its opacity), auto-adjusting photochromic solar film and Polymer Dispersed Liquid Crystal (PDLC) glass or film which changes opacity and image content when stimulated by electricity.

This tinted glass 23 or overlay film 25 may be connected to the system processing module 43 with Internet connectivity, and may automatically adjust privacy based on unit occupancy, profile preferences, and predetermined administrative settings. The overlay film 25 may be combined with a touch element to allow users to interact with the glass 23 or overlay film 25 and control different displays such as but not limited to transparency, way-finding directions, weather information, digital signage and advertising, occupancy status, and on-off status. The display of information may be adjusted on-demand through the unit display, mobile device, voice commands (microphone connected to computer module), and web interface. The display of information on or within the glass portion of the door may be achieved through the use of LED glass, in particular POLYMAGIC®, which incorporates LED light sources into laminated glass panels without visible wires, as well as polymer dispersed liquid crystal (PDLC) film that is a film placed over a base glass or plastic layer. U.S. Pat. Nos. 10,824,001 and United States Patent Application Publication Nos. US20210237638A1 and US2013171375A1 are hereby incorporated by reference in their entirety. The display may also be used to prevent theft by changing the image or transparency (to opaque) when locked to prevent the interior contents of the environment (including displays) from being viewed by external parties.

The displays of the overlay film 25 or glass 23 may be available in a wide range of custom colors, designs and patterns. The display may not be only in an on or off state, but can also be adjusted granularly to change the opacity, color, and content displayed on the overlay film 25. The Internet-connected system processing module may leverage local weather data (such as, but not limited to, sunny, cloudy, humidity, and rainy) in addition to the interior conditions of the environment (such as, but not limited to, internal temperature, occupancy, humidity, air quality), to adjust the display on the glass 23 or overlay film 25 to match exterior weather conditions as well as change to reduce the internal temperature of the environment by blocking out exterior light from external sources such as sunlight, UV, or artificial light.

The tinted overlay film 25 or glass 23 can be a transparent video display that can exhibit any color, copy, and content. When displays of stand-alone private space enclosures 10 are physically placed next to each other they can work together, offering a more expansive and interactive display. The tinted film 25 or glass 23 can work across multiple stand-alone private space enclosures 10 and across spaces and times to convey information collectively. For example, one of the stand-alone private space enclosures 10 may display the current time and/or temperature, the next in a series may display the current radar when precipitation is in the local proximity of the stand-alone private space enclosures, another might display a hazardous weather or governmental alert or perhaps traffic conditions for a commute for a user about to enter the stand-alone private space enclosure 10 so they are aware of possible issues facing them on their trip home or to another off-site location for a meeting or event after the use of the stand-alone private space enclosure 10 is completed. One or more of the stand-alone private space enclosures 10 may also display information such as motivational phrases or communication executive teams to a group as a whole. If the stand-alone private space enclosures 10 are in a public location, the units may display advertising for the sponsors of the stand-alone private space enclosures or information about their possible use, such as for medical attention from a medical provider with a certain specialty located remote from the stand-alone private space enclosure. Units of the stand-alone private space enclosures 10 in different geolocations can synchronize to play the same content at the same time. This may be done by connecting each unit's computer module 49 to the Internet and backend servers (not shown) which synchronize content across a number of stand-alone private space enclosure units 10 at different locations at a given time. The geolocations may be world-wide, continent-wide, or as granular as a single location. For instance, all stand-alone private space enclosures across Europe may display the current score of one or more sporting events relevant to the location of the stand-alone private space enclosure such as a European Championship football match currently underway or recently completed, while different stand-alone private space enclosures within a single airport in the United States may display flight status and gate information or other news or sports information. Conceivably, the exterior might display live or recorded video information; however, this would typically not be the case since the person or people using the stand-alone private space enclosure 10 typically will want some amount of privacy when using the stand-alone private space enclosure. It is possible to have the stand-alone private space enclosure 10 only display information to a potential user or viewer of the stand-alone private space enclosure when the stand-alone private space enclosure is unoccupied such that the lack of a display of information in and of itself is an indicator that the stand-alone private space enclosure is not in use or otherwise occupied. This would typically be a feature of the stand-alone private space enclosures in a public use area, but could also be the case in a private use environment, such as at a company or other organization where the public at large does not have access to the stand-alone private space enclosure.

The tinted overlay film 25 or glass 23 can be used for display of advertisements based on nearby foot traffic, retail stores, geolocation, and demographic information of users. The camera 84 located inside or one located on the outside of the enclosure 10 (not shown) may utilize people counting technology (such as but not limited to GOOGLE® ML Kit or BLAZEFACE™ algorithm) to survey and display advertisements on the tinted glass 23 or overlay film 25 to nearby foot traffic.

The tinted overlay film 25 or glass 23 may also have an option to transition on and off with motion (i.e., curtains going up and down). Owners and administrators of the enclosure may control the level of transparency in public spaces for the safety and concern of others through the unit itself or via a management dashboard website which connects to the unit via Internet connectivity.

The tinted overlay film 25 or glass 23 may interface with interior components such as the speaker, display, and lighting to help create immersive scenes. The overlay film 25 or glass 23 can match interior scenes by adjusting transparency and displaying relevant content (such as but not limited to coral reef footage for underwater scenes).

Artificial Intelligence (AI) Controlled Ergonomic Desk and Posture System

To maximize the productivity and wellness of users within an environment, monitoring the proper posture of the users within the environment of the enclosure 10 is important. By providing users with feedback (through audio or visual methods) and being able to automatically adjust the environment of the enclosure 10 to support a proper posture, the environment can support this goal. The enclosure 10 may provide real-time posture feedback to users. If the user desires, the enclosure 10 may show a digital avatar of the user's current posture on a display in the environment, a user can see how their movements affect their current posture. Not only can the position of desks and screens within the enclosure 10 impact a user's posture, it can also impact the alertness and mental state of a user. When a user wants to heighten their alertness level, the environment can suggest a standing position to a user. Musculoskeletal pain and other disorders can be eased by arranging the environment of the enclosure to reduce the strain on a user's body.

The system processing module 43 may leverage input data 41 such as frame data from the camera 84 and computer vision to automatically read a user's height. The system processing module then may use the user's height and automatically move the desk 32 up or down to provide the most ergonomic fit for the current occupant.

The system processing module 43 can calculate the current height of the desk 32 by using length-feedback mechanisms built into the actuator or actuators 44 controlling the desks as input data 41. The length-feedback mechanisms are connected to the enclosure's computer module 49. The height of the desk 32 is then calculated by adding the height of the actuator's 44 lowest position (a fixed height known from the position the actuator 44 is mounted) and the current extended length of the actuator 44 (known from the length feedback mechanism). All other items attached to the desk 32 (camera, microphone, display, etc . . . ) can have their position calculated by comparing the height of the desk to the mounting point of these key components.

The system processing module 43 may calculate the correct position of the desk 32 relative to the user's height using the following steps:

Step 1: The camera's current position is calculated from the desk's current calculated position and the predetermined height of the camera 84 relative to the position of the desk 32.

Step 2: The camera 84 is used as input data 41 in the system processing module 43 which uses computer vision (such as but not limited to GOOGLE®'s ML Kit-Blazeface algorithm, TENSORFLOW®, or other similar computer vision algorithms) to calculate the position of a user's key body landmarks (shoulders, face, head, chin) relative to the position of the camera 84.

Step 3: The desk 32 is then moved up or down through the actuator 44 depending on the user's position from Step 2 compared to a predetermined ideal desk position.

Steps 1-3 are repeated until the user is at the optimal standing/seated position based on the user's calculated position.

Additionally, the system can also adjust for optimal camera or microphone height when on a video call or recording video. This may be accomplished by using the following process:

Step 1: The camera 84 is used as input data 41 to the system processing module 43 which uses computer vision to calculate the position of a user's face relative to the position of the camera 84.

Step 2: The desk is then moved up or down via the actuator 44 depending on the calculated position of the user's face from Step 1 compared to a predetermined ideal position of their face relative to the frame.

Step 3: Steps 1-2 are repeated until the user's face is in the predetermined optimal position within the camera frame from the camera or microphone.

The camera 84 may be used as input data 41 to the system processing module 43 which may include body-tracking algorithms which recognize slouching and poor posture, sending user-friendly nudges and tips on how to be more ergonomic to users of the environment in various ways as described below.

This is done via computer vision algorithms (such as but not limited to OpenCV, GOOGLE®'s MLKit-Blazeface and/or pose detection algorithm, and/or other similar facial tracking computer vision algorithms) to calculate the landmarks of a user's body while they are working. When a user's posture is deemed to be in a poor position based on known and preloaded characteristics for an extended period of time, the user may be notified via visual, lighting, tactile, and audio methods to adjust their posture.

The system may recommend the best time of day to sit or stand by utilizing sunrise and sunset information gathered by the system processing module 43 from the Internet in combination with a set of default preferences or a specific user's preferences for how long they should stand and sit during the day. The system of the enclosure may then notify the user when they've been standing sitting for too long (via notifications on displays and speakers) and may automatically adjust the desk or provide a pop up or other notification for the user to accept the desk height change, at which time the desk 32 may automatically change height.

The cameras 84 and monitor 34 may work together to show a real-time body assessment through a digital avatar to showcase a user's posture and inform them of a potentially more ergonomic position. This is done by tracking key points on a user using a computer vision algorithm and mapping them to a digital avatar shown on display.

Cameras 84 within the environment of the enclosure can be used as input data 41 to the system processing module 43 monitor the hand and arm behavior of users within the enclosure to determine if they are left or right handed. This can be used to change the user interface (UI) of displays within the environment to better suit the handedness of users by moving the UI elements on displays closer to the natural position of the user's dominant hand.

The position of the desk 32 can also be controlled manually by users through the touch controls on displays, via a mobile device, voice commands through a microphone connected to the onboard computer, or a web interface.

To prevent excessive wear-and-tear on the components within the enclosure, the enclosure's desk functions can be controlled via the cloud with a website management dashboard that is accessible to a user remote from the enclosure itself. The website management dashboard is remotely connected to the enclosure through the Internet capabilities of the system processing module 43. Some but not all of the functions available to the remote user includes the ability to enable, disable, and configure height adjustment, range (minimum and maximum height), and limit how frequently the desk can be adjusted up and down. To prevent further damage to the mechanisms which move the desk 32 in the enclosure 10, the system may proactively warn users not to interfere with the desk 32 while it is moving by showing notifications on the monitor 34, which is typically an LCD or OLED or a touch sensitive display, playing sounds on speakers or stopping the movement of desk mechanisms when there are issues with the movement of these mechanisms.

To help improve a user's state of alertness within an enclosure, the primary angle of the user's gaze can be adjusted by placing displays at an optimum angle. By using computer vision tracking algorithms, the user's primary angle of gaze can be determined. By placing the displays at a higher position (so they require a user to gaze more upwards as opposed to downwards), a user can change their brain's focus state to emphasize more creative or inspirational work. By placing the displays at a lower position (so they require a user to gaze more downwards as opposed to upwards), a user can change their focus state to better impact detailed or accounting work.

The systems of the enclosure 10 may also recognize if a chair is present by using computer vision algorithms and adjusting desk position accordingly. If a chair is not present, the system suggests a standing position for desks within the stand-alone private space enclosure 10. If a chair is present, the system determines if the chair is in an optimal seated position. The system then suggests the chair to be moved to an optimal seated position within the enclosure 10 through visual or audio methods.

To reduce the perceived noise of the desk moving mechanisms within a stand-alone private space enclosure 10, the stand-alone private space enclosure 10 can play sounds and/or increase volume. The sound of the desk moving can be measured by the microphones within the the stand-alone private space enclosure 10 to understand the natural loudness of the moving process. The system can then play an inverse-sound wave to reduce perceived noise level. The system can also increase the volume level of the speaker while the user is listening to sounds (such as on a video call or listening to music or other sounds such as a guided meditation).

The monitor(s) 34 in the stand-alone private space enclosure 10 can coordinate with the position of the desk 32 to show content that synchronizes with the display or monitor 34. For example, the display may show a digital wallpaper that moves up and down to give the user the feeling as if they were moving up and down an elevator.

Neurosounds within an Environment

Neurosounds (including but not limited to: isochronic tones, monaural beats and binaural beats) which influence a user's brain waves and mental states may be played within an environment of a stand-alone private space enclosure 10. ASMR (autonomous sensory meridian response) is a relaxing, often sedative sensation that begins on the scalp and moves down the body. Also known as "brain massage," it's triggered by placid sights and sounds. By leveraging haptic feedback, temperature, humidity, visual images, and environmental lighting combined with audio sounds, the stand-alone private space enclosure 10 can help to achieve the desired effect on users.

Leveraging headphones (either wired or wireless) or a built-in system of one or more speakers placed above, in-front, or around one or multiple users within a stand-alone private space enclosure 10, audio sounds play to the multiple channel audio system via a computer module 49. The speaker system may also be in the form of a soundbar as opposed to a typical single or individually wired speaker. The speaker system may output spatial audio by leveraging digital codecs: DOLBY® and DTS® (instead of analog audio which suffers from degraded audio quality) to provide crystal clear audio that immerses users within a stand-alone private space enclosure 10. Users can then select the desired audio frequency to achieve the desired effect via voice, touch, or cloud-based controls. The speakers may be placed in the top wall and oriented downwards toward a user in the stand-alone private space enclosure 10. This allows the speakers to produce a more direct and audible sound for the user. This also allows the speakers to reduce the overall noise output in the booth as it will not need to be as loud for the user to properly hear.

Activating audio tones and rhythms at certain frequencies can impact a user's mental and physical state during their time in a stand-alone private space enclosure 10 and shortly after their session. For instance, Delta (1-3 Hz) brain waves have the slowest frequency and the highest amplitude. Playing this frequency can assist users in falling asleep easier and also repair and recover quicker from injuries or daily physical stress. Theta (4-7 Hz) brain waves indicate a dreamy and relaxed state. Playing this frequency can assist users during meditation and stress-free relaxation. Alpha (8-12 Hz) brain waves are slower and larger, associated with normal relaxation while waiting for external stimuli to affect it. Playing this frequency can assist users to reach a neutral leveled state. Beta (13-38 Hz) brain waves have a faster and shorter frequency associated with levels of concentration or mental and intellectual activity. Playing this frequency can assist users to reach a higher focus and alertness level. Gamma (39-42 Hz) brain waves are faster blips of subtle vibratory states, usually associated with regulating perception and consciousness. Playing these frequencies can assist users to improve memory, heighten focus, improve reaction times, and verbal recall.

Automated Configuration for Immersive Environments

The stand-alone private space enclosure 10 may use embedded technology to carefully influence users' brain waves in a process called Neurofeedback. Neurofeedback is a form of alternative treatment wherein brain waves are retrained through auditory or visual stimuli, such as using music or watching videos, to influence brain waves according to our desire. Through neurofeedback, we can boost attention, enhance memory and creativity, and also promote communication skills. It can additionally be used to treat anxiety, depression and promote a better quality of sleep as well. Neurosounds can be used to achieve better brain health, learning abilities, as well as enhanced cognition.

The computer system may couple with the display or monitor 34, speakers, and interior and exterior lighting to combine audio, video, and illumination elements to create an immersive scene within the stand-alone private space enclosure 10. For example: when a user selects an underwater scene, the displays or monitors 34 may show footage of deep-sea marine life, the speakers may play bubble sounds, and the lighting elements may illuminate the interior of the stand-alone private space enclosure 10 by color matching the underwater display visuals. Switching to a forest scene the monitors 34 may show footage of trees, the speakers may play bird sounds, and the lighting elements may illuminate the interior of the stand-alone private space enclosure 10 by color matching the forest display visuals. This provides a multitude of user benefits such as: inspiring and empowering users, improving focus and alertness, and aiding relaxation and mindfulness.

The content library available to a user and stored on the system processing module 43 of the stand-alone private space enclosure 10 may be modified at any time via directly connected readable media such as read/write DVD's or USB connections, and over the air updates. The AI-powered system may utilize the stand-alone private space enclosure 10 and specific user data to auto select and play an immersive scene. Alternatively. playback of an immersive scene can be controlled by the user. Adjustments can include audio volume, video footage playback speed, immersive lighting controls.

LED light strips of the LED lighting square 108 included LEDs with full spectrum RGB pixels that may illuminate the interior of the stand-alone private space enclosure 10, and may be given color, animation, and position data from the display or monitor 34 and the CPU 48 to visually expand the displays' content in real-time. The LED light strips may be placed throughout the stand-alone private space enclosure 10 to work together with other elements of the stand-alone private space enclosure 10 to create a spatial light stage. Further, the LED light strips can be used independent of the display 34. Scenes that can be played on the monitors 34 can include but are not limited to: nature footage, drone footage, animations, motion graphics, intellectual property (studio partnership), historic footage, company branded content, cityscapes, walking tours, artist renderings (NFTs), food, concerts, community events, and live streams. At the same time, speakers may output audio tracks that match video content, leveraging neurosound technology, or are from personal audio applications that can play over or replace track matching video.

While the on-board processing systems may use programmed AI to determine scenes, users may also manually select immersive scenes from a content library where they can also adjust, among other things, the audio volume of scene, audio volume of user selected song/playlist playing over the scene, playback speed (frame rate) of video content, and brightness/color of lighting elements. The user may also have the ability to: toggle on/off: audio, video, and lighting, auto play and loop scenes, discover the scenes source: video footage location, audio track, time of day/year, and copyright information, and save default scenes to a user profile for automatic presentation across all capable enclosures.

Automatic Configuration of Circadian Environments

Circadian rhythms are physical, mental, and behavioral changes that follow a 24-hour cycle. These natural processes respond primarily to light and dark and affect most living species. Circadian lighting refers to lighting that is designed to have a biological impact on the human circadian system, and is designed to follow the rhythm as shown in FIGS. 63-64. Circadian lighting sends signals to the master clock in the brain, telling our bodies when it is daytime and when it is night and what functions to perform at various times of the day. A healthy circadian rhythm is associated with improved long-term health and helps promote better sleep at night, allowing our brains to repair our bodies as well as our minds.

Lighting to optimize circadian health continues to gain popularity and many businesses are interested in circadian lighting as a means of and understanding whether happier, more energized workers result in increased productivity. From a business standpoint, the benefits of circadian lighting go beyond wellness and offer a new way to increase employee retention rates and harness a more productive and motivated workforce. Some studies suggest circadian lighting can promote productivity in the workplace, citing an increase in people's energy and vitality-particularly at the start and middle of the day.

Wellness is becoming more of a central theme in the design and a critical part of each of our daily routines. It is known that subtle changes in lifestyle can allow people to feel better, which has a significant ripple effect on people's overall feelings of well-being. Circadian lighting is one way spaces can be designed to create subtle, yet meaningful change in lifestyle. With true circadian lighting, people's bodies are getting better daytime light signals which can help improve sleep, mood, and an overall sense of well-being.

Figures 65, 66:
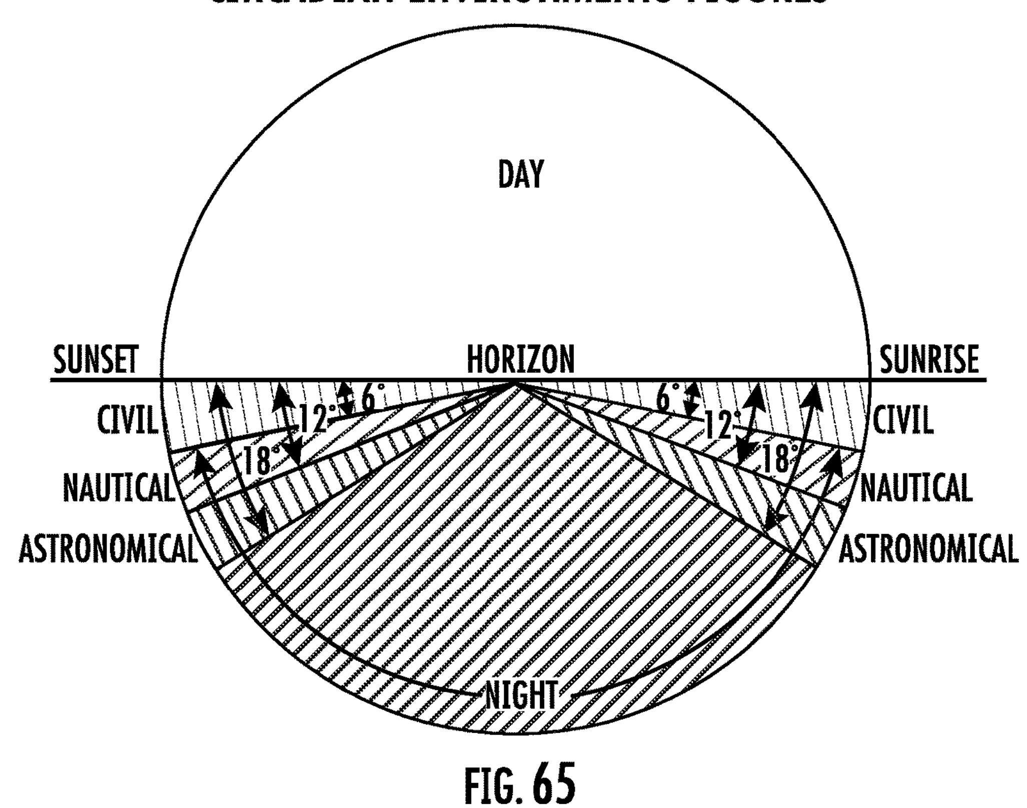
FIG. 65 is a diagram showing lighting during different times of day that may be implemented in a stand-alone private space enclosure according to an aspect of the present disclosure.
FIG. 66 is a diagram of one example of a circadian rhythm of a person.

By using lighting elements (including the LED lights of the LED lighting square 108, monitors 34, and photo-emitting elements) placed at various positions within the stand-alone private space enclosure 10 that have the ability to change both color (RGBW) and brightness, the stand-alone private space enclosure 10 can automatically change to replicate the natural lighting state of the outdoors. The GPS location of the stand-alone private space enclosure 10 can then be used to calculate the position of the sun throughout the day as shown in FIG. 65. This GPS position can be used to determine the amount of natural lighting provided by the sun at a given time of day.

During the night or times where sunlight would otherwise be absent according to either the sensed location of the enclosure or a user defined location, the lighting elements may automatically reduce in brightness and also reduce the amount of blue light while increasing the lighting temperature OR "orange" color of the lighting elements. As the sun progresses in its cycle through the day like shown in FIG. 66 at the given GPS location, the lighting elements may progressively increase in "temperature" and become less orange and whiter while also increasing the amount of blue light present in the lighting elements, peaking at "solar noon". After "solar noon", the lighting elements may then reverse their cycle and slowly become dimmer, reducing in temperature and increasing in "orange" light while reducing the "blue" light present in the lighting elements. Users can alternatively control and cycle through the circadian lighting stage and enablement via the touch, voice, and cloud-based controls.

In addition, by using the GPS location of the stand-alone private space enclosure 10, the current and forecasted local weather data can be retrieved. This weather data includes but is not limited to: temperature, humidity precipitation, cloud cover, air quality, UV Exposure, weather warnings. This weather data can also be used to provide visual and auditory warnings in case of weather emergencies. Weather data can be used to calculate the differential in sunlight between "perfect" (perfect visibility, no cloud cover, rain or wind) weather and the current weather. This differential is then used to change the color of the lighting elements to optimize the impact on the circadian cycle of the users.

Leveraging a camera element within the stand-alone private space enclosure 10 to determine the current illumination level of the stand-alone private space enclosure 10 and its surroundings, the lighting elements within the stand-alone private space enclosure 10 can be adjusted to match the desired lighting state and to mirror the external lighting state. Display elements within the stand-alone private space enclosure 10 can automatically change their brightness (nits) and follow the same color (blue/orange/white) change and temperature process as other photo-emitting elements within the stand-alone private space enclosure 10. Display monitors 34 can also change their interface to leverage "dark" mode settings to reduce emitted light or also to leverage "light" mode settings to increase the emitted lighting during various times of the lighting cycle. If desired, the display elements 34 can also play videos/scenes involving the position of the sun (e.g. sunrise→solar noon→sunset) throughout the solar cycle.

By leveraging the day of year and time of day, the stand-alone private space enclosure 10 can suggest to the user or automatically change the behavior of the lighting elements within the stand-alone private space enclosure 10. In particular, to increase the lumens produced by lighting elements within the stand-alone private space enclosure 10 to prevent seasonal depression or seasonal affective disorder ("winter blues"). The time of day can also be leveraged to notify the user it is close to a preset bedtime and reduce brightness of the lighting elements accordingly.

In addition to changing the behavior of lighting elements, the temperature and humidity of the stand-alone private space enclosure 10 can be altered to improve the circadian cycle in combination with knowledge of local weather data. Adjusting the stand-alone private space enclosure's temperature and humidity levels in the beginning portion of the sun cycle the users can be assisted in "waking up". As "naturally sleeping" hours approach, the temperature and humidity levels can be correspondingly modified based on users' preferences to assist them in improving their ability to sleep.

The circadian cycle can also be supported by adjusting the scents and smells within the stand-alone private space enclosure 10. By releasing scents via a dispenser into the stand-alone private space enclosure 10 at different intervals through the day, various desired states for users can be supported. This dispenser is connected to the system processing module 43 located within the stand-alone private space enclosure 10 and may release scents at intervals based on user controls (via touch, audio, or cloud-based inputs) or at pre-programmed intervals. In the "waking" hours of the day, wakeful scents (such as the smell of coffee) can be emitted. In "naturally sleeping" hours of the day, sleeping scents (such as the smell of lavender) can be emitted. During times when users want more focus, scents that induce a focus state (such as the smell of rosemary) can be emitted.

In addition to the normal circadian cycle, the stand-alone private space enclosure 10 can also help to adjust users experiencing "jet lag" to their new time zone by operating all lighting elements as if they were providing a circadian lighting cycle of a location between the current location and the previous location of the users. Doing this helps to slowly acclimate the users to the natural lighting of their new location.

AI System for Virtual Meeting Environments

Looking and sounding professional during a virtual meeting or video recording is essential. Using an AI-based system which automatically adjusts the enclosure's conditions to improve users' appearance, and video and audio quality. The input data 41 system, system processing module 43, and hardware modules 45 (collectively referred to as the computer module 49) may utilize a camera and an actuator to automatically adjust to optimize the user's appearance on a video call. As an example, the following process may be used:

1. Using computer vision algorithms (GOOGLE's® ML Kit, Blazeface, or other TensorFlow-based algorithms), the computer module 49 can detect the presence of users' faces within a camera feed.

2. The relative brightness of the users' faces within the camera frame is measured.

3. If the users' faces are too poorly lit, increase the brightness of the enclosure's lighting elements. If the users' faces have too much light shining on them, decrease the brightness of the lights.

Repeat steps 1-3 until the desired brightness of the user's face has been achieved.

When the system starts a live camera feed, the lighting elements are automatically increased in brightness to produce the best quality on the video call. When the camera feed is stopped, the lighting element adjustments for video conferencing are disabled. To provide users with the most flexible stand-alone private space enclosure 10, this system works with all video conferencing and recording applications. When applicable, the system crops towards users' faces within view of the system's camera's by tracking the position of the faces and following their position through cropping and/or panning to always keep faces in the frame.

Within a video recording or video call, augmented reality (AR) video effects can be applied to users' faces and/or the stand-alone private space enclosure 10. Leveraging the video feed from the camera a machine learning system can separate the users from their stand-alone private space enclosure 10 with a digital mask. The users' masks can be placed within any virtual stand-alone private space enclosure 10. Utilizing this method an adjustable blur can be applied to the physical stand-alone private space enclosure 10. Users' digital masks can then be overlaid with digital objects such as sunglasses, t-shirts, makeup, and hats.

Video conferencing system works in tandem with virtual and augmented reality meetings in the metaverse. Video feed and depth map of a user's face and body can be used to control digital avatars within a 3D enclosure. Users may wear immersive headsets and/or leverage touch displays to access virtual meetings. Touch displays can also be used as a digital whiteboard within 2D and 3D meetings. Speakers embedded within the stand-alone private space enclosure 10 create a spatial soundstage to immerse users within their virtual meetings providing a greater sense of physical interaction. Private enclosures may become personal portals to access and experience mixed reality worlds.

Minimizing the number of cuts and vent holes within an enclosure 10 helps to reduce the overall cost of the enclosure's construction. By placing speakers within the same chambers as the enclosure's air vents and facing them outwards, no additional holes are required.

The enclosure's system processing module 43 is connected to contact sensors included in the input data 41 which indicate whether or not the stand-alone private space enclosure 10 is in a sound-dampening state or if certain components are in a state which allows sound to more freely pass from within the stand-alone private space enclosure 10 to the exterior (such as an open door or window). The system processing module 43 may automatically adjust the volume of speakers within the stand-alone private space enclosure 10 to play more sound from certain speakers (such as the interior speakers) and less sound to others (such as speakers near an open door or window) to reduce the amount of sound which leaks to the exterior of the stand-alone private space enclosure 10. In addition, the computer module 49 can reduce the amount of external sound picked up by internal microphones by selectively increasing or decreasing the sound gathered by the microphones based on their proximity to external sounds and components of the system which are not in an optimal sound-dampening state (such as an open door or window).

Natural lighting from the enclosure's exterior can impact the appearance of users located inside the stand-alone private space enclosure 10 when they are on a video call. For example, a large amount of light may enter from a window or door within the stand-alone private space enclosure 10, which can cause one side of a user's face to be brighter than the other. To compensate, the following steps may be taken by the system processing module 43:

Step 1. The enclosure's system processing module 43 may use the camera 84 within the stand-alone private space enclosure 10 to detect users' faces and compare the brightness at all angles to the desired brightness of the face.

Step 2. The lighting elements such as the LED lighting square 108 within the stand-alone private space enclosure 10 then may increase or decrease their brightness to balance the light based on the readings from step 1.

Step 3. Steps 1 and 2 are repeated until the desired brightness have been achieved.

Shared Docking Mechanisms for Personal Devices

When a stand-alone private space enclosure 10 is used by multiple users at different times, it is optimal if minimal effort is required to take full advantage of the enclosure's features such as displays or monitors 34, environmental controls, and other features within the enclosure.

In addition, it is most cost-effective if the enclosure's controls are modifiable by a single module (as opposed to one display for content, another controller for environmental controls, and another control mechanism for user settings). By combining all of the controls into a single module it greatly reduces the cost to build out the stand-alone private space enclosure 10. The use of wireless technologies can remove the reliance on cords to perform various functions, greatly increasing the resilience and reliability of the stand-alone private space enclosure 10. Additionally, in order to securely access a user's accounts, it is best if a user does not have to enter their credentials and passwords especially if they are in a public, stand-alone private space enclosure 10.

Instead of using separate control mechanisms for each environmental control (such as, but not limited to, a separate speed control for the fans, a physical switch for the lights, an up-down switch for the desk actuator, etc . . . ), all of these controls can be combined as UI elements onto a single touch display which is connected to a computer module 49 capable of controlling all elements within the stand-alone private space enclosure 10.

To allow users to leverage displays within the stand-alone private space enclosure 10 as a secondary monitor, via a wired connection, a special wiring setup must be used. By connecting an HDMI-to-USB converter module (capable of converting an input HDMI video signal to a USB camera input), a module containing USB inputs only (no HDMI inputs) can be used to provide signal from a secondary monitor to the compute. This video feed (which is recognized as a "camera" feed by the module) can then be mirrored on the display connected to the computer and the on-board monitor 34, effectively acting as a secondary monitor.

To leverage the touch display on the monitor 34 as both a control unit and a content display (ex. secondary monitor, audio/video player or video conferencing display), an overlay with the controls is placed over the content, as shown in FIG. 62. This overlay can be toggled by touching the display to obscure or reveal the underlying content allowing users to quickly change between their content and the control panel.

When using the display as a secondary monitor via an HDMI capture card, the compute (if using ANDROID®) must utilize a SurfaceView and OPENGL™ when displaying the content to minimize the overall latency of the underlying system. Using the standard ANDROID® camera 2 API on a TextureView makes the secondary monitor significantly less performant as the content takes longer to be properly displayed when compared to when it is sent from its source.

By storing all user profile information and settings in the cloud, a user can authenticate with a device either using the on-board computer to log in manually or the electronic lock device 70 coupled with the user's personal device and have their content and accounts be synchronized with the core computer module. Then, the computer module's BLUETOOTH® capabilities and BLUETOOTH® handshake present by an app installed on users' phones, users can be recognized and authenticated as being in the stand-alone private space enclosure 10. Once a user's phone is detected within the radius of the stand-alone private space enclosure 10, they can receive a push notification to authenticate that they are the ones within the stand-alone private space enclosure 10. By accepting this push notification, the user's profile, environmental control settings, and app authentication can be transferred to the computer module within the stand-alone private space enclosure 10. This allows the user to access their accounts and environmental settings without having to enter their passwords on the device.

To recognize and identify users within a stand-alone private space enclosure 10, one or multiple cameras 84 placed within the stand-alone private space enclosure 10 connected to the computer module can capture the faces of the users within the stand-alone private space enclosure 10. This computer module, when connected to the cloud and combined with the facial recognition data from other enclosure, is combined to create an accurate facial recognition system across the network of enclosures.

To detect the presence of a specific user, the computer module 49 within the stand-alone private space enclosure 10 can scan for the BLUETOOTH® devices nearby. By comparing the BLUETOOTH® and/or MAC addresses of the devices nearby, the computer module 49 can detect which devices left or entered the vicinity of the stand-alone private space enclosure 10. By combining the presence of both the BLUETOOTH® device and the user's face we can determine with higher accuracy the presence of a specific user without requiring them to download an app on their phone or press an "authenticate" button on their phone because it is highly likely that a user's devices will only be nearby if they themselves are also nearby.

To reduce the reliance on a wired connection for leveraging the touch display as a secondary monitor, the computer module 49 provides wireless screen mirroring options. Using the GOOGLE® CHROMECAST®, MIRACAST® and AIRPLAY® 2 protocols, the computer module 49 offers the ability to wirelessly share content between users' devices and the displays within the enclosure 10. By leveraging an on-display passcode before screen sharing, we allow the user to limit who can share to the displays within the stand-alone private space enclosure 10.

To allow users to play their audio content on any speakers within the stand-alone private space enclosure 10, the wireless screen sharing protocols allow a user to play their audio content as if they were plugged directly into the speaker. This also allows the user to control the volume of the speaker directly from their device instead of having to interact with the speaker volume controls directly.

By recognizing and saving the device details (both locally and to cloud-based servers) whenever a user wirelessly screen-mirrors to the computer module 49, specific users can be identified (especially when combined with occupancy, facial recognition, and BLUETOOTH® data). This allows for re-authenticating a user by relying on the device they use when screen mirroring to a specific computer module 49 device. This eliminates the step of requiring a user to interact with their phone and give authorization for the stand-alone private space enclosure's computer module 49 to utilize the user's profile and account preferences.

Leveraging cameras within the stand-alone private space enclosure 10 and object detection computer vision algorithms (including, but not limited to, TENSORFLOW®, and GOOGLE®'s MLKit Object Detection), the stand-alone private space enclosure 10 can notify a user if they leave elements behind in the stand-alone private space enclosure 10 after their session is done (such as a purse, coat, or phone). When the stand-alone private space enclosure 10 detects a user has left the stand-alone private space enclosure 10 for an extended period of time and that an object has been left behind, it can notify the user using a variety of methods. Notifications can come in the form of: visual and audio notifications or an email/text message.

If a user leaves the stand-alone private space enclosure 10 temporarily and the system can detect a valuable item using the same methods as above (such as a phone, laptop, credit card, purse, or wallet), the stand-alone private space enclosure 10 can automatically lock the access control mechanisms of the stand-alone private space enclosure 10. The system can then optionally only allow the same user to unlock the access control mechanisms (either through their phone, BLUETOOTH®, ultra-wideband or facial recognition).

Network Methods for Connecting Decentralized Enclosures

The stand-alone private space enclosure's computer module 49 includes a wireless or wired connection to the Internet and cloud-based servers allowing remote control via a web interface of a number of functions of any given enclosure. This allows an administrator of a stand-alone private space enclosure or group of stand-alone private space enclosures to retain control of the stand-alone private space enclosures within their group. The functions include at least the following elements within the stand-alone private space enclosure 10: maximum and minimum volume level for speakers (including the ability to disable/enable the speaker for specific use cases such as video conferencing, streaming music, or playing media content), enabled/disabled status and maximum/minimum height of standup desk mechanisms within the stand-alone private space enclosure 10, on/off status and maximum/minimum speeds of the fans and cooling/heating elements, on/off status, maximum/minimum/default brightness, color overlay, and enabled/disabled circadian light cycle of lighting elements, on/off status, maximum/minimum/default brightness, circadian light cycle and color of display elements, current locked/unlocked status of any access control elements as well as the times when the elements will be able to be locked/unlocked, enabling/disabling the ability of users to change the locked/unlocked status of said access control elements, enabled/disabled status of any cameras including granular control over their enabled functionality (such as posture tracking, blink rate analysis, and occupancy tracking), and enabled/disabled status and maximum/minimum/default input volume of the microphones.

The stand-alone private space enclosure's computer module 49 can optionally be used to track the session length (measured as the time between when the access control mechanisms unlock to the time the stand-alone private space enclosure 10 is no longer occupied and the access control mechanisms lock). By calculating this time, users of the stand-alone private space enclosure 10 can be charged a fee on a time-based basis such as per-second, per-minute, per-hour or portions of hours, or any other portion of time deemed reasonable by the stand-alone private space enclosure's administrator. By identifying and authenticating users within the stand-alone private space enclosure 10 for the duration of the session, users can be charged for their usage based on cloud-based user profiles that are stored on servers. These profiles can contain multiple payment methods such as credit cards, bank accounts, crypto currency, and even business profiles. Through the use of business profiles, a user can have their usage expensed directly to a company without having to provide a payment method.

In addition, the web dashboard on the monitor 34 or on a remote computer connected to the stand-alone private space enclosure 10 through the Internet can control methods of access and pay to the stand-alone private space enclosure 10. The control methods may include price to access and use of the enclosure including cost-per-second, booking fees, cleaning fees, late-checkout fees, or damage fees, maximum and minimum time limit the stand-alone private space enclosure 10 can be accessed and used in one session, types of payment methods accepted to enter the stand-alone private space enclosure 10 (such as, but not limited to, digital payment methods like APPLE PAY®, GOOGLE PAY®, and SAMSUNG PAY®, credit cards, and crypto currency), and the specific users who have access to the stand-alone private space enclosure 10 at a given time (such as employees or only executive-level employees).

The operating hours and other set times for the stand-alone private space enclosure 10 may also be set by the administrator, either remotely on using the on-board computer module 49. The periods that may be set beforehand includes, but is not limited to, when access to the stand-alone private space enclosure 10 will be permitted, when the stand-alone private space enclosure 10 will undergoing "self-cleaning", and when the lights, fans, displays, desk actuator, speakers, and microphones will be on/off or in a low-power state.

Because the geolocation coordinates of each stand-alone private space enclosure are determined (via methods described above), the enclosure can be aware of the location of nearby enclosures by leveraging their computer module 49 which is connected via the Internet to the cloud-based servers. This enables many capabilities including, but not limited to, allowing a stand-alone private space enclosure 10 to suggest a nearby available enclosure after a user's session has ended (to allow them to continue to use a stand-alone private space enclosure 10 if their current stand-alone private space enclosure is booked or will not be available), synchronizing the lighting elements/scenes, sounds played via speakers, content shown on displays, desk heights, and external signage of two or more stand-alone private space enclosures, notifying a user of other available stand-alone private space enclosures if there are no available stand-alone private space enclosures in the same building or company for an upcoming event on their calendar, displaying the real-time usage of all stand-alone private space enclosures on a digital map by combining usage data from the stand-alone private space enclosure's cameras, microphones, sensors, and computer module 49 with cloud-based servers to provide real-time usage information to a mobile or web interface, and providing directions on a map to a stand-alone private space enclosure 10. This map can be displayed on a web or mobile interface, or on displays within another stand-alone private space enclosure 10.

In addition to providing static directions, real-time directions can be provided to a user. This is done by using an ultra-wideband sensor connected to the computer module 49 of the stand-alone private space enclosure 10. The user then uses a phone (containing an ultra-wideband sensor) to direct the user towards the stand-alone private space enclosure 10. Once the user's phone is close enough to the stand-alone private space enclosure 10, the stand-alone private space enclosure 10 can optionally automatically unlock any access control mechanisms granting users access to the stand-alone private space enclosure 10.

Additionally, a user or owner of each stand-alone private space enclosure can customize their experience through a website or mobile application with the following capabilities, ability to connect applications through OAuth, JSON Web Token or other REST/SOAP standards, including, but not limited to: calendar applications (GOOGLE® Calendar, MICROSOFT® EXCHANGE®/OUTLOOK®, ICLOUD® Calendar, any other iCalendar specification compatible calendar, or others), video conferencing applications (ZOOM®, MICROSOFT TEAMS®, GOOGLE MEET®, WEBEX®, Blue Jeans, GOTOMEETING®, FACETIME®, SKYPE®, TWILIO® or others), music applications (SPOTIFY®, APPLE MUSIC®, TIDAL®, PANDORA®, SOUNDCLOUD®, or others), meditation applications (HEADSPACE®, CALM®, or others), and any other application capable of integration with the above standards.

The administrator further has the ability to create multiple "personal" or "business" profiles whereby a user can separate their connected applications and environmental preferences into different profiles which can be used within the stand-alone private space enclosure 10 at a given time. These profiles are then automatically downloaded to the stand-alone private space enclosure's computer module 49 allowing a user to access and use these accounts and profiles during their time in the stand-alone private space enclosure 10. After leaving the stand-alone private space enclosure 10 and logging out, these profiles and applications are accessible within the stand-alone private space enclosure 10. Some of the settings of the stand-alone private space enclosure 10 that may be adjusted per any given profile include, but are not limited to: dominant hand orientation, desk height preference, wheelchair accessibility, color blindness settings, preferred temperature, airflow, display text size, light color/brightness, and circadian cycle settings.

The computer module 49 may also store historical data of the use of the stand-alone private space enclosure 10. This gives administrators the ability of the stand-alone private space enclosure 10 to view historical usage and occupancy data for all stand-alone private space enclosures they own or manage and connect a calendar "room" allowing for users of a shared calendar system to book the stand-alone private space enclosure 10 as a "room" which can be added to scheduled meetings.

Integration with Mixed Reality Systems

The stand-alone private space enclosure's computer module 49 may automatically connect with mobile devices (smartphone, wearables), computers (laptop, tablets), and mixed reality systems (Virtual Reality (VR) headsets, Augmented Reality (AR) glasses). The computer module 49 may use the camera 84 as an input device to recognize when users are wearing mixed reality headsets and automatically configure the stand-alone private space enclosure 10 to accommodate mixed reality experiences. Configuration could include door locking (physical safety), lighting elements dimming, and display interfaces adjusting. The stand-alone private space enclosure 10 provides physical privacy and security for users when they are immersed in a mixed reality enclosure.

The system of the stand-alone private space enclosure 10 communicates physical enclosure data into virtual reality enclosures. For example, real-time desk size and height can be placed into a virtual enclosure enabling users to easily utilize the physical desk system while being immersed in a larger virtual space. This can provide users with a greater sense of space, immersion and freedom. Within public spaces, the external structure may be used as a canvas for personalized augmented reality signage. Depending on the users, signage could include wayfinding, advertisements, artwork, and relevant instructions.

The system of the stand-alone private space enclosure can also interact in real time with mixed reality systems (including touch displays, lights, speakers, fans, actuators, and access control mechanisms). When walking to a workspace, authenticated users wearing glasses or a headset can follow digital arrows navigating them to the space. Nearing entry of the space, visual and audio effects can signal confirmed access as the door unlocks for users.

Within web interfaces, 3D models and virtual demos may be utilized to showcase the product and its features when it is not present. Users can interact with a virtual stand-alone private space enclosure 10 that is at scale. Mixed Reality systems may further provide virtual guides and overlays on how to assemble, disassemble, swap components, and repair the stand-alone private space enclosure 10.

Active Noise Cancellation within Prefabricated Enclosures

Active noise control (ANC), also known as noise cancellation (NC), or active noise reduction (ANR), is a method for reducing unwanted sound through the addition of a second sound specifically designed to cancel the first. This method has become popular within high-end over-the-ear and in-ear headphones. The system of the stand-alone private space enclosure 10 may apply the best technical practices of active noise control within stand-alone private space enclosures. Noise control within stand-alone private space enclosures is essential for both privacy and comfort. Noise control can assist users in relaxing and focusing within noisy and distracting stand-alone private space enclosures. Personal noise control within the stand-alone private space enclosure 10 can also aid in reducing the noise experienced by users outside of the stand-alone private space enclosure 10. Using ANC removes the need to constantly wear headphones when working or consuming content. The technical system implemented on the computer module 49 is meant to assist sound dampening properties of a physical stand-alone private space enclosure.

Within the stand-alone private space enclosure 10, one or more microphones are placed on the stand-alone private space enclosure's exterior to measure sound from different directions of the exterior of the stand-alone private space enclosure 10. Analog-to-Digital converters from the external microphones then produce inverse sound waves from sound measured by the microphones. A system of speakers output this inverse sound wave which cancels out the incoming sound waves to reduce the perceived loudness of external sounds while inside the stand-alone private space enclosure 10.

Additionally, the sounds on the interior of the stand-alone private space enclosure 10 can be reduced through the opposite mechanism. This "reverse" noise cancellation system involves using one or more microphones on the stand-alone private space enclosure's interior to measure internal sounds. The Analog-to-Digital converters from the microphones then produce inverse sound waves which are then played on a system of speakers in the stand-alone private space enclosure's exterior to cancel out the sound waves originating from within the stand-alone private space enclosure 10. This helps reduce the perceived loudness of the sounds originating from within the stand-alone private space enclosure 10.

Artificial Intelligence (AI) Powered System for Personal Wellness

We spend a large majority of our days sitting at our desks hunched over our computer setups. This behavior has proven to have negative impacts on our mental and physical health. The computer module 49 or system may include an artificial intelligence (AI) powered system which leverages connected hardware and software to observe users' behaviors and guide them towards improved personal wellness. The AI-controlled personal wellness system is intended to provide users with an accurate data reading of their health habits during and after sessions. Wellness data may include, but is not limited to, sit vs. stand percentage, slouching posture, eye gaze, blink rate, session activity, session duration, and focus level.

The stand-alone private space enclosure 10 may be prefabricated with embedded technical components (camera, microphone, sensors, etc.) used to capture personal wellness data during a user's session. The AI-based computer vision system for identifying a user's age, weight, height, sex, ethnicity, body characteristics, body movements, user activity, facial expressions (emotions), personal belongings, and clothing being worn. When applicable with the panel configuration, the AI system monitors user activity of standing, sitting, walking, and/or biking. Third-party wellness applications (HEADSPACE®, CALM®) can run on the computer module 49 enabling users to connect their personal accounts to their private cloud-based profile.

The user's personal wellness data saves to a private cloud-based profile. The profile data can work across all stand-alone private space enclosures and can be accessed on mobile, web, and touch displays within stand-alone private space enclosures. Personal wellness data is displayed within interactive widgets on the touch display 34 allowing users to educate themselves on their wellness behavior. This data is shared through graphs, illustrations, and numeric data. The displayed data may include current and previous history of a user's wellness behaviors. If a user elects to opt-in, personal wellness data can be shared with third party health services such as APPLE® Health and GOOGLE® Health. Health badges and rewards can be offered to users who complete wellness challenges. Rewards can be offered by employers to incentivize employees for excellent performance.

Wellness data for each stand-alone private space enclosure 10 may be stored to the cloud through a secure method. Required data may be accessed by users and administrators via the web dashboard, while following required protected personal information protocols, including, but not limited to, personal health information protocols. Administrators may control wellness settings and features via the web dashboard to optimize and customize their workplace.

Science based research and information may be displayed alongside users' personal wellness data to provide an improved understanding of best wellness practices. Technical components and AI powered systems may assist users' behavior toward better health and wellness habits. Computer vision and depth sensing work together to know the accurate position and posture of users and how these change over time. The AI-system may provide visual and audio cues to help guide users toward improved wellness habits. The visual cues may include, but are not limited to, three-dimensional (3D) avatars, lighting color change, lighting flashes, lighting animations, motion graphs, and notifications. The audio cues may include, but are not limited to, volume change, tones, rhythms, and frequencies.

The AI-system may include a method using the computer vision systems detailed above and depth sensing tracks users' eye patterns. Tracking this data informs the system of a user's eye gaze (looking at laptop, phone, or outside), focus level (studying movement and rate of blinking), and alertness (tiredness within eyes and yawning). The AI-system automatically turns off or dims the display when users are not looking at it. Display brightens when a user is making eye contact or reaching their hand out to touch it. The AI-system may detect when users have fallen asleep by monitoring eye motion and body activity. This can trigger automatic sleep mode where the display turns off, the lights dim, audio volume lowers and the door locks. Sleep mode settings can be configured by the users and administrators at any time.

Further, a user's posture and exercises may be tracked and monitored and/or recorded. The AI-system may use the computer vision systems detailed above, depth sensing, and occupancy data to track users' body movements and positions. This method may be used to educate and support users' overall wellness. Some guided exercises use images, videos, and digital avatars to guide the users towards best practices. The guided exercises may include, but are not limited to, the following: stretching, yoga, strength training, cardio activities, posture correction, breathing exercises and meditation sessions. During meditation and mindfulness sessions, the camera system can monitor the users' heart and breath rate. This data is helpful to best understand the current state of relaxation for users in the stand-alone private space enclosure 10. The AI-system may further actively monitor the users' posture and position to provide numerical and graphical data on the users' current and historical performance. An on-screen widget may display a 3D avatar of a user's real-time slouch position. When slouching hits an unrecommended position for a certain duration of time, audio and visual nudges will be triggered.

To collect and monitor a user's wellness data, the AI system uses the camera 84 or multiple cameras 83 contained within the stand-alone private enclosure 10. The camera 84 has a capture rate that is greater than 30 Frames-Per-Second. This speed allows the camera 84 to accurately track a user's blink rate, posture and shifts in posture, and level of focus in real time. The AI system can make adjustments to the environment within the stand-alone private enclosure 10.

An interactive on-screen widget can provide users with the ability to set customizable timers. These timers can be utilized for an intention-based session by the users. Visual and audio cues will be triggered when the timer is near or at its end point. Users can set a text, audio, or video intention for themselves before the timer begins to encourage their particular focus. The AI-powered computer vision system can also monitor how much liquid a user consumes during a session. This works by tracking objects, body positioning, and length/angle of drinking action.

Third party telemedicine applications, for example, TELADOC®, BETTERHELP®, TALKSPACE®, SPRING HEALTH™, LYRA HEALTH™, and GINGER™, can run on the stand-alone private space enclosure's computer module 49. This enables users to easily talk to their doctor, coach, or therapist within a stand-alone private space enclosure 10. The AI-system may include certain health-based monitors like oxygen sensing. Adding additional oxygen into the stand-alone private space enclosure 10 to aid users in improving mental and physical health. Oxygen sensors may monitor the user's oxygen levels in real time and send live data to the computer module 49. The computer module 49 or computer system may then adjust oxygen levels based on user preference, scientific data, and admin controls. Effects on users are similar to having oxygen enriching indoor plants and/or healthy lungs. Breathing in more oxygen has been proven to improve mood, increase energy levels, improve concentration, improve sports performance, reduce stress, provide relief for headache and migraines and promote better sleep.

Emergency Services and Detection

Sound dampening and privacy enclosures are great for allowing users to focus and avoid external distractions, however there are some external sounds and distractions which are critical for users to be notified. In these situations, active detection of emergencies and warnings are important for the safety of users. Additionally, enclosed enclosures can represent safe spaces for users in times of emergency or when they are under threat. The stationary nature of enclosed enclosures also lends well to beacons or calling points to alert emergency services.

If an emergency is detected through any method, a combination of display notifications, audio sounds and tones, and lighting element state changes will inform the current occupants of the stand-alone private space enclosure 10 about the external warning. Microphones placed on the exterior of the stand-alone private space enclosure 10 listen for fire alarms and other sirens outside of the space and alert the user when an external sound indicates a warning. Leveraging the on-board GPS, the location of the stand-alone private space enclosure 10 (obtained via a computer module 49 located within the stand-alone private space enclosure 10) can be determined. These coordinates can then be used to pull relevant local weather information. When the local weather conditions indicate an emergency (such as a tornado, earthquake, or tsunami warning), the stand-alone private space enclosure 10 alerts the user.

Alarm systems, such as building lockdowns, fire alarms, earthquake warnings, and police active investigations can also be a source of notifications for users of the stand-alone private space enclosure 10. By leveraging a computer module 49 connected to cloud-based servers which are integrated into building emergency systems, an alert can be displayed to the user whenever these systems notify the cloud-based servers. Using touch, haptic, and voice input, users can trigger the stand-alone private space enclosure 10 to alert emergency management services (including police, fire, paramedics, ambulance services, and other emergency responders within the nearby area of the stand-alone private space enclosure 10) via a video or audio call.

When a user initiates a call to emergency services, this turns on all microphones, video cameras, and stores the current GPS location of the stand-alone private space enclosure 10. This information is then stored and shared with the appropriate authorities. When a user initiates a "safe room" situation as a part of the emergency services call, the door locking mechanism of the stand-alone private space enclosure 10 is engaged to protect the user. This door locking mechanism is included as a hardware module 45 connected to the system processing module 43 within the computer module 49 of the stand-alone private space enclosure 10. The computer module 49 is linked to cloud-based servers and the locking mechanism can be enabled or disabled remotely to prevent users from self-harm within the locked, stand-alone private space enclosure 10.

Prefabricated Build with Modular Component Exchange

As described in detail above, to form a single stand-alone private space enclosure 10, a system of a plurality of prefabricated panels connect together. These panels may include technical components embedded inside that interconnect together during assembly. Single panels and components can be exchanged or added to the stand-alone private space enclosure 10 to alter its functionality.

The prefabricated panels are manufactured flat and can easily be stacked on top of each other for shipping. Flat panels enable the stand-alone private space enclosure 10 to be easily self-assembled and moved within interior spaces. These panels hide all technical components to simplify shipping, assembly, and overall user experience.

Prefabricated panels that house technical components have access doors. These access doors enable users, administrators, and technicians to reach every component necessary for the system to operate. This function is essential to replace, repair, upgrade, and/or add internal components within the system. Components can include, but are not limited to, air filtration, desk actuator, microcontroller box, power supplies, ventilation fans, etc. To ensure maintenance is not too time-consuming, access doors are positioned to function without the need to fully disassemble structure.

Technical components inside of panels are electrically connected to the computer module 49. This computer module 49 or computer system (meaning the overall system of FIG. 19 including input data sensors within input data 41, the system processing module 43, and the hardware modules 45) can be used to report real time device status and metrics to the users, administrators, and/or technicians. This system leverages its computer and networking system to share system data to remote dashboards. Software systems can alert users, administrators, and/or technicians to malfunctions and/or repairs. If repair requires a software fix, the system may automatically trigger a solution from a set of issues and solutions stored on a remote server or locally stored on the computer module 49. Warranty data for technical components can be stored in the software systems memory to inform users, administrators, and/or technicians when the warranty/replacement date for a component is nearing. The system can automatically ship users/owners updated components ahead of schedule when necessary. Administrative dashboard informs and guides technicians on how to service the stand-alone private space enclosure with videos, images, and instructions.

The prefabricated stand-alone private space enclosure 10 is built with panels that have inner connecting fixtures. These fixtures are used to connect a wide variety of panels and modules that augment the structure's functionality and aesthetics. Users can configure their stand-alone private space enclosure upon initial order or anytime thereafter. Panels can be transparent, opaque, and/or incrementally adjusted between the two states. The base plate which holds the structure together can be a flat panel for users to stand on or place a chair. The base plate may also house a fixed adjustable seat, foam standing mat, walking treadmill, or stationary pedaling bike. The stand-alone private space enclosure 10 may also be assembled as an open desk system by removing walls and keeping the primary desk and monitor panel. The prefabricated panels and connecting fixtures can leverage waterproof materials and seals enabling outdoor placement of the stand-alone private space enclosure. Component modules may include heating and cooling units to control internal climate.

Cellular modem modules added to the internal technical system 49 enable network connection without the need for WIFI® or Ethernet connection. Cellular modems (optionally leveraging 4G/5G) provide network connectivity to the computer module 49, which can then broadcast a secure connection to users for private networking.

Prefabricated Studio for Content Creation and Consumption

While the soundproof enclosures are great solutions for work activities, they also lend themselves to content creation and consumption. When the stand-alone private space enclosure's computer module 49 is connected to a cloud-based user profile, it displays a user's application library connected to their personal accounts. This system enables the stand-alone private space enclosure 10 to become a "third-device" that is securely shared by other users. The prefabricated stand-alone private space enclosure 10 and connected operating system may function as a private content creation studio. Creation studio has limitless applications for live broadcast, live streaming, video interviews, vlogging, virtual teaching, podcasting, DJ sets, editing suites, or any other creative use of the creative functions of the stand-alone private space enclosure 10.

The prefabricated stand-alone private space enclosure 10 and connected operating system may also function as a private consumption theater. Users can interact with entertainment applications on the touch display to consume their personal content. Content services may include, but are not limited to, music (APPLE MUSIC®, SPOTIFY®, PANDORA®), streaming (NETFLIX®, YOUTUBE®, HULU®, DISNEY+® APPLE TV®, PRIME®, HBO MAX®, ESPN®), gaming (XCLOUD®, GEFORCE®, LUNA®, TWITCH®), podcasting (APPLE PODCASTS®, SPOTIFY®), audiobooks (AUDIBLE®, AUDIOBOOKS.COM®), learning (Lynda®, MASTERCLASS®, KHAN ACADEMY®).

Artificial Intelligence (AI) Powered Camera Occupancy and Positioning

The AI-based computer vision system uses input data from the camera 84 to monitor the stand-alone private space enclosure's occupancy at all times. This system works in conjunction with the door and occupancy sensor to provide accurate readings and deploy software functions. When the stand-alone private space enclosure 10 is unoccupied the system counts the number of people walking past, as a user approaches the system triggers a "wake state" providing information on the display and preparing the stand-alone private space enclosure 10 for user entry. As a user enters and closes the door behind them, the system operates in an occupied state.

This AI-based computer vision system can detect when a user is smiling during a photo capture moment. This detection informs the system to automatically capture the photo, preventing need for user interaction. When a text transcription is needed, the depth sensing and computer vision system can read talking lips and sign language communication. Hand gestures and hand tracking can be monitored by the depth sensing and computer vision system enabling touch free navigation. Spatial audio system can be informed of the users' active head placement to properly position sounds.

Energy Offset Method

Each unit's operating system may actively monitor its energy consumption. This data is pushed to the cloud and shared with users, administrators, and technicians. When applicable, the energy consumption of each unit can be offset through funding of carbon offsets and/or local renewable energy credits. The funding of these offsets and credits will be transacted as part of the primacy customers subscription service. This energy offset method can also be applied to the manufacturing process, build materials, transportation of parts, and white-glove assembly of the units.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. A stand-alone private space enclosure configured and sized to allow a human to both sit and stand within it, wherein the stand-alone private space enclosure comprises:

a main frame comprising a front wall; a rear wall; a first side wall having a first side wall base support, a first interior space facing panel and a first exterior facing panel spaced apart from one another and defining a first side wall cavity; a second side wall; a top wall; and a floor; wherein the floor is engaged to the front wall, the rear wall, the first side and the second side and the top wall is engaged to the front wall, the rear wall, the first side wall and the second side wall; and wherein the front wall, the rear wall, the first side wall, the second side wall, the top wall and the floor define an interior workspace;

a door that is either (1) hingedly engaged with the front wall by one or more hinges; or (2) is the front wall and is hingedly engaged to the first side wall or the second side wall by one or more hinges; wherein the door is operable by hand and without the use of tools to allow a user ingress and egress from the interior workspace;

a moveable workstation assembly that is moveable and positionable as an overall assembly between an upmost position and a downmost position and any use location between the upmost position and the downmost position and wherein the use location is based upon the height of the user, user instructions received from the user via a user input device or both, wherein the moveable workstation assembly comprises:

a moveable workstation frame that includes:

a left side vertical support;

a right side vertical support opposite the left side vertical support;

a horizontally extending bottom support affixed to or integrally formed with the left side vertical support and the right side vertical support;

a horizontally extending strengthening support affixed to or integrally formed with and extending between about a center portion of the left side vertical support and about a center portion of the right side vertical support; and a horizontally extending display mounting support spaced above the horizontally extending strengthening support and affixed to or integrally formed with and extending between the left side vertical support and the right side vertical support;

a video display monitor engaged to the horizontally extending display mounting support such that the video display monitor faces the interior workspace;

a façade covering that hides the entire moveable workstation frame and any aperture in the first interior space facing panel that are proximate or within a boundary defined by the moveable workstation frame regardless of the position of the moveable workstation assembly between the upmost position and the downmost position;

a first desk support rod having a desk engaging end portion and an opposite end portion wherein the first desk support rod extends through the façade covering and engages the left side vertical support of the moveable workstation frame;

a second desk support rod having a desk engaging end portion and an opposite end portion wherein the second desk support rod extends through the façade covering and engages right side vertical support of the moveable workstation frame; and a desk having a first desk support rod receiving aperture on a first side wall facing surface of the desk and extending into an interior of the desk; and a second desk support rod receiving aperture on the first side wall facing surface of the desk and extending into an interior of the desk wherein the first desk support rod receiving aperture is left of a center of the first side wall facing surface of the desk and the second desk support rod receiving aperture is right of the center of the first side wall facing surface of the desk and wherein the first desk support rod's desk engaging portion is within the first desk support rod receiving aperture and wherein the second desk support rod's desk engaging portion is within the second desk support rod receiving aperture;

a vertically oriented actuator positioned within the first side wall cavity; engaged with the first side wall and the moveable workstation frame; and configured to move the moveable workstation assembly as a unit between an upmost position and a downmost position and to any use location between the upmost position and the downmost position and to maintain the position of the moveable workstation assembly in a user selected position.

2. The stand-alone private space enclosure of claim 1, wherein the moveable workstation assembly only engages the first side wall through its connection with the vertically oriented actuator and by a connection of the moveable workstation frame to a guide rail and a ball bearing carriage assembly system on each side of the moveable workstation frame where ball bearing carriages are mounted to first side wall and a corresponding guide rail that engages the ball bearing carriages is mounted to the left side vertical support and the right side vertical support.

3. The stand-alone private space enclosure of claim 2, wherein the façade covering has a first wall facing side; is concave toward the first side wall; and has a top perimeter rim, a left side perimeter rim, a right side perimeter rim and a bottom perimeter rim that each extend toward and face an interior workspace facing side of the first interior space facing panel and wherein a camera module is attached to the first wall facing side of the façade covering and a camera is allowed to view the interior workspace through a camera aperture in the façade covering and above a display aperture in the façade covering that allows the user to view the video display monitor from within the interior workspace.

4. The stand-alone private space enclosure of claim 3, wherein the façade covering is affixed to an exterior facing surface of the left side vertical support; an exterior facing surface of the right side vertical support; an exterior facing surface of the horizontally extending bottom support; and an exterior facing surface of the horizontally extending strengthening support using a plurality of fasteners and wherein the first desk support rod's opposite end portion engages a first desk support rod receiving bracket mounted to the left side vertical support and having a outwardly extending cavity defined by at least one wall wherein the outwardly extending cavity substantially corresponds in size and shape to the first desk support rod's opposite end portion and the first desk support rod's opposite end portion is spaced within the outwardly extending cavity of the first desk support rod receiving bracket; and wherein the second desk support rod's opposite end portion engages a second desk support rod receiving bracket mounted to the left side vertical support and having a outwardly extending cavity defined by at least one wall wherein the outwardly extending cavity substantially corresponds in size and shape to the second desk support rod's opposite end portion and the second desk support rod's opposite end portion is spaced within the outwardly extending cavity of the second desk support rod receiving bracket.

5. The stand-alone private space enclosure of claim 1, wherein the façade covering has a first wall facing side; is concave toward the first side wall; and has a top perimeter rim, a left side perimeter rim, a right side perimeter rim and a bottom perimeter rim that each extend toward and face an interior workspace facing side of the first interior space facing panel and wherein a camera module is attached to the first wall facing side of the façade covering and a camera is allowed to view the interior workspace through a camera aperture in the façade covering and above a display aperture in the façade covering that allows the user to view the video display monitor from within the interior workspace.

6. The stand-alone private space enclosure of claim 1, wherein the desk further comprises at least two desk strengthening support rods extending from proximate a left side of the desk to proximate a right side of the desk.

7. The stand-alone private space enclosure of claim 6, wherein the desk is a plywood or a solid hardwood with the two desk strengthening rods not visible to the user of the desk when viewed from above or the left side of the desk or the right side of the desk and wherein the desk further comprises a wireless mobile computing device charger embedded within a portion of the desk.

8. The stand-alone private space enclosure of claim 7, wherein the wireless mobile computing device charger is not visible to the user of the desk and is powered from a power supply within the first side wall that receives power of an electrical connection within a structure the stand-alone private space enclosure is placed and wherein the first desk support rod and the second desk support rod are cylindrically shaped.

9. The stand-alone private space enclosure of claim 8, wherein the moveable workstation assembly further comprises at least one alternating current power outlet and at least one computer data transfer connection point that are mounted to a non-user facing interior surface of the façade covering.

10. The stand-alone private space enclosure of claim 9, wherein the at least one computer data transfer connection point is chosen from the group consisting of: a high-definition multimedia interface connector, a universal serial bus connector, serial connector and a display port and wherein the at least one computer data transfer connection is connected to the video display monitor via wiring that runs from the at least one computer data transfer connection and within a boundary of the moveable workstation frame to the video display monitor and wherein the video display monitor optionally further comprises at least one speaker.

11. The stand-alone private space enclosure of claim 1, wherein the vertically oriented actuator is an electrically driven linear actuator that receives power from a power source spaced within the first side wall cavity and comprises an electric motor, a gear box, a lead screw that drives a piston rod, a retract limit switch for a lowermost position, and an extend limit switch for the upmost position; and wherein the electrically driven linear actuator is mounted to the first side wall base support and the piston rod is vertically oriented and engaged with the moveable workstation frame.

12. The stand-alone private space enclosure of claim 11, wherein the electrically driven linear actuator has at least an 18 inch stroke and can hold at least 150 pounds of force and the piston rod moves at a rate of about 0.37 inches per second under no load and wherein the electrically driven linear actuator is only mounted to the first side wall base support and the moveable workstation frame at the piston rod; and wherein at least one wireless internet antenna is spaced within the first side wall and the at least one wireless internet antenna is operably connected to a microprocessor associated with the stand-alone private space enclosure and not a user's computing device.

13. The stand-alone private space enclosure of claim 1, wherein the moveable workstation assembly further comprises a camera and a microphone mounted solely to a non-user facing surface of the façade covering that does not face the user during use and wherein the camera and the microphone are spaced above the video display monitor, behind the façade covering, but the camera is allowed to view the interior workspace through a camera aperture proximate the top and center of the façade covering.

14. The stand-alone private space enclosure of claim 13 further comprising an air recirculating and conditioning system including a duct with a fan and an air filter disposed within at least one of the front wall, the rear wall, the first side wall, the second side wall, the top wall, and the floor and wherein the stand-alone private space enclosure further comprises four adjustable feet, each of adjustable foot comprises a head portion having a tool engaging configuration that allows for rotation of an upwardly extending threaded rod connected to a base portion; and wherein each adjustable foot is engaged with the floor through engagement with a threaded aperture in a bottom surface of the floor and wherein the head portion of each foot is accessible by a user within the interior workspace of the stand-alone private space enclosure through an internally facing aperture aligned with the aperture in the bottom surface of the floor and the head portion may be engaged with an actuating tool that is inserted through the internally facing aperture into engagement with the tool engaging configuration of the head portion thereby allowing the foot to be extended further below the bottom surface of the floor or brought closer to the bottom surface of the floor by rotating a tool in engagement with the head portion and thereby allowing adjustment of a height of each of the four adjustable feet independently from one another and from the interior workspace to level the entire stand-alone private space enclosure without having to access or view the bottom surface of the floor; and wherein the video display monitor alone has a microprocessor carrying code such that a user can use only the video display monitor without any other computer system to raise and/or lower the desk using an on-screen adjustment on the video display monitor and the video display monitor is a touch sensitive display.

15. The stand-alone private space enclosure of claim 14, wherein the floor further comprises a carpet that covers each of the internally facing apertures of the floor.

16. The stand-alone private space enclosure of claim 1, wherein the vertically oriented actuator comprises a screw stepper motor system that is mounted to a central support engaged with and extending from the left side of the first side wall to the right side of the first side wall wherein the central support interconnects the first side wall and the second side wall within the middle fifty percent of the overall height of the first side wall and the second side wall and the central support is at least substantially parallel to the floor; and wherein the screw stepper motor system comprises a screw stepper motor, a screw stepper drive shaft, a potentiometer and a mounting bracket that is engaged to the moveable workstation frame.

17. The stand-alone private space enclosure of claim 16 further comprising a cable chain mounting frame extending downward from the top wall about 50-75% of a distance to the central support; a cable chain mounted to an interior facing side of the cable chain mounting frame that carries within it electrical and signaling cables; a main power supply within first side wall and a display power source that provides power to the video display monitor and the main power supply does not do so and wherein the screw stepper motor system moves the screw stepper drive shaft at a speed of about 1 inch per second under no load.

18. A stand-alone private space enclosure configured and sized to allow a human to both sit and stand within it, wherein the stand-alone private space enclosure comprises:

- a main frame comprising a rear wall; a first side wall having a first side wall base support, a first interior space facing panel and a first exterior facing panel spaced apart from one another and defining a first side wall cavity; a second side wall; a top wall; and a floor; wherein the floor is engaged to a front wall, the rear wall, the first side and the second side and the top wall is engaged to the front wall, the rear wall, the first side wall and the second side wall; and wherein the front wall, the rear wall, the first side wall, the second side wall, the top wall and the floor define an interior workspace;
- a door that is hingedly engaged to the first side wall or the second side wall by one or more hinges; wherein the door is operable by hand and without the use of tools to allow a user ingress and egress from the interior workspace;
- a moveable workstation assembly that is moveable and positionable as an overall assembly between an upmost position and a downmost position and any use location between the upmost position and the downmost position and wherein the use location is based upon the height of the user, user instructions received from the user via a user input device or both, wherein the moveable workstation assembly comprises:
  - a moveable workstation frame that includes:
    - a left side vertical support;
    - a right side vertical support opposite the left side vertical support;
    - a horizontally extending bottom support affixed to or integrally formed with the left side vertical support and the right side vertical support;
    - a horizontally extending strengthening support affixed to or integrally formed with and extending between about a center portion of the left side vertical support and about a center portion of the right side vertical support; and
    - a horizontally extending display mounting support spaced above the horizontally extending strengthening support and affixed to or integrally formed with and extending between the left side vertical support and the right side vertical support;
  - a video display monitor engaged to the horizontally extending display mounting support such that the video display monitor faces the interior workspace;
  - a façade covering that hides the entire moveable workstation frame and any aperture in the first interior space facing panel that are proximate or within a boundary defined by the moveable workstation frame regardless of the position of the moveable workstation assembly between the upmost position and the downmost position;
  - a first desk support rod having a desk engaging end portion and an opposite end portion wherein the first desk support rod extends through the façade covering and engages the left side vertical support of the moveable workstation frame;
  - a second desk support rod having a desk engaging end portion and an opposite end portion wherein the second desk support rod extends through the façade covering and engages right side vertical support of the moveable workstation frame;
  - a desk having a first desk support rod receiving aperture on a first side wall facing surface of the desk and extending into an interior of the desk; and a second desk support rod receiving aperture on the first side wall facing surface of the desk and extending into an interior of the desk wherein the first desk support rod receiving aperture is left of a center of the first side wall facing surface of the desk and the second desk support rod receiving aperture is right of the center of the first side wall facing surface of the desk and wherein the first desk support rod's desk engaging portion is within the first desk support rod receiving aperture and wherein the second desk support rod's desk engaging portion is within the second desk support rod receiving aperture;
- a vertically oriented actuator positioned within the first side wall cavity; engaged with the first side wall and the moveable workstation frame; and configured to move the moveable workstation assembly as a unit between an upmost position and a downmost position and to any use location between the upmost position and the downmost position and to maintain the position of the moveable workstation assembly in a user selected position; and wherein the vertically oriented actuator comprises a screw stepper motor system that is mounted to a central support engaged with and extending from the left side of the first side wall and into engagement with the right side of the first side wall; and wherein the central support interconnects the first side wall and the second side wall within the middle fifty percent of the overall height of the first side wall and the second side wall and the central support is at least substantially parallel to the floor; and wherein the screw stepper motor system comprises a screw stepper motor, a screw stepper drive shaft, a potentiometer and a mounting bracket that is engaged to the moveable workstation frame.

19. The stand-alone private space enclosure of claim 18 further comprising a lock disposed on the front wall and having a latch that reaches into a catch on the door, the lock configured to remove the latch from the catch upon a user input including a proper verification of a valid reservation within a microprocessor independently associated with the stand-alone private space enclosure.

20. A stand-alone private space enclosure configured and sized to allow a human to both sit and stand within it, wherein the stand-alone private space enclosure comprises:

a main frame comprising a rear wall; a first side wall having a first side wall base support, a first interior space facing panel and a first exterior facing panel spaced apart from one another and defining a first side wall cavity; a second side wall; a top wall; and a floor; wherein the floor is engaged to a front wall, the rear wall, the first side and the second side and the top wall is engaged to the front wall, the rear wall, the first side wall and the second side wall; and wherein the front wall, the rear wall, the first side wall, the second side wall, the top wall and the floor define an interior workspace;

a door that is hingedly engaged to the first side wall or the second side wall by one or more hinges; wherein the door is operable by hand and without the use of tools to allow a user ingress and egress from the interior workspace;

a moveable workstation assembly that is moveable and positionable as an overall assembly between an upmost position and a downmost position and any use location between the upmost position and the downmost position and wherein the use location is based upon the height of the user, user instructions received from the user via a user input device or both, wherein the moveable workstation assembly comprises:

a moveable workstation frame that includes:

a left side vertical support;

a right side vertical support opposite the left side vertical support;

a horizontally extending bottom support affixed to or integrally formed with the left side vertical support and the right side vertical support;

a horizontally extending strengthening support affixed to or integrally formed with and extending between about a center portion of the left side vertical support and about a center portion of the right side vertical support; and a horizontally extending display mounting support spaced above the horizontally extending strengthening support and affixed to or integrally formed with and extending between the left side vertical support and the right side vertical support;

a video display monitor engaged to the horizontally extending display mounting support such that the video display monitor faces the interior workspace;

a façade covering that hides the entire moveable workstation frame and any aperture in the first interior space facing panel that are proximate or within a boundary defined by the moveable workstation frame regardless of the position of the moveable workstation assembly between the upmost position and the downmost position;

a first desk support rod having a desk engaging end portion and an opposite end portion wherein the first desk support rod extends through the façade covering and engages the left side vertical support of the moveable workstation frame;

a second desk support rod having a desk engaging end portion and an opposite end portion wherein the second desk support rod extends through the façade covering and engages right side vertical support of the moveable workstation frame;

a desk having a first desk support rod receiving aperture on a first side wall facing surface of the desk and extending into an interior of the desk; and a second desk support rod receiving aperture on the first side wall facing surface of the desk and extending into an interior of the desk wherein the first desk support rod receiving aperture is left of a center of the first side wall facing surface of the desk and the second desk support rod receiving aperture is right of the center of the first side wall facing surface of the desk and wherein the first desk support rod's desk engaging portion is within the first desk support rod receiving aperture and wherein the second desk support rod's desk engaging portion is within the second desk support rod receiving aperture;

wherein the stand-alone private space enclosure further comprises a vertically oriented actuator positioned within the first side wall cavity; engaged with the first side wall and the moveable workstation frame; and configured to move the moveable workstation assembly as a unit between an upmost position and a downmost position and to any use location between the upmost position and the downmost position and to maintain the position of the moveable workstation assembly in a user selected position; and wherein the vertically oriented actuator comprises a screw stepper motor system that is mounted to a central support that is welded to the left side of the first side wall and the right side of the first side wall wherein the central support interconnects the first side wall and the second side wall within the middle fifty percent of the overall height of the first side wall and the second side wall and the central support is at least substantially parallel to the floor; and wherein the screw stepper motor system comprises a screw stepper motor, a screw stepper drive shaft, a potentiometer and a mounting bracket that is engaged to the moveable workstation frame;

wherein the moveable workstation assembly only engages the first side wall through its connection with the vertically oriented actuator and by a connection of the moveable workstation frame to a guide rail and a ball bearing carriage assembly system on each side of the moveable workstation frame where ball bearing carriages are mounted to first side wall and a corresponding guide rail that engages the ball bearing carriages is mounted to the left side vertical support and the right side vertical support; and wherein the moveable workstation assembly further comprises a camera and a microphone mounted solely to a non-user facing surface of the façade covering that does not face the user during use and wherein the camera and the microphone are spaced above the video display monitor, behind the façade covering, but the camera is allowed to view the interior workspace through a camera aperture proximate the top and center of the façade covering.

* * * * *